US012134915B2

(12) United States Patent
Lovejoy et al.

(10) Patent No.: US 12,134,915 B2
(45) Date of Patent: Nov. 5, 2024

(54) DEADBOLT PERFORMANCE DETECTING SYSTEM

(71) Applicant: ASSA ABLOY Residential Group, Inc., New Haven, CT (US)

(72) Inventors: Garrett Lovejoy, Raleigh, NC (US); Mark Caterino, Prospect, CT (US); Kevin C. Kraus, Monument, CO (US)

(73) Assignee: ASSA ABLOY Residential Group, Inc., New Haven, CT (US)

( * ) Notice: Subject to any disclaimer, the term of this patent is extended or adjusted under 35 U.S.C. 154(b) by 1424 days.

(21) Appl. No.: 16/520,056

(22) Filed: Jul. 23, 2019

(65) Prior Publication Data

US 2020/0123808 A1 Apr. 23, 2020

Related U.S. Application Data

(60) Provisional application No. 62/746,789, filed on Oct. 17, 2018.

(51) Int. Cl.
*E05B 47/00* (2006.01)
*E05B 17/10* (2006.01)
*E05B 39/00* (2006.01)

(52) U.S. Cl.
CPC .......... *E05B 47/0001* (2013.01); *E05B 17/10* (2013.01); *E05B 39/00* (2013.01); *E05B 2047/0069* (2013.01); *E05Y 2900/132* (2013.01)

(58) Field of Classification Search
None
See application file for complete search history.

(56) References Cited

U.S. PATENT DOCUMENTS

| | | | |
|---|---|---|---|
| 2,181,313 | A | 11/1939 | Blodgett |
| 2,353,844 | A | 7/1944 | Milner |
| 2,484,571 | A | 10/1949 | Jozefowicz |
| 2,869,913 | A | 1/1959 | Schlage |
| 3,148,524 | A | 9/1964 | Yulkowski |
| 4,389,061 | A | 6/1983 | Foshee |
| 4,595,220 | A | 6/1986 | Hanchett, Jr. et al. |
| 4,657,206 | A | 4/1987 | Matsumoto et al. |

(Continued)

FOREIGN PATENT DOCUMENTS

| | | | |
|---|---|---|---|
| AU | 2007219334 | A1 | 4/2008 |
| DE | 19639253 | A1 | 11/1997 |

(Continued)

OTHER PUBLICATIONS

Computer Generated Translation for DE 10209037 A1, Generated on Feb. 23, 2023, https://worldwide.espacenet.com/ (Year: 2023).*

(Continued)

*Primary Examiner* — Alyson M Merlino
(74) *Attorney, Agent, or Firm* — Calfee, Halter & Griswold LLP

(57) ABSTRACT

A deadbolt system securing an access point includes a deadbolt and a deadbolt sensor configured to characterize the performance of the deadbolt. The deadbolt system generates a resistance signature when the deadbolt is moved between a retracted and extended position which is comparable to a threshold or a previously recorded resistance signature. The comparison may determine the presence of one or more performance inhibitors which may be conveyed to an operator through a local or remote indicator.

17 Claims, 30 Drawing Sheets

(56) References Cited

U.S. PATENT DOCUMENTS

| | | | |
|---|---|---|---|
| 4,674,776 A | 6/1987 | James | |
| 4,744,021 A | 5/1988 | Kristy | |
| 4,870,841 A | 10/1989 | Cudd | |
| 4,890,870 A | 1/1990 | Miron | |
| 4,945,737 A | 8/1990 | Hart | |
| 4,950,005 A | 8/1990 | Cudd | |
| 5,267,457 A | 12/1993 | Sorensen et al. | |
| 5,377,513 A | 1/1995 | Miyamoto et al. | |
| 5,678,870 A | 10/1997 | Pelletier | |
| 5,712,626 A | 1/1998 | Andreou et al. | |
| 5,918,916 A | 7/1999 | Kajuch | |
| 5,933,086 A | 8/1999 | Tischendorf et al. | |
| 5,941,581 A | 8/1999 | Heithe | |
| 6,212,923 B1 | 4/2001 | Clark | |
| 6,302,456 B1 | 10/2001 | Errani | |
| 6,578,888 B1 | 6/2003 | Fayngersh et al. | |
| 7,007,985 B2 | 3/2006 | Alexander et al. | |
| 7,155,946 B2 | 1/2007 | Lee et al. | |
| 7,303,215 B2 | 12/2007 | Moon et al. | |
| 7,431,354 B2 | 10/2008 | Raatikainen | |
| 7,866,713 B2 | 1/2011 | Chen | |
| 8,494,680 B2 | 7/2013 | Sparenberg et al. | |
| 9,322,201 B1 | 4/2016 | Cheng et al. | |
| 9,326,094 B2 | 4/2016 | Johnson et al. | |
| 9,382,739 B1 | 7/2016 | Johnson et al. | |
| 9,447,609 B2 | 9/2016 | Johnson et al. | |
| 9,528,294 B2 | 12/2016 | Johnson et al. | |
| 9,574,372 B2 * | 2/2017 | Johnson | E05B 47/0012 |
| 9,580,934 B2 | 2/2017 | Baty et al. | |
| 9,683,392 B1 | 6/2017 | Cheng et al. | |
| 10,329,801 B2 | 6/2019 | Martin et al. | |
| 10,400,476 B2 | 9/2019 | Grillo | |
| 10,508,472 B2 | 12/2019 | Piantek | |
| 10,704,293 B2 * | 7/2020 | Almomani | E05B 47/0001 |
| 10,742,142 B2 * | 8/2020 | Forsberg | E05B 47/0012 |
| 11,136,790 B2 | 10/2021 | Caterino et al. | |
| 2002/0101083 A1 | 8/2002 | Toledano et al. | |
| 2002/0145292 A1 | 10/2002 | Furner | |
| 2003/0127866 A1 | 7/2003 | Martinez et al. | |
| 2003/0226384 A1 | 12/2003 | Shedd et al. | |
| 2004/0045330 A1 | 3/2004 | Moon et al. | |
| 2005/0046198 A1 | 3/2005 | Alexander et al. | |
| 2006/0123859 A1 | 6/2006 | Gonzalez | |
| 2009/0151407 A1 | 6/2009 | Lin | |
| 2009/0151408 A1 | 6/2009 | Petry | |
| 2012/0167646 A1 | 7/2012 | Sharma et al. | |
| 2013/0192317 A1 | 8/2013 | McKibben et al. | |
| 2014/0109632 A1 * | 4/2014 | Horne | E05B 47/0012 70/77 |
| 2016/0037306 A1 | 2/2016 | Johnson et al. | |
| 2016/0049024 A1 | 2/2016 | Johnson et al. | |
| 2016/0189503 A1 | 6/2016 | Johnson et al. | |
| 2017/0152679 A1 * | 6/2017 | Almomani | E05B 47/0001 |
| 2017/0228603 A1 | 8/2017 | Johnson | |
| 2017/0362856 A1 | 12/2017 | Almomani et al. | |
| 2018/0298640 A1 | 10/2018 | Caterino | |
| 2018/0320414 A1 | 11/2018 | Piantek | |
| 2019/0178005 A1 | 6/2019 | Caterino et al. | |

FOREIGN PATENT DOCUMENTS

| | | | | |
|---|---|---|---|---|
| DE | 10209037 A1 * | 10/2003 | G01R 19/16542 |
| FR | 404777 A | 12/1909 | |
| FR | 623497 A | 6/1927 | |
| KR | 200322402 Y1 * | 8/2003 | |
| KR | 20110024915 A * | 3/2011 | |
| WO | WO 2015/058252 A1 | 4/2015 | |

OTHER PUBLICATIONS

International Preliminary Report on Patentability for International Application No. PCT/US2018/028066, mailed Oct. 31, 2019.

International Preliminary Report on Patentability for International Application No. PCT/US2018/062738, mailed Jun. 18, 2020.

International Preliminary Report on Patentability for International Application No. PCT/US2018/031391, mailed Nov. 21, 2019.

Invitation to Pay Additional Fees for International Application No. PCT/US2018/028066, mailed Jun. 27, 2018.

International Search Report and Written Opinion for International Application No. PCT/US2018/028066, mailed Aug. 29, 2018.

International Search Report and Written Opinion for International Application No. PCT/US2018/062738, mailed Feb. 11, 2019.

International Search Report and Written Opinion for International Application No. PCT/US2018/031391, mailed Aug. 9, 2018.

U.S. Appl. No. 15/946,811, filed Apr. 6, 2018, Caterino.

U.S. Appl. No. 16/202,465, filed Nov. 28, 2018, Caterino et al.

U.S. Appl. No. 15/913,322, filed Mar. 6, 2018, Piantek.

PCT/US2018/028066, Jun. 27, 2018, Invitation to Pay Additional Fees.

PCT/US2018/028066, Aug. 29, 2018, International Search Report and Written Opinion.

PCT/US2018/062738, Feb. 11, 2019, International Search Report and Written Opinion.

PCT/US2018/031391, Aug. 9, 2018, International Search Report and Written Opinion.

* cited by examiner

DEADBOLT PERFORMANCE DETECTING SYSTEM

FIELD

Disclosed embodiments are related to detecting the performance of a deadbolt system.

BACKGROUND

Traditionally, deadbolt systems are used to secure access points (e.g., doors, windows, etc.) from unauthorized entry. These deadbolt systems are conventionally unlocked with a key or other valid credential, such that an authorized user can enter or exit through the access point. Conventional deadbolts of such locks extend into an associated jamb adjacent the access point.

Home security systems often utilize a smart lock to monitor and alert an operator as to the security state of the door. Some locks may be remotely locked or unlocked. Existing deadbolt systems are able to detect whether a deadbolt of the dead bolt system is extended or retracted. However, such systems may be unable to detect whether the deadbolt is actually engaged with the door jamb. Additionally, such systems do not detect other performance information of the deadbolt.

SUMMARY

According to one embodiment, a deadbolt system includes a deadbolt movable between an extended position and a retracted position and a controller adapted to, in response to a sensed condition, generate a resistance signature when the deadbolt is moved from the retracted position to the extended position.

According to another embodiment, a method for operating a deadbolt system includes obtaining a first resistance signature that is at least partially indicative of deadbolt performance when the deadbolt is not installed in the door and installing the deadbolt system into the door. The method also includes extending a deadbolt from a retracted position to an extended position when the deadbolt is installed in a door, recording a second resistance signature at least partially indicative of deadbolt performance when the deadbolt is installed in the door, and comparing the first resistance signature and the second resistance signature.

According to yet another embodiment, a method for operating a deadbolt system includes extending a deadbolt from a retracted position to an extended position at a first time and recording a first resistance signature that is at least partially indicative of deadbolt performance. The method also includes extending a deadbolt from a retracted position to an extended position at a second time, recording a second resistance signature that is at least partially indicative of deadbolt performance, and comparing the first resistance signature and the second resistance signature.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
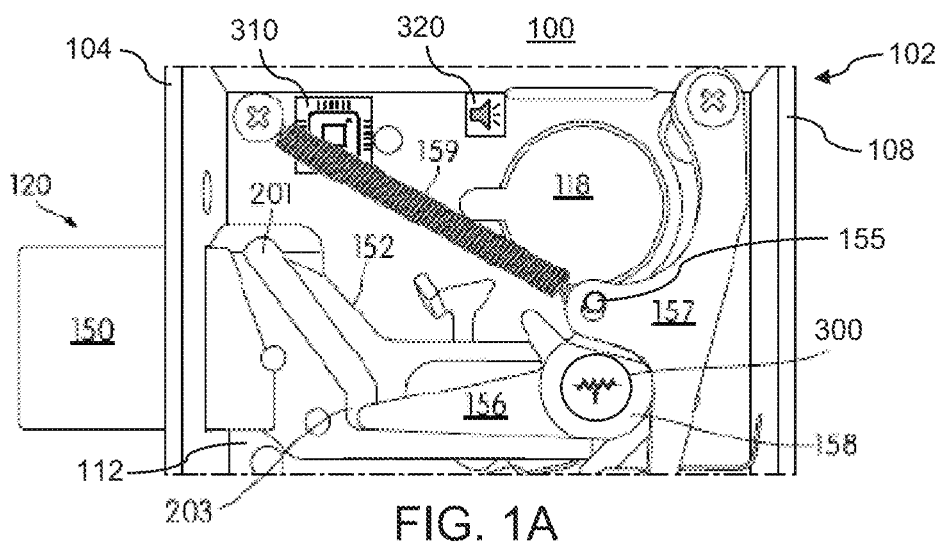
FIGS. 1A-1C depict side views of an embodiment of a portion of a deadbolt system incorporating a deadbolt position sensor.

During an operation of a conventional deadbolt, performance inhibitors may sometimes be encountered by the deadbolt which affect the long or short term performance of the deadbolt. For example, upon initial installation or over time, a deadbolt may be misaligned with a door strike and may generate significant friction between the deadbolt and the door strike. In addition, the door that the deadbolt is mounted to may have misaligned hinges which cause the deadbolt to be misaligned and generate friction. In some cases, these performance inhibitors may vary based on weather conditions, age, or wear. For example, a door may swell in a high humidity environment which affects the performance of the deadbolt and may vary with weather conditions. Accordingly, the inventors have recognized the benefits of a dead bolt system which notifies an operator of performance inhibitors so that corrective action may be taken. The inventors have also recognized the benefits of a deadbolt system which tracks the performance of a deadbolt over tune, so that performance degradation and/or variable factors such as weather may be accounted for when notifying an operator of performance inhibitors. That is, the deadbolt system may identify performance trends which may be used to recommend corrective action to an operator (e.g., user, maintenance personal or homeowner) of the dead bolt. Additionally, the inventors have recognized the benefits of a deadbolt and position sensor system which performs an installation test sequence so that the deadbolt and position sensor system may notify an operator to one or more installation issues so that the operator may take corrective action when installing the deadbolt and position sensor system.

In some embodiments, a deadbolt system includes a deadbolt which is actuable between an extended position and a retracted position. The deadbolt system includes a sensor suitable to measure the resistance of the deadbolt when moved between the retracted position and the extended position and/or between the extended position and the retracted position. Accordingly, differences in the resistance of the deadbolt when moved between retracted and extended positions may be measured against a reference (e.g., expected, threshold, etc.) value so that one or more performance inhibitors may be detected. In some embodiments, the deadbolt system may include two or more sensors which sense different aspects of the deadbolt (e.g., orientation and resistance) so that performance inhibitors may be better detected. The deadbolt system may include an indicator which is disposed on the deadbolt system or remote from the deadbolt system which may be used to notify (i.e., alert) an operator to one or more performance inhibitors of the deadbolt. In some embodiments, the indicator may convey correctional actions an operator of the deadbolt may take so that performance may be restored. The sensor may sense different aspects of the deadbolt over a predetermined time period so that performance trends may be identified and/or false positive rates for performance inhibitors may be reduced.

In some embodiments, a deadbolt system may use a motor current signature to determine whether the deadbolt has properly engaged with a door jamb (i.e., door strike) recess in a locked position. According to this embodiment, the deadbolt system may include a motor-driven deadbolt. The motor can move the deadbolt from a retracted position in which the deadbolt is at least partially retracted into or otherwise contained within the lock housing and/or door, to an extended position where at least a portion of the deadbolt is outside the lock housing and/or door. When the deadbolt is in the extended position and within the door jamb recess, the deadbolt is referred to herein as being engaged with the door jamb recess in the locked position. A force applied on the deadbolt is transmitted to the motor driving the deadbolt, causing the motor current to change in an attempt to overcome the applied force. The applied force may be constant or variable relative to the position of the deadbolt. A current sensor may be used to sense the current of the motor as the deadbolt is driven into the door jamb recess. Increased current indicates increased motor load, which in turn indicates that greater force is being applied to the deadbolt against the movement direction of the deadbolt as the deadbolt is being moved from the retracted position to the extended position. This applied force may be a result of frictional forces with a strike plate or door jamb recess, normal contact forces with a door jamb recess, or any other forces which resist the motion of the deadbolt between a retracted position and extended position. In some embodiments, the deadbolt system may include a force applicator that applies a force to the deadbolt as the deadbolt is driven by the motor into the door jamb recess. In this way, forces above the known force applied by the force applicator can indicate a performance inhibitor. Additionally, recording current may allow the time of deadbolt travel and the length of deadbolt travel to be computed which may suggest performance problems. Accordingly, the sensed motor current resistance of the deadbolt between the retracted and extended position itself and/or the sensed motor current resistance over time and/or over position may be indicative of one or more performance inhibitors.

In some embodiments, the deadbolt system is able to determine whether the deadbolt has engaged with a door jamb recess and/or if any performance inhibitors are present by comparing the sensed motor current relative to deadbolt position against an expected motor current signature. The expected motor current signature is the expected profile of the motor current relative to deadbolt position when the deadbolt is properly moved into the door jamb recess into the locked position. Evaluation circuitry may be used to compare the sensed motor current relative to deadbolt position to the expected current signature. The evaluation circuitry may determine that the deadbolt is experiencing higher friction or has an otherwise inhibited performance. The evaluation circuitry may also determine whether the deadbolt is engaged with the door jamb recess in a locked position when the sensed current of the motor relative to deadbolt position is within a threshold amount of the expected current signature. The signature may be stored within the system and compared with subsequent signatures so that trends may be determined. In some embodiments, the trends may be used to reduce false positives which are a result of cyclical or temporary conditions such as weather, wind, etc. For example, the performance of the deadbolt may be inhibited when the door is swollen due to high humidity weather but otherwise may be functioning normally. Or, the performance of the deadbolt may be inhibited by a wind force applied to the door that causes the deadbolt to be pushed against a side wall of the recess. Accordingly, outlier values not part of a consistent trend of reduced performance may not be used to alert an operator. Of course, any performance inhibitor whether a single event, short term, or long term may be conveyed to an operator in an alert, as the present disclosure is not so limited.

In addition to the issues described above, conventional deadbolts are typically fully extended in order to secure an access point. In some situations during normal use, a user may not fully extend the deadbolt, thereby compromising the security of the deadbolt. Accordingly, the inventors have recognized the benefits of a deadbolt system including a deadbolt position sensor which senses the displacement of the deadbolt as it moves between a retracted position and an extended position. In some other situations, conventional deadbolts may include a deadlatching arrangement that prevents a fully extended deadbolt from being retracted by any external forces. Such an arrangement may prevent a deadbolt from being manipulated to push the deadbolt with an external force once the deadbolt is extended past a locking region at which the deadbolt engages the deadlatching arrangement. Accordingly, the inventors have recognized the benefits of a deadbolt system which uses a deadbolt position sensor in combination with a deadlatching arrangement which prevents the deadbolt from being retracted by any external forces when the deadbolt is in a partially extended position between the fully retracted position and the fully extended positon. The deadbolt position sensor may sense a deadlatching displacement, where the deadlatching displacement corresponds to either the ability or inability of the deadlatching arrangement to prevent the deadbolt from being retracted by external forces. The deadbolt system may alert a user to one or more security states based at least one of the displacement of the deadbolt and deadlatching displacement such that the security of the deadbolt system may be improved.

According to one embodiment, a deadbolt system for an access point (e.g., a door) includes a deadbolt head, a deadbolt arm, and a sliding mechanism including a cam slot. The deadbolt head may be constructed and arranged to be moved between an extended position and a retracted position. The deadbolt arm may be constructed and arranged to move in a locking direction or an unlocking direction. The deadbolt arm may operatively connect to the cam slot of the sliding mechanism, such that rotation of the deadbolt arm causes a camming action in the cam slot which moves the deadbolt head between an extended position and a retracted position. Thus, when rotated in a locking direction, the deadbolt arm moves the dead bolt head to the extended position, and when rotated in an unlocking direction, the deadbolt arm moves the deadbolt head to the retracted position.

The deadbolt system may include a deadbolt position sensor constructed and arranged to sense a deadbolt head displacement relative to at least one of a retracted position and extended position. In some embodiments, the deadbolt position sensor may be a potentiometer. According to this embodiment, the potentiometer may be connected to a deadbolt arm, such that the relative angle of the deadbolt arm may be used to sense the deadbolt head displacement from either the retracted or extended position. Without wishing to be bound by theory, the relative angle of the deadbolt arm is converted to deadbolt head displacement based on a conversion factor dependent on the angle of a cam slot and the length of the deadbolt arm. That is, as the deadbolt arm is displaced by a certain angle sensed by the potentiometer, the deadbolt is moved a linear distance corresponding to the addition of a horizontal displacement of the deadbolt arm as it travels in a circular arc and a horizontal displacement caused by vertical movement of the deadbolt arm in the cam slot. Thus, depending on the angle of the cam slot, an angular displacement sensed by the potentiometer at the deadbolt arm may be directly converted to deadbolt head displacement. Of course, the angle of the deadbolt arm as sensed by the potentiometer may serve as a measurement of the displacement of the deadbolt head with or without any conversion. For example, the deadbolt head displacement may be sensed as a deadbolt arm angular displacement from either a locked or unlocked position. In other embodiments, the potentiometer may be constructed and arranged as a sliding potentiometer including a slider connected to either the deadbolt head or a sliding mechanism. According to this embodiment, the sliding potentiometer may directly read the deadbolt head displacement as the slider moves concurrently with the sliding mechanism. In still other embodiments, the deadbolt position sensor may be constructed and arranged as a rotary encoder. According to this embodiment, the rotary encoder may be connected to the deadbolt arm, such that the angle of the deadbolt arm can be determined by the deadbolt position sensor. In yet another embodiment, the deadbolt position sensor may be constructed and arranged as a linear encoder, with the linear encoder being at least one of an optical type, magnetic type, capacitive type, and inductive type linear encoder. According to this embodiment the linear encoder may be coupled to the deadbolt head and/or sliding mechanism to directly sense the deadbolt head displacement. Of course, any other suitable deadbolt position sensor may be employed, including but not limited to an ultrasonic sonar, infrared distance sensor, or laser rangefinder.

In yet another embodiment, the deadbolt system includes a controller constructed and arranged to detect one or more security states based at least partly on a displacement of a deadbolt head. According to this embodiment, the controller may cooperate with the deadbolt position sensor to receive the displacement of the deadbolt relative to at least one of a retracted or extended position. The controller may use the information regarding the displacement of the deadbolt to detect one or more security states. For example, if the deadbolt is in the extended position (i.e., fully extended) the controller may detect a secured state. As another example, if the deadbolt is partially extended the controller may detect a partially secured state. As yet another example, if the deadbolt is in a retracted position (i.e., fully retracted) the controller may detect and unsecured state. Of course, the controller may detect any security state which may be relevant to a user based at least partly on the deadbolt head displacement, such that the one or more security states may allow the user to take action to better secure an associated access point. In some embodiments, the controller may also be configured to determine one or more performance inhibitors based at least partly on deadbolt resistance. For example, the controller may receive information from a sensor (e.g., a current sensor) indicative of the resistance of the deadbolt when moved between the retracted and extended positions so that a resistance signature may be created and, in one embodiment, may be stored.

As used herein, a resistance signature is any marker, value, or data set which is indicative of the physical resistance on a deadbolt. That is, a resistance signature is representative of forces which resist the motion of a deadbolt between a retracted position and an extended position. The resistance signature may be based on one or more raw, filtered, averaged, or modified data inputs provided by one or more sensors or sensing devices. The resistance signature may be based on data inputs from any suitable sensor or sensing device which is able to directly or indirectly measure resistive forces on the deadbolt, including, but not limited to, a current sensor and strain gauge.

In some embodiments the deadbolt system may also include an indicator constructed and arranged to receive and indicate one or more security states and/or performance inhibitors detected by a controller to an operator. According to this embodiment, the indicator may be constructed and arranged as any visual, auditory or haptic indicator such that the operator may be notified of the one or more security states or performance inhibitors such that the operator may take action to better secure an access point. The indicator may be disposed near the deadbolt system on an associated access point, on an associated security system, or any on other suitable remote device that may indicate the one or more security states and/or performance inhibitors to an operator. In some embodiments, the indicator may be constructed and arranged as an LED light which displays the one or more security states using any combination of color and blinking pattern associated with a particular security state. In some embodiments, the indicator may be arranged as a screen that displays text associated with a particular security state or performance inhibitor to an operator. In some embodiments, the indicator may be constructed and arranged as a speaker that emits an auditory signal that indicates the one or more security states or performance inhibitors using voice, tones, beeping patterns, or any other suitable signal associated with a particular security state. Of course, the indicator may be any suitable arrangement to indicate the one or more security states and/or performance inhibitors to an operator, including but not limited to a personal computer, or smart phone, a security alarm panel, etc.

According to yet another embodiment, the deadbolt system may include authentication device that cooperates with a deadbolt arm, such that an authorized user may be granted access to move the deadbolt arm in a locking or unlocking direction with a valid credential. Additionally, the authentication device may cooperate with a controller, such that the authentication device may output one or more authentication states to the controller. The authentication device may be any suitable device that may verify a valid credential that identifies an authorized user. Accordingly, the authentication device may output one or more authentication states that correspond to the credential received. For example, the authentication device may output and authorized user state if the credential received is valid, but may output an unauthorized user state if the credential received is invalid or no credential is received. In some embodiments, the one or more authentication states may either grant access to an authorized user such that they may move the deadbolt arm, or may deny access to an unauthorized user without a valid credential to prevent the unauthorized user from moving the deadbolt arm. For example, if the authentication device is an electrical device (e.g., RFID reader, keypad, biometric scanner, etc.) the verification of a valid credential may cause the authentication device to output one or more authentication states to the controller and grant access to the deadbolt arm. That is, access to the deadbolt arm may be granted to an authorized user based on the one or more authentication states. In other embodiments, the authentication device may output the one or more authentication states based on whether a user has been granted access to the deadbolt arm or not. For example, if the authentication device is a mechanical device (e.g., a lock cylinder, mechanical keypad, etc.) the one or more authentication states may be based on movement of the authentication device. That is, movement of the deadbolt arm following entry of a valid credential would be considered as an output of an authorized user state. Similarly, the lack of movement of the authentication device may be considered as an output of an unauthorized state. In some embodiments, the authentication device may be positioned on an exterior of a door including the deadbolt system, such that the authentication device is accessible to users while in an unsecured space. Of course, the authentication device may be disposed in any suitable location such that an authorized user may verify a valid credential to be granted access to move the deadbolt arm and the authentication device may output one or more authentication states to the controller.

In some embodiments, the authentication device may include a lock cylinder positioned on the deadbolt arm, such that a user may use a key to gain access to move the deadbolt arm in the locking or unlocking direction. According to this embodiment, the authentication state may be based on the insertion of a key into the lock cylinder. That is, the authentication device may output an authorized user state when a valid key is inserted in the lock cylinder, but may output an unauthorized user state when no key is received. According to this embodiment, the authentication device may include one or more sensors suitable to detect the insertion of a valid key, including but not limited to a push button or proximity sensor. In other embodiments, the authentication device may be an electronic keypad disposed on the door. According to this embodiment, an authorized user may input a valid code to the electronic keypad. Upon entry of the valid code, the authentication device may output an authorized user state and grant access to the deadbolt arm. If a user enters an invalid code or no code at all, the authentication device may output an unauthorized state and deny access to the deadbolt arm. Of course, any suitable authentication device that identifies an authorized user may be employed, including, but not limited to, an RFID scanner, Bluetooth authenticator, Internet authenticator, or biometric scanner. In some embodiments, the authentication device may be mechanically coupled to the deadbolt arm, such that verification of a valid credential moves the deadbolt arm in the locking or unlocking direction.

In some embodiments, a controller included in the deadbolt system may be constructed and arranged to detect one or more security states based at least party on one or more authentication states and a deadbolt head displacement from either the retracted or extended position. According to this embodiment, the controller may combine information regarding the position of the deadbolt and a user identity to detect one or more security states. For example, in the case where the authentication device outputs an unauthorized state and the deadbolt head displacement is changing, the controller may detect an intrusion state. That is, the intrusion state may be associated with movement of the deadbolt head without proper authorization. In another example, the controller may detect an unlocking state if the deadbolt head displacement from the retracted position is decreasing (i.e., moving toward the retracted position) and the authentication device outputs an authorized state. That is, the unlocking state may be associated with the combination of the deadbolt head moving toward the retracted position and the authentication device outputting an authorized state. In yet another example, the controller may detect a locking state if the deadbolt head displacement from the retracted position is increasing (i.e., the deadbolt head is moving toward the extended position) and the authentication device outputs an authorized state. That is, the locking state may be associated with the combination of the deadbolt head moving toward the extended position and the authentication device outputting an authorized state. Of course, the controller may detect any security state that is at least partly based on the deadbolt head displacement and the one or more authentication states output by the authentication device.

In some embodiments, the deadbolt system may include an indicator constructed and arranged cooperate with at least one of a controller and an authentication device to indicate the one or more security states and the one or more authentication states to a user. The indicator may be any suitable visual, auditory, or haptic indicator disposed on any suitable device or in any suitable location such that a user may receive an indication of the security states and/or authentication states. In some embodiments, the indicator may only indicate the one or more security states and one or more authentication states to an authorized user. That is, the indicator may not indicate any security state or authentication state which may alert an unauthorized user to any security vulnerabilities that may be associated with the one or more security states. For example, it may be undesirable to indicate an unsecured state corresponding to the deadbolt system being unlocked and the access point unsecured to an unauthorized user who may take advantage of such a vulnerability and enter the unsecured access point. In some embodiments, the indicator may be disposed inside of a secured space associated with the deadbolt system, such that the indicator indicates any security or authentication state only to an authorized user. For example the indicator may be disposed on a security system control panel inside of a secured space to alert an authorized user inside of the secured space to the one or more security and authentication states of the deadbolt system. According to this embodiment, the indicator may be obscured from any unsecured space that may be located on the other side of an access point secured by the deadbolt system. In some embodiments, the indicator may be disposed on a personal computer or smart phone of an authorized user. In this embodiment, the indicator may only indicate to an authorized user in possession of the personal computer and/or smart phone, thereby preventing an unauthorized user from receiving the indication. In some embodiments, the indicator may indicate one or more historical security states to an authorized user, such that the user may be alerted to any previous changes in the security state. According to this embodiment, the controller may store a log of security states to be indicated to the authorized user. The indicator may indicate the one or more historical security states to the authorized user during operation of the deadbolt system, or the user may request the one or more historical security states from the controller to be indicated on any suitable device (e.g., a personal computer or smart phone).

In some embodiments, the indicator may be disposed adjacent an associated access point to indicate to a user in an unsecured space, but may only indicate following the output of an authorized state from the authentication device. Accordingly, the indication to the security state may only be given to an authorized user at the time of authentication, thereby substantially preventing any security vulnerabilities associated with the indication occurring in an unsecured space. In some embodiments, the indicator may indicate the authentication state to any user (i.e., an authorized use or unauthorized user) while withholding the security state indication from any unauthorized users. Such an arrangement may simplify operation of a lock, by indicating to a user whether the authentication device has received a valid credential. For example, in the case where the authentication device is configured as an electronic keypad, it may be beneficial for a user to receive an indication signaling the authentication device has received a correct code and the authorized user may open the access point. Similarly, the indicator may provide an indication to a user signaling an incorrect code so the user may try again. Following the entry of a valid credential, the indicator may indicate the one or more security states of the deadbolt system to an authorized user. Thus, operation of the deadbolt system may be simplified for the authorized user without compromising the security of the deadbolt system.

According to yet another embodiment, the deadbolt system may include an actuator that cooperates with an authentication device and a deadbolt arm to move the deadbolt arm in a locking or unlocking direction. The authentication device may include any suitable automatic or manual actuator that may cooperate with the authentication device to move the deadbolt arm, including, but not limited to, a handle, knob, motor, servo, or linear actuator. Accordingly, a user may enter a valid credential (e.g., a key, RFID, biometric reading, code, etc.) that identifies the user as an authorized user (i.e., the authentication device outputs an authorized state), and subsequently move the deadbolt arm in a locking direction or unlocking direction either manually or automatically. In some embodiments, the actuator of the authentication device may be operatively uncoupled from the deadbolt arm whenever a valid credential is not received by the authentication device (i.e., when the authentication device outputs an unauthorized state), so that a user may not move the deadbolt arm without a valid credential. In certain embodiments, the actuator of the authentication device may be operatively uncoupled from the deadbolt arm on an exterior side of the door if no valid credential is received by the authentication device, while the actuator remains coupled to the deadbolt arm on an interior side of the door. According to this embodiment, a user may be able to move the deadbolt arm from the interior side of the door (i.e., a secured space) without a valid credential which may simplify the locking operation for an authorized user who is already inside of the secured space. In some embodiments, the actuator may be electronically controlled, such that authentication at the authentication device causes the actuator to move the deadbolt arm to a locked position or an unlocked position. In other embodiments, the actuator may be electronically controlled, such that authentication at the authentication devices enables the actuator to be moved manually by the user. Of course, any suitable arrangement of the authentication device and actuator may be employed, such that the deadbolt arm may be moved in a locking or unlocking direction by an authorized user while an unauthorized user is prevented from moving the deadbolt arm. In combination with a deadlatching arrangement, the door may be secured from unauthorized access by substantially preventing the retraction of a deadbolt head without use of a valid credential.

In some embodiments, the deadbolt system may also include a progressive deadlatching arrangement, which prevents the deadbolt head from moving toward the retracted position from external force (i.e., force generated outside of the deadbolt mechanism) applied on the deadbolt head. The deadlatching arrangement may be any suitable arrangement and operatively connect to any element of the deadbolt such that retraction of the deadbolt head by an external force is substantially prevented.

In some embodiments, the progressive deadlatching arrangement may include a plurality of locking regions corresponding to a plurality of deadbolt extended positions, such that an external force applied to a deadbolt head does not substantially retract the deadbolt. According to this embodiment, a sliding mechanism may include a plurality of teeth which function as the locking regions and a deadbolt arm may include a projection (e.g., a pin) positioned in the sliding mechanism. The projection may be arranged to engage with each of the plurality of locking regions as the deadbolt arm is moved in a locking direction. As the projection mates with each of the plurality of locking regions, the engaged locking region may substantially redirect any external force applied on the deadbolt head in a direction that prevents movement of the deadbolt arm in an unlocking direction. According to this embodiment, the plurality locking regions may allow the external force to be transferred to a door or other support location through the deadbolt arm, such that the deadbolt head remains extended the door remains secure. In some embodiments, the deadbolt arm may be moved in an unlocking direction independent of the deadbolt head to disengage the projection from the plurality of locking regions such that the deadbolt arm may be moved in the unlocking direction to retract the deadbolt. Thus, the deadbolt may be operable from the deadbolt arm, while still providing progressive deadlatching that resists external force applied to the deadbolt head. Of course, the progressive deadlatching arrangement and deadbolt arm may be employed in any suitable arrangements such that the deadbolt arm engages one of the plurality locking regions to prevent unauthorized retraction of the deadbolt head.

According to yet another embodiment, the progressive deadlatching arrangement may include a cam block located in a slot of a sliding mechanism. A deadbolt arm may include a projection positioned in a sliding mechanism adjacent to the cam block. The cam block may include a notch, and the projection may be located adjacent the notch such that the projection is located between the cam block and a side of the slot. According to this embodiment, movement of the deadbolt arm in the locking direction may move the cam block in the slot as a deadbolt head is extended. Additionally, the deadbolt arm may be moved in the unlocking direction to move the cam block in the cam slot as the deadbolt head is retracted, during which the projection of the deadbolt arm contacts the notch of the cam block and moves out of contact with the side of the slot. In this arrangement, when any external force is applied on the dead bolt head that may cause the deadbolt head to retract, the cam block may move the projection into contact with both the side of the slot and the notch of the cam block, such that the deadbolt arm is prevented from being moved in the unlocking direction. That is, the external force may cause a wedging action where the projection moves between the side of the slot and the cam block such that resistive forces (i.e., frictional and normal forces) are generated by the slot and cam block to prevent the deadbolt arm from moving further in the unlocking direction. Thus, the deadbolt head is unable to retract without movement of the deadbolt arm independent of the deadbolt head in the unlocking direction. In some embodiments, the deadbolt arm may be moved in a locking direction independent of the deadbolt head such that the projection is moved out of contact with at least one of the cam block and side of the cam slot. Following the movement of the projection out of the wedge, the deadbolt arm may then be moved in unlocking direction such that the projection is brought into contact with the cam block to retract the deadbolt without causing a wedging action. Without wishing to be bound by theory, such an arrangement may not have discrete locking regions, and as such may provide an infinite amount of locking regions from the retracted position to and including the fully extended position at which the dead bolt head is substantially prevented from being retracted.

In some embodiments, a deadbolt system may include a deadbolt position sensor constructed and arranged to sense the deadlatching displacement of a deadbolt head and/or deadbolt arm from at least one locking region of a deadlatching arrangement. The deadbolt system may also include a controller constructed and arranged to cooperate with the deadbolt position sensor to detect one or more security states based at least partly on the deadlatching displacement. Without wishing to be bound by theory, the position of the deadbolt head and/or deadbolt arm relative to the at least one locking region may affect the security of the deadbolt system. For example, if the deadbolt head is partially extended to secure an associated access point, but the at least one locking region is not engaged with the deadbolt head or deadbolt arm, the deadbolt system may only be in a partially secured state. In the partially secured state, the deadbolt system may secure the associated access point, but may not prevent an external force applied on the deadbolt head from moving the deadbolt head to the retracted position. In another example, if the deadbolt head is partially extended past a position that would cause the at least one locking region to engage the deadbolt head or deadbolt arm, the deadbolt may be in a secured state. That is, in the secured state the deadbolt system may secure the associated access point and prevent an external force applied to the deadbolt head from moving the deadbolt head to the retracted position. Thus, the deadbolt head displacement and/or deadbolt arm from the at least one locking region may correspond to a particular security state of the deadbolt system. Accordingly, by detecting the one or more security states based at least partly on the deadlatching displacement, action may be taken by a user to improve the security of the deadbolt system and therefore improve the security of an associated access point.

According to yet another embodiment, an access point (e.g., a door) may include a deadbolt system having a deadbolt system. The deadbolt system may include a deadbolt head, a deadbolt arm, deadbolt position sensor, and a deadlatching arrangement. The door may be constructed and arranged to support the deadbolt system in any suitable form factor, such that the door may be secured by the deadbolt system when the deadbolt head is in an extended position. In some embodiments, the deadbolt system may be mounted in a chassis of the deadbolt system. In some embodiments, the deadbolt system may be configured as a mortise lock. According to this embodiment, the door may have a pocket cut in to the edge of the door that mates with an associated door jamb, such that the chassis can be inserted into the pocket and be rigidly attached to the door. In other embodiments, the deadbolt system may be mounted in a cylindrical deadbolt system or a tubular chassis deadbolt system, such that the deadbolt system may be mounted in a corresponding cylindrically bored hole in the door. Of course, the deadbolt system may be mounted in any suitable lock or latch assembly such that it can be mounted in the door and the access point can be secured by the deadbolt head.

It should be appreciated that any features described with respect to an embodiment may be included with the features described with respect to another embodiment. Therefore, aspect described herein should not be construed as being limited to a specific embodiment. Thus, for example, the deadbolt system incorporating the feature of a performance inhibitor detection may be employed with the progressive dead latching feature. Similarly, the deadbolt system incorporating the feature of a performance inhibitor detection may also or instead be employed with the feature of determining whether the deadbolt is engaged in the recess. Also, the system incorporating the feature of a performance inhibitor detection may also or instead be employed with the feature of detecting deadbolt position.

Figure 1B:
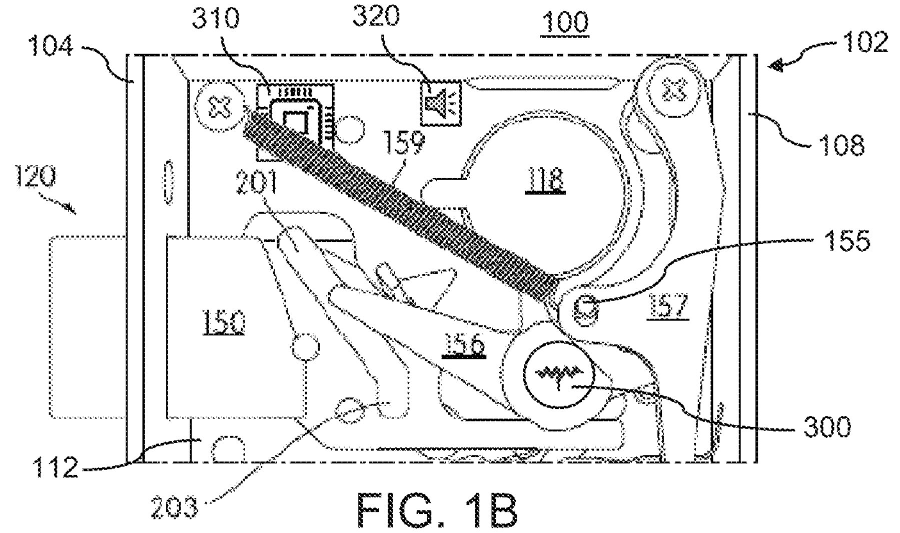
Figure 1C:
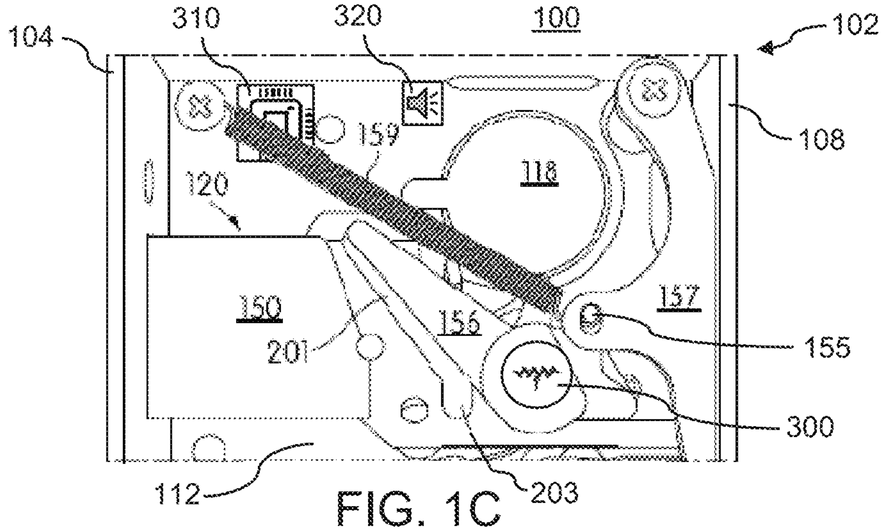

Now turning to the figures, FIGS. 1A-1C depict side views of an embodiment of a deadbolt system 100 including a deadbolt system 120 with a deadbolt position sensor 300. According to this embodiment the deadbolt system 120 is mounted in a chassis 102 of a mortise deadbolt system 100 for a door including a front plate 104, back plate 108, and side plates 112 (one side plate is omitted to expose the deadbolt). The deadbolt system 120 includes a deadbolt head 150, a sliding mechanism 152, and a deadbolt arm 156. The sliding mechanism 152 is connected to the deadbolt head 150 and is arranged to move with the deadbolt head in an extending direction (i.e., out of the lock) and a retracting direction (i.e., into the lock). That is, in the extended position the deadbolt head substantially projects out of the lock or an associated door, and in a retracted position the deadbolt, head is substantially contained by the lock or associated door. The sliding mechanism also includes a cam slot 201 by which the deadbolt arm is operatively coupled to the sliding mechanism. The deadbolt arm includes a projection (e.g., a pin) that projects into the cam slot 201, thereby operatively coupling the deadbolt arm to the sliding mechanism.

According to the present embodiment, the deadbolt arm 156 may be rotated in a locking direction (i.e., counterclockwise direction) to move the deadbolt head 150 in the extending direction. Additionally, the deadbolt arm may be rotated in an unlocking direction (i.e., clockwise direction) to move the deadbolt in the retracting direction. Of course, the locking and unlocking directions may be any suitable directions such that moving the deadbolt arm in the locking direction moves the deadbolt head in the extending direction and moving the deadbolt arm in the unlocking direction moves the deadbolt head in the retracting direction. As the deadbolt arm is moved, the projection (not shown in the figure) constructed and arranged to contact at least one side of the sliding mechanism 152 to create a camming motion that moves the deadbolt head in the extending or the retracting direction. As shown in the figure, the cam slot 201 is inclined, such that the contact between the projection and the cam slot creates longitudinal motion of the sliding mechanism and deadbolt head (i.e. in the extending or retracting direction). Accordingly, when the deadbolt arm rotates in a locking direction, the projection abuts and moves down along the cam slot to move the deadbolt head in an extending direction. Similarly, when the deadbolt arm rotates in an unlocking direction, the projection abuts and moves up along the cam slot to move the deadbolt head in a retraction direction. Of course, any suitable arrangement of the deadbolt arm and sliding mechanism may be employed such that moving the deadbolt arm in a locking direction extends the deadbolt head, and moving the deadbolt arm in an unlocking direction retracts the deadbolt head.

As depicted in FIGS. 1A-1C, the deadbolt system 120 includes a deadbolt position sensor 300 constructed and configured as a potentiometer. The deadbolt position sensor is connected to the deadbolt arm 156, and is configured to detect the angle of the deadbolt arm. Accordingly, the angle of the deadbolt arm may be used to determine a deadbolt head displacement from the extended position and/or retracted position. Without wishing to be bound by theory, the angle of the deadbolt arm may be converted into a linear displacement of the deadbolt from the extended position by using the known shape of the cam slot 201 disposed in the sliding mechanism 152. That is, the deadbolt position sensor may precisely sense the position of the deadbolt head relative to the extended or retracted position based on the angle of the deadbolt arm. In some embodiments, the deadbolt position sensor may determine a substantially exact position of the deadbolt head. In other embodiments the deadbolt head displacement may be based on one of a plurality of position ranges in which the deadbolt head is located. For example, each position range may correspond to a plurality of positions associated with the extended position, retracted position, or partially extended position. That is, the deadbolt position sensor may determine the position of the deadbolt head falls within one of a plurality of position ranges, such that the sensed deadbolt head displacement is based on the position range corresponding to the deadbolt head position. According to this embodiment, the deadbolt position sensor may be less susceptible to noise without significant loss of information relevant to the security of the deadbolt system.

As shown in present embodiment, the deadbolt system 120 also includes a controller 310 which cooperates with the deadbolt position sensor 300. The controller receives displacement information from the deadbolt position sensor, and uses that information to detect one or more security states. The one or more security states are based on the deadbolt head displacement from either the extended position or the retracted position. In the present embodiment, the controller detects a secured state when the deadbolt head is in an extended position. When the deadbolt head is between the extended position and the retracted position, the controller detects a partially secured state. When the dead bolt head is in the retracted position, the controller detects an unsecured state.

As shown in FIGS. 1A-1C, the deadbolt system 120 also includes an indicator 320 which cooperates with the controller and is constructed and arranged as a speaker which audibly indicates the one or more security states. In some embodiments, the speaker may emit one or more a pre-recorded audio signals. The pre-recorded audio signal may be any suitable auditory signal which indicates the one or more security states to a user. For example, the audio file may include a musical chime which indicates the one or more security states. As another example, the audio signal may include a voice announcing the one or more security states to a user. In some embodiments, the speaker may emit a pattern of beeps to indicate the one or more security states.

Of course, the indicator may be any suitable visual, auditory, or haptic indicator which indicates the one or more security states to a user.

As depicted in the present embodiment, the deadbolt system 120 includes a non-progressive deadlatching arrangement configured here as a lower cam slot 203 disposed in sliding mechanism 152 and in communication with cam slot 201. As shown in the figures, the lower cam slot is vertically oriented, such that any normal force provided by the lower cam slot is in a substantially horizontal direction (i.e., in the extending direction or retracting direction). Thus, when the projection of the deadbolt arm is lowered into the lower cam slot as the deadbolt head 150 is extended (see FIG. 1A), the lower cam slot prevents force on the deadbolt head from moving the deadbolt arm in an unlocking direction. That is, any externally applied force on the deadbolt head is transmitted horizontally to the deadbolt arm, such that no force is transmitted by the lower dead bolt slot in a direction that may move the deadbolt arm in an unlocking direction. Accordingly, such an arrangement will substantially prevent any external force from retracting the deadbolt head or otherwise unlocking an associated door when the deadbolt is fully extended. In this embodiment, the deadbolt arm is rotated to a locked position for deadlatching, such that the deadbolt head is fully extended and the projection is in the lower deadbolt slot. In this position, the deadbolt position sensor 300 may sense the deadbolt head displacement from the extended position to be approximately zero. Accordingly, the controller 310 may detect a secured state associated with the deadbolt head being engaged in the deadlatching arrangement. In positions where the deadbolt arm is not in the locked position (i.e., the projection is not in lower cam slot 203) and the deadbolt head is partially extended, external force may be able to retract from external force on the deadbolt head, thereby compromising the overall security of the deadbolt. Accordingly, the deadbolt position sensor may detect non-zero deadbolt head displacement from both the extended position and retracted position. In this case, the controller may detect a partially secure state associated with the deadbolt head being in a partially extended position but not engaged with the deadlatching arrangement.

In some embodiments, the deadbolt system 100 may include a deadbolt backstop 157 and a deadbolt biasing member 159. The deadbolt backstop 157 may be coupled to deadbolt arm 156 by pin 155, such that the deadbolt backstop moves with the deadbolt arm. The deadbolt backstop may be coupled to a latch bolt or other lock component (not shown in the figure), such that actuation of the other lock component may cause deadbolt arm 156 to be correspondingly actuated. The deadbolt biasing member 159 may be constructed and arranged to bias the deadbolt arm in either the locking or unlocking direction. In the depicted embodiment, the biasing member biases the deadbolt arm toward the locking direction. In some embodiments, the biasing member may assist the actuator coupled to the deadbolt arm, such that the force applied by the actuator to move the deadbolt arm in the biased direction is reduced. In other embodiments, the biasing member may automatically move the dead bolt arm in the biased direction, such that the deadbolt head 150 is correspondingly moved in the extending or retracting direction. According to this embodiment, an actuator coupled to the deadbolt arm may hold the deadbolt arm in place to resist the biasing force of the biasing member, such that authentication of a valid credential at the authentication device releases the deadbolt arm to be moved by the biasing member. Of course, any suitable arrangement of the deadbolt biasing member may be employed such that the deadbolt arm is biased toward either the locking direction or unlocking direction.

FIG. 1C depicts a deadbolt system 120 in a retracted position. In the retracted position, the deadbolt head 150 is contained within the lock, such that the dead bolt head is substantially inside of (i.e., not projecting out of) front plate 104. As shown in the figure, deadbolt arm 156 is moved to an unlocked position, such that a projection of the deadbolt arm is located in an upper portion of cam slot 201. In this position, the deadbolt position sensor 300 senses approximately zero deadbolt head displacement from the retracted position. Accordingly, the controller 310 detects an unsecured state and the indicator 320 indicates the unsecured state to a user. From this position, the deadbolt arm may be rotated in a locking direction such that the projection of the deadbolt arm abuts the cam slot and moves the deadbolt head toward the extended position as shown in FIG. 1A.

FIG. 1B depicts a deadbolt system 120 in a partially extended position, in this example, midway between an extended position and a retracted position. In this position, the deadbolt head 150 partially projects out of front plate 104 and deadbolt arm 156 is between a locked position and an unlocked position. The deadbolt arm has been moved in the locking direction in comparison to FIG. 1C, and as a result deadbolt head 150 has been partially extended. Accordingly, in this position the deadbolt head 150 would at least partially enter a strike plate or other locking surface adjacent an associated door, thereby securing the associated door. A projection of deadbolt arm 156 is operatively coupled to cam slot 201 and lower cam slot 203 of sliding mechanism 152, such that moving the deadbolt arm in the locking direction causes the projection to abut an inclined side of the cam slot to move the deadbolt head toward the extended position. That is, moving the projection in the cam slot creates a camming motion which extended or retracts the deadbolt head. In the position shown in FIG. 1B, the deadlatching arrangement (i.e., lower cam slot 203) may not prevent the deadbolt head from retracting in response to external force applied to the deadbolt head. Accordingly, the deadbolt arm may be moved in the unlocking direction by the sliding mechanism if an external force is received by the deadbolt head if the projection is not located in lower cam slot 203. Thus, even though the deadbolt arm was moved in the locking direction to extend the deadbolt, the depicted deadlatching arrangement does not substantially prevent any external force applied on the deadbolt head from moving the deadbolt toward the retracted position when the deadbolt is not in the extended position. In this position, the deadbolt position sensor 300 senses a non-zero deadbolt head displacement from both the extended position and the retracted position. Accordingly, the controller 310 detects a partially secured state and the indicator 320 indicates the partially secured state to a user.

FIG. 1A depicts a deadbolt system 120 in an extended position. In this position, a deadbolt head 150 is in the extended position, with the deadbolt head projecting out of front plate 104. According to this embodiment, the deadbolt head 150 would enter a strike plate or other locking surface adjacent an associated door, thereby securing the associated door. As shown in the figure, deadbolt arm 156 is in a locked position, with a projection of the deadbolt arm positioned in lower cam slot 203 of a sliding mechanism 152. As discussed above, the lower cam slot substantially prevents the deadbolt arm from moving in an unlocking direction in response to any external force applied to the deadbolt head. In this position, the deadbolt position sensor 300 senses an approximately zero deadbolt head displacement from the extended position. Accordingly, the controller 310 detects a secured state and the indicator 320 indicates the secured state to a user. The deadbolt head remains in the extended position until the deadbolt arm 156 is moved in an unlocking direction by an authentication device 163 and/or actuator 158. Accordingly, the deadlatching arrangement (i.e., lower cam slot 203) does not prevent the deadbolt arm from moving in the unlocking direction, but does prevent movement of the deadbolt head and/or sliding mechanism from moving the deadbolt arm in the unlocking direction. However, in the depicted embodiment, the lower cam slot only prevents the deadbolt from retracting when the dead bolt head is in the extended position and the deadbolt arm is in the locked position. Accordingly, a partially extended deadbolt (see FIG. 1B) which may otherwise secure the door may be retracted by an external force applied on the deadbolt head, reducing the security of the deadbolt.

Figure 2A:
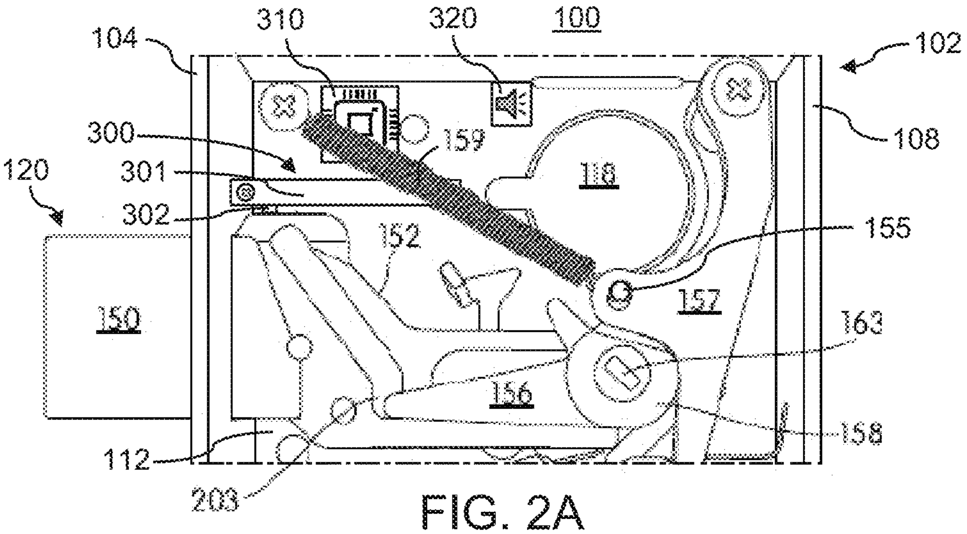
FIGS. 2A-2C depict side views of another embodiment of a portion of a deadbolt system incorporating a deadbolt position sensor.
Figure 2B:
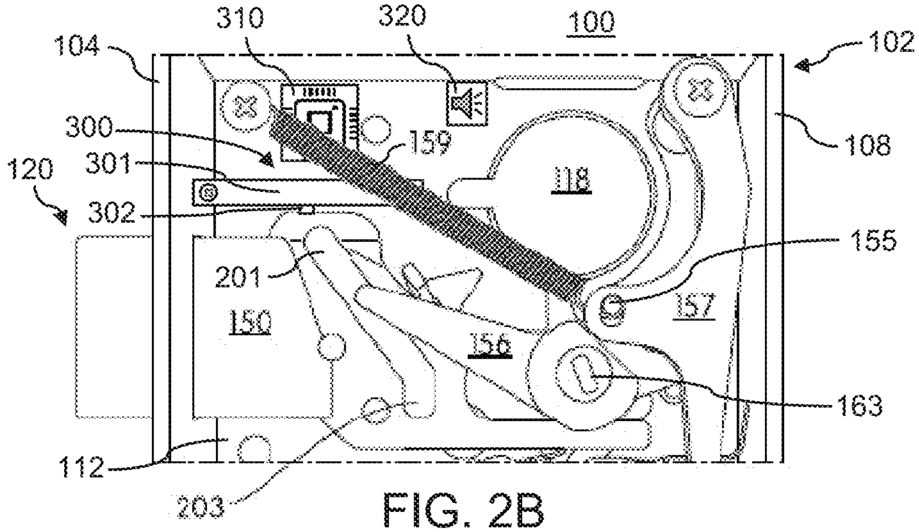
Figure 2C:
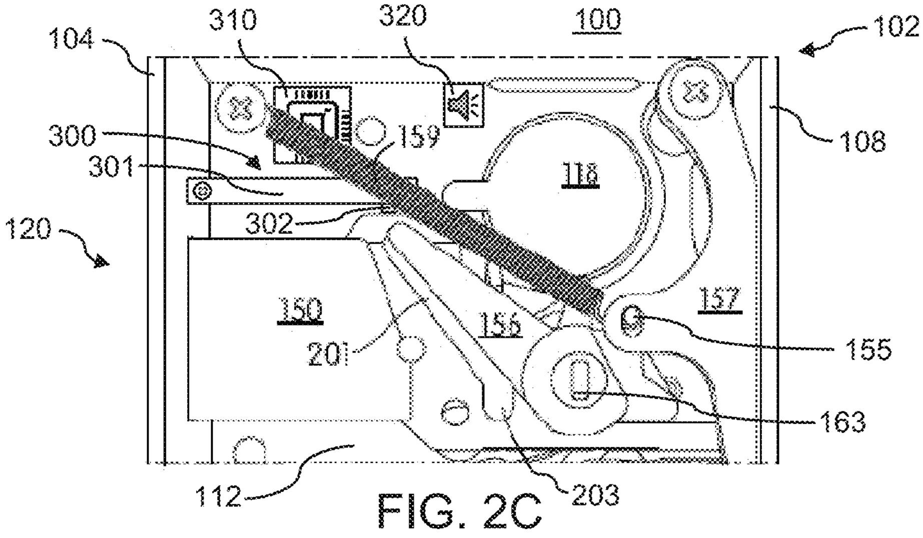

FIGS. 2A-2C depict side views of another embodiment of a portion of a deadbolt system 100 incorporating a deadbolt position sensor 300. In this embodiment, the deadbolt system 120 is mounted in a chassis 102 of a mortise deadbolt system 100 for a door including a front plate 104, back plate 108, and side plates 112 (one side plate is omitted to expose the deadbolt). The deadbolt system 120 includes a deadbolt head 150, a sliding mechanism 152, and a deadbolt arm 156. Similar to the embodiment depicted in FIGS. 1A-1C, the deadbolt system of the embodiment shown in FIGS. 2A-2C includes a sliding mechanism 152 with a cam slot 201, such that rotating the deadbolt arm in a locking direction extends the deadbolt head and rotating the deadbolt arm in an unlocking direction retracts the deadbolt arm. The deadbolt position sensor senses the deadbolt head displacement from a retracted position and/or an extended position. According to the present embodiment, the deadbolt system 120 includes a controller 310 to detect one or more security states based on the displacement and an indicator 320 to indicate the one or more security states to a user.

In the depicted embodiment, the deadbolt position sensor 300 is constructed and arranged as a sliding potentiometer. The sliding potentiometer includes a sensor body 301 and a slider 302, the slider mounted partially within the sensor body and constructed and arranged to translate in a linear direction. The slider is rigidly coupled to the sliding mechanism 152, such that the slider translates with the deadbolt head 150 as the deadbolt head is moved between the retracted and extended positions. Without wishing to be bound by theory, the sliding potentiometer may sense the deadbolt head displacement by outputting an analog signal corresponding to a particular position of the slider along the body 301. Thus, the difference in analog signal between any position of the slider and the position of the slider in the retracted position and/or extended position may be used as a measurement of the deadbolt head displacement. Of course, the slider may be connected to any suitable member of the deadbolt system such that a deadbolt head displacement may be sensed. Additionally, the sliding potentiometer may output any suitable signal, analog or digital, that indicates a deadbolt head displacement from the retracted and/or extended position.

As shown in the figure, the deadbolt system 100 includes an authentication device constructed and arranged here as a key slot 163 which cooperates with deadbolt arm 156 to move the deadbolt arm in the locking or unlocking direction. The deadbolt also includes an actuator 158 operatively connected to the key slot and the deadbolt arm. According to this embodiment, the key slot is arranged to receive a key (not shown in the figure) by which an authorized user may move the actuator which transfers to the motion of the key to the deadbolt arm to move the deadbolt arm in a locking or unlocking direction. That is, an authorized user with a key may rotate the key in the key slot 163 to move the deadbolt arm 156 in a locking or unlocking direction, thereby moving the deadbolt head to an extended or retracted position respectively. The actuator 158 may not be accessible to a user without the key, thereby substantially preventing actuation of the deadbolt arm by an unauthorized user (i.e., a user without a key). According to the present embodiment, the authentication device may include a potentiometer, push button, proximity sensor, or any other suitable sensor (not shown in the figure) for detecting a valid key in the key slot. Accordingly, the authentication device may output one or more authentication states based on the entry of a valid key in the key slot. In some embodiments, the authentication device may detect whether a key slot 163 is turned directly by the key or by an external force. In the case the key slot is turned by an external force (i.e., without a key) the authentication device may output an unauthorized state. In the case the key slot is turned by a valid key, the authentication device may output an authorized state.

In some embodiments, the actuator may be constructed and arranged to be accessible on a secured side (e.g., interior side) of an associated door, such that an authorized user may move the deadbolt arm from the secured space without a key. Thus, operation of the deadbolt arm may be simplified while still preventing an authorized user from moving the deadbolt arm from an unsecured side (e.g., exterior side) of the associated door. In this embodiment, the actuator may be constructed and arranged as a lever, thumb turn, handle, or any other suitable structure such that the deadbolt arm can be moved by the authorized user. According to this embodiment, the authentication device may output an authorized state when any suitable sensor detects movement of the actuator on the secured side of the associated door. Of course, the actuator may also be inaccessible from both the secured and unsecured sides of the associated door without a valid credential, such that the actuator may only be actuated when the authentication device receives a valid credential (e.g., a key). Of course, any suitable combination of actuator and authentication device may be employed, such that the deadbolt arm may be moved in a locking direction or an unlocking direction by an authorized user while substantially preventing movement of the deadbolt arm by an unauthorized user.

In some embodiments, the controller 310 may detect one or more security states based on the deadbolt head displacement and the authentication state. For example, if the authentication device outputs an unauthorized state and the deadbolt position sensor 300 senses a changing deadbolt head displacement, the controller may detect an intrusion state. That is, movement of the deadbolt head without entry of a valid credential may be associated with an attempt to circumvent or defeat the deadbolt system to gain access to a secured space. As another example, if the authentication device outputs an authorized state and the deadbolt position sensor senses an increasing deadbolt head displacement from the extended position, the controller may detect an unlocking state. That is, movement of the dead bolt head toward the retracted position with the entry of a valid credential at the authentication device may be considered an authorized action and therefore cause the controller to detect the unlocking state. As yet another example, if the authentication device outputs and authorized state and the dead bolt position sensor detects a decreasing deadbolt head displacement from the extended position, the controller may detect a locking state. That is, movement of the deadbolt head toward the extended position with the entry of a valid credential at the authentication device may be considered an authorized action and therefore cause the controller to detect the locking state. Of course, the controller may detect any security state from any combination of deadbolt head displacement and authentication state, as the present disclosure is not so limited.

In some embodiments, the indicator 320 may indicate the one or more security states detected by the controller 310 to an authorized user. According to this embodiment, the indicator may emit an indication of the one or more security states detected by the controller only when the authentication device outputs an authorized state. Thus, any unauthorized user may remain unaware of any security vulnerabilities which may be exploited. In some embodiments, the indicator may indicate the one or more authentication states to any user (i.e., authorized or unauthorized). Such an arrangement may simplify operation of the deadbolt system 120 by allowing a user to confirm whether a valid credential has been received. Thus, an authorized user may be prompted by the indicator to retry the credential such that they can unlock an associated door. The indicator may emit an auditory, visual, or haptic indication of the authentication state to a user. In the embodiment depicted in FIGS. 2A-2C, the indicator may emit an auditory tone to indicate an authorized state so that an authorized user may know when to operate the deadbolt arm 156 to extend or retract the deadbolt head 150. Of course, the indicator may indicate any desirable combination of security states and authentication states to any combination of authorized and unauthorized users, as the present disclosure is not so limited.

Figure 3A:
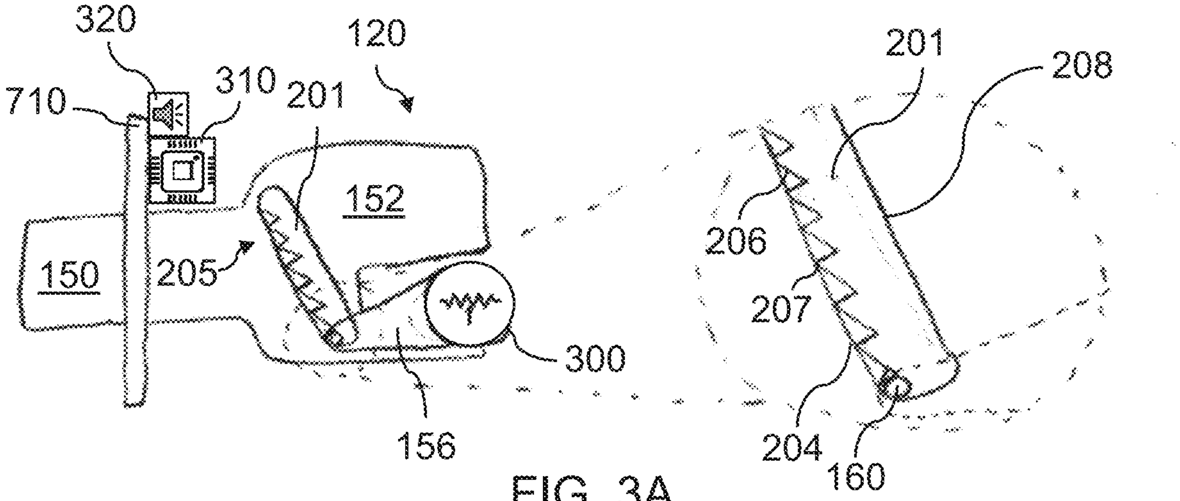
FIGS. 3A-3B depict side views of one embodiment of a deadbolt incorporating a progressive deadlatching arrangement.
Figure 3B:
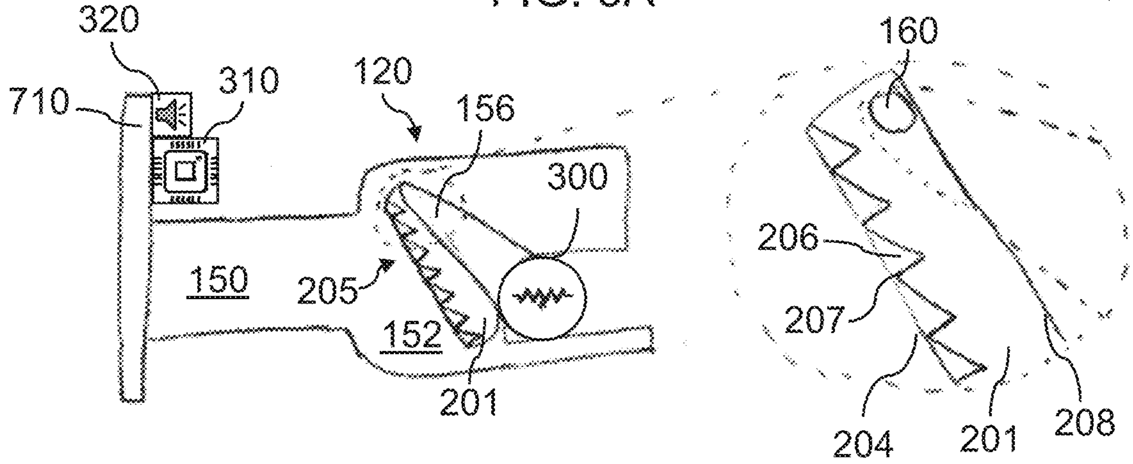

FIGS. 3A-3B depict an embodiment of a deadbolt system 120 with a progressive deadlatching arrangement and a deadbolt position sensor 300. In the depicted embodiment, the deadbolt is positioned in a door with side 710 (see FIGS. 6A and 6B) which is arranged to adjoin a door jamb with a strike plate (not shown in the figures) when the door is closed. The deadbolt includes a deadbolt head 150, sliding mechanism 152, and a deadbolt arm 156 which cooperate to move the deadbolt head 150 between an extended position and a retracted position. In the depicted embodiment, the sliding mechanism includes a cam slot 201 and the deadlatching arrangement is configured as a plurality of ratchet teeth 205 disposed on a first side 204 of the cam slot. The deadbolt arm includes a projection 160, which projects through the cam slot. The projection is constructed and arranged to contact the first side to move the deadbolt head in the extending direction and a second side 208 to move the deadbolt head in the retracting direction.

According to the depicted embodiment, the deadbolt position sensor 300 is connected to the deadbolt arm and constructed and arranged to sense a deadbolt head displacement from the retracted position or the extended position by measuring the change in angle of the deadbolt arm from a locked position or an unlocked position. That is, the angle of the deadbolt arm as it is moved between the locked and unlocked positions corresponds to a position of the deadbolt head, which may be used to sense the deadbolt head displacement from either the retracted position or extended position. The deadbolt system further includes a controller 310 configured to detect one or more security states based on the deadbolt head displacement and an indicator 320 configured to indicate the one or more security states to a user. The deadbolt system also includes an authentication device 163 embodied here as a key slot, and an actuator 158, each of which is disposed on the deadbolt arm 156. An authorized user may insert a key into the key slot, and rotate the key or actuator 158 to correspondingly rotate the deadbolt arm in the locking or unlocking direction. The authentication device may cooperate with the controller and include any suitable sensor to detect the entry of a valid credential (e.g., a key) such that the authentication device may output one or more authentication states to the controller.

According to the present embodiment, the deadbolt system 120 includes a deadlatching arrangement configured as a plurality of ratchet teeth 205. Each ratchet tooth includes an inclined tooth portion 206 and a locking region 207. In the present embodiment, the ratchet teeth are integrally formed as a part of first side 204 of cam slot 201. Of course, the ratchet teeth 205 may be attached to the cam slot 201 by any suitable method, including but not limited to fasteners or adhesives. In the depicted embodiment, as the deadbolt arm is rotated by the authentication device 163 and/or actuator 158 in a locking direction, projection 160 abuts the ratchet teeth and slides over the inclined tooth portions as it moves along first side 204 to move deadbolt head 150 toward the extended position. As the projection moves down the first side of the cam slot, the projection acts as a pawl, which engages one of the plurality locking regions 207 as the deadbolt head is extended from the fully retracted position. That is, as the projection moves down the first side of the cam slot, the projection engages each locking region consecutively until the deadbolt arm reaches the locked position and the deadbolt head is in the fully extended position. Without wishing to be bound by theory, the plurality of locking regions 207 prevent the projection from moving in an unlocking direction while the projection is contacting the first side of the cam slot. Accordingly, as the deadbolt head is extended, it is progressively deadlatched to prevent any external force on the deadbolt head from moving the deadbolt arm in the unlocking direction. That is, any external force applied to the deadbolt head will be transmitted to the projection of the deadbolt along the first side of the cam slot, and therefore any external force is substantially prevented from moving the deadbolt arm in the unlocking direction and thus moving the deadbolt toward the retracted position. Accordingly, as the deadbolt arm is moved down the first side of the cam slot the ratchet teeth will provide progressive deadlatching, such that the deadbolt head does not need to be fully extended to have the benefits of deadlatching. Accordingly, even if a user partially extends the deadbolt head, the deadbolt will remain secure from external forces, thereby increasing the security of an associated door.

In the depicted embodiment, an authorized user may use the authentication device 163 constructed and arranged as a key slot to move the deadbolt arm in the locking or unlocking direction. In this embodiment, the reception of a valid credential at the authentication device grants an authorized user access to move the deadbolt arm in the locking or unlocking direction. Accordingly, an authorized used may insert a key in the key slot 162 and rotate the deadbolt arm in the locking direction, thereby engaging first side 204 of cam slot 201 and progressively engaging the plurality of locking regions 207 of the ratchet teeth 205. As shown in FIGS. 3A and 3B, the ratchet teeth are sufficiently large to engage the projection 160, but are small enough such that the projection does not contact the ratchet teeth when the projection contacts a second side 208 of the cam slot 201. That is, when the projection contacts the second side 208, the projection is able to move up along the second side of the cam slot as the deadbolt arm moves in the unlocking direction, thereby retracting the deadbolt head without interference from the ratchet teeth 205. According to this arrangement, a user may rotate the deadbolt arm in the unlocking direction using the authentication device 163 and/or actuator 155 to move the projection to the second side of the cam slot, thereby releasing the projection the plurality of locking regions of the ratchet teeth. The deadbolt arm may then be rotated in the unlocking direction as the projection moves along the second side of the cam slot until the deadbolt head is in the retracted position. In some cases, the deadbolt arm may be moved out of contact with the first side 204 while the deadbolt head is partially extended. In this case, external force applied on the deadbolt head may partially retract the deadbolt until the projection moves into contact with the first side, and consequently engages one of the plurality of locking regions 207. Thus, even if an authorized user rotates the deadbolt arm partially in the unlocking direction, the ratchet teeth 205 may substantially prevent the deadbolt head from moving to the retracted position. Accordingly, security of an associated door which includes the deadbolt is improved.

In the depicted embodiment, the locking regions 207 are discrete in that the quantity of locking regions is equivalent to the number of ratchet teeth 205. As discussed above, the deadlatching arrangement will provide deadlatching at one of the locking regions 207 such that the deadbolt head cannot be retracted by external force applied to the deadbolt head. In some cases, the deadbolt arm 156 may be in a position between the locked and unlocked positions where the projection 160 is contacting the first side 204 at a point that is not a locking region 207 (i.e., along inclined tooth portion 206). In this case, an external force provided on the deadbolt head may move the projection along the first side until the projection engages the next (i.e., nearest in the direction of motion of the projection) locking region positioned along the length of the first side 204 of the cam slot 201. Accordingly, when the projection engages the next locking region, the deadbolt head 150 will be prevented from further retraction, thereby providing deadlatching for the deadbolt by preventing substantial retraction of the deadbolt head. Of course, any quantity of discrete locking regions may be employed, such that the discrete locking regions substantially prevent external force on the deadbolt head from moving the deadbolt head to the retracted position.

According to the embodiments shown in FIGS. 3A-3B, the deadbolt position sensor 300 may be constructed and arranged to sense a deadlatching displacement, where the deadlatching displacement is the displacement between the deadbolt head 150 and the plurality of locking regions 207 (i.e., the distance the deadbolt head may travel toward the retracted position before engaging one of the plurality of locking regions). As discussed above, the locking regions 207 are discrete in number and are arranged along a first side 204 of the cam slot 201. In some cases, the deadbolt head 150 may be partially extended such that an associated door is secured, but none of the plurality of locking regions engage the deadbolt arm 156 to prevent retraction of the deadbolt. For example, if the plurality of locking regions 207 are arranged to prevent retraction of the deadbolt head from external force subsequent to the deadbolt head reaching one quarter extension, any deadbolt extension of less than one quarter may secure the door but leave the deadbolt system vulnerable to external forces applied to the deadbolt head. Accordingly, in some embodiments, the controller 310 may detect the one or more security states at least partly on the deadbolt head displacement sensed by the deadbolt position sensor. In the case the deadbolt head is partially extended but the plurality of locking regions are not engaged, the controller may detect a partially secured state. Additionally, the deadlatching displacement may be used to determine the distance the deadbolt head is able to be retracted by an external force applied to the deadbolt head. Accordingly, the controller may detect an intrusion state if the deadlatching displacement changes from a non-zero value to approximately zero, as such a change may indicate an external force was applied to the deadbolt head to engage a locking region. Of course, the controller may use any combination of deadbolt head displacement and deadlatching displacement to determine the one or more security states.

FIG. 3A depicts an embodiment of the deadbolt system 120 in the fully extended position. As shown FIG. 3A, deadbolt arm 156 is in the locked position, with the projection 160 located in a lower portion of cam slot 201 of the sliding mechanism 152. The projection is contacting a first side 204 of the cam slot, and engaging one of a plurality of locking regions 207 of the ratchet teeth 205. Accordingly, any external force applied on the deadbolt head 150 is not transmitted to the projection in a way that would move the deadbolt arm in the unlocking direction. That is, the locking region abuts the projection and prevents such a force from moving the deadbolt arm in the unlocking direction while also preventing the deadbolt head from moving in a retracting direction. In this position, the deadbolt position sensor 300 senses approximately zero deadbolt head displacement from the extended position and the deadbolt head is extended past at least one locking region of the progressive deadlatching arrangement. Accordingly, the controller 310 detects a secured state, and the indicator 320 may indicate the secured state. To move the deadbolt head toward the retracted position, the deadbolt arm is rotated by authentication device 163 and/or actuator 158 in the unlocking direction, thereby moving the projection out of contact with the first side of the cam slot and into contact with the second side 208 of the cam slot. From this position, the deadbolt arm may be moved in the unlocking direction, with the projection moving along the second side of the cam slot to move the deadbolt to the retracted position as shown in FIG. 3B.

FIG. 3B depicts the deadbolt system 120 of FIG. 3A in the retracted position. As shown in the figure, deadbolt arm 156 is in the unlocked position, with the projection 160 of the deadbolt arm in an upper portion of cam slot 201 such that the deadbolt head 150 is substantially within door side 710. The projection is contacting a second side 208 of the cam slot, such that the projection is not contacting any of the plurality of ratchet teeth 205. In this position, the deadbolt position sensor 300 senses approximately zero deadbolt head displacement from the retracted position. Accordingly, the controller 310 detects an unsecured state, and the indicator 320 may indicate the unsecured state. From this position, an authorized user may use the authentication device 163 and/or actuator 158 to rotate the deadbolt arm in the locking direction such that the projection moves out of contact with the second side and into contact with the first side. The projection may then be moved down the first side over the inclined tooth sections 206 of the ratchet teeth such that the dead bolt head is moved toward the extended position and projects out of the door side 710. As the projection moves over the first side the cam slot, the projection engages each of the plurality of the locking regions consecutively.

Figure 4A:
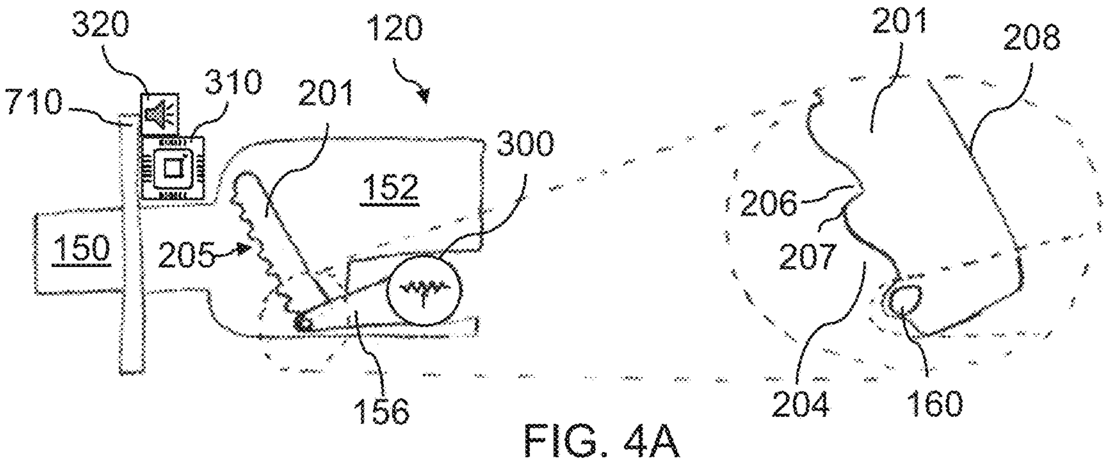
FIGS. 4A-4B depict side views of yet another embodiment of a deadbolt system incorporating a progressive deadlatching arrangement.
Figure 4B:
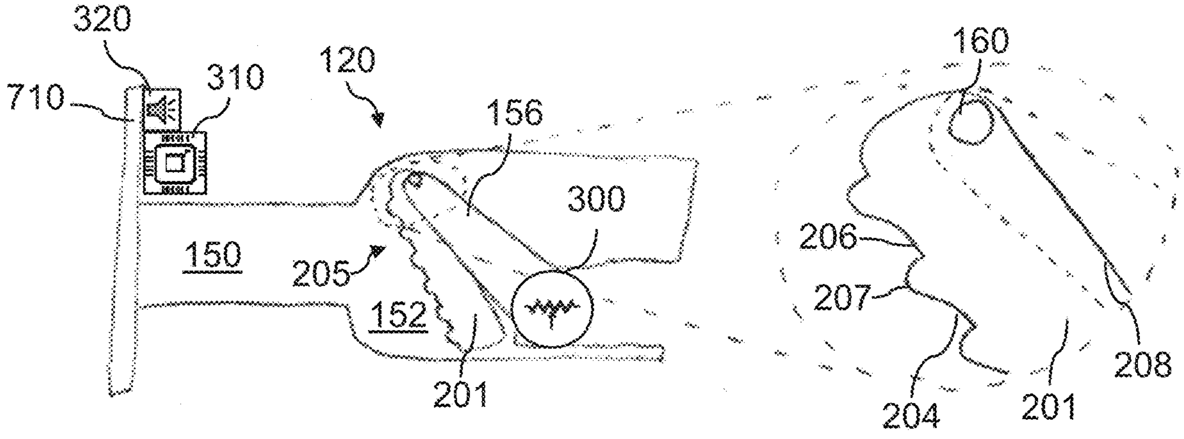

FIGS. 4A-4B depict side views of another embodiment of a dead bolt system 120 with a progressive deadlatching arrangement and a deadbolt position sensor 300. In the depicted embodiment, the deadbolt is mounted in a door with deadbolt head 150 constructed and arranged to project out of door side 710 (see FIGS. 6A and 6B) in the extended position and be substantially within the door side in a retracted position. The deadbolt includes the deadbolt head, sliding mechanism 152, and a deadbolt arm 156 which cooperate to move the deadbolt head 150 between the extended position and the retracted position. In the depicted embodiment, the sliding mechanism includes a cam slot 201 with a first side 204 and a second side 208. The sliding mechanism also includes a progressive deadlatching arrangement configured as a plurality of curved teeth 205 which form the first side 204 of the cam slot. The deadbolt arm includes a projection 160 constructed and arranged to project into the slot 201 and contact the first side 204 of the cam slot to move the dead bolt head toward the extended position. The projection is also constructed and arranged to contact the second side 208 to move the deadbolt head toward the retracted position. In the depicted embodiment, the deadlatching arrangement 205 permits an authorized user to retract deadbolt head 150 by moving deadbolt arm 156.

According to the depicted embodiment, the deadbolt position sensor 300 is connected to the deadbolt arm and constructed and arranged to sense a deadbolt head displacement from the retracted position or the extended position by measuring the change in angle of the deadbolt arm from a locked and an unlocked position. That is, the angle of the deadbolt arm as it is moved between the locked and unlocked positions corresponds to a position of the deadbolt head, which may be used to sense the deadbolt head displacement from either the retracted position or extended position. The deadbolt system further includes a controller 310 configured to detect one or more security states based on the deadbolt head displacement and an indicator 320 configured to indicate the one or more security states to a user. The deadbolt system also includes an authentication device 163 embodied here as a key slot, and an actuator 158, each of which is disposed on the deadbolt arm 156. An authorized user may insert a key into the key slot, and rotate the key or actuator 158 to correspondingly rotate the deadbolt arm in the locking or unlocking direction. The authentication device may cooperate with the controller and include any suitable sensor to detect the entry of a valid credential (e.g., a key) such that the authentication device may output one or more authentication states to the controller.

According to the present embodiment, the deadbolt system 120 includes a progressive deadlatching arrangement embodied as a plurality of curved teeth 205, each curved tooth having a smooth tooth portion 206 and a curvic depression which forms locking region 207. In this embodiment, the plurality of curved teeth is integrally formed with the first side 204 of the cam slot 201. In contrast to the embodiment depicted in FIGS. 3A-3B, the curved teeth are cut out from the first side, such that the locking regions 207 are recessed from first side 204. Further, without wishing to be bound by theory, the curved teeth could provide for a more secure engagement with the projection 160. When the deadbolt arm is rotated by the authentication device 163 and/or actuator 158 in a locking direction, projection 160 of the deadbolt arm 156 abuts the ratchet teeth 205 and slides over the smooth tooth portions 206 as it moves along first side 204 of the cam slot and the curvic depressions to move deadbolt head 150 toward the extended position. As the projection moves down the cam slot, the projection acts as a pawl which engages the locking regions 207 as the deadbolt head is extended. That is, as the projection moves down the first side of the cam slot, the projection engages each locking region consecutively until the deadbolt arm reaches the locked position and the deadbolt head is in the extended position. If the deadbolt head receives an external force that forces the deadbolt head in the retracting direction, one of the plurality of curvic depressions engage the projection 160 to substantially prevent retraction. Without wishing to be bound by theory, the curvic depressions may convert the external force applied to the deadbolt head to a direction along the length of the deadbolt arm, where such a direction may prevent the deadbolt arm from moving in an unlocking direction. Accordingly, the deadbolt is substantially prevented from moving toward the retracted position by the progressive deadlatching arrangement. Such an arrangement may allow the projection to be consistently captured in a locking region and increase the contact area between the projection and the locking region.

In the depicted embodiment, the authentication device 163 may be used in cooperation with the actuator 158 to move the deadbolt arm in an unlocking direction to retract the deadbolt head 150. As shown in the figure, the curvic depressions which form locking regions 207 are recessed in first side 204. Accordingly, when the projection 160 is in contact with second side 208, the projection does not contact the plurality of curved teeth 205. When the deadbolt arm 156 is rotated in the unlocking direction by the authentication device 163 and/or actuator 158, the projection is moved out of contact with the first side and any locking region it may have been positioned in. The projection 160 may then contact the second side and move up the second side to retract the deadbolt head without interference from the curved teeth. In some embodiments, the plurality of curved teeth may have a variety of different curvic depressions varying in depth, curvature, or any other suitable characteristic such that the dead bolt arm may be reliably removed from the curvic depression when moved by the authentication device or actuator. In some other embodiments, an authorized user may partially move the deadbolt arm in the locking direction to move the projection along the first side such that the projection is outside of a locking region (i.e., contacting a smooth tooth section 206). Accordingly, the deadbolt arm may be then easier to move in the unlocking position away from the first side of the cam slot. Without wishing to be bound by theory, such an arrangement may require less force to move the projection from the first side to the second side, or otherwise may be less prone to jams. Of course, any suitable arrangement of teeth in the sliding mechanism may be employed such that the deadbolt is substantially prevented from moving to the retracted position as a result of an external force applied to the deadbolt head.

FIG. 4A depicts an embodiment of the deadbolt system 120 in the extended position. As shown in the figure, deadbolt arm 156 is in the locked position, with the projection 160 located in a lower portion of cam slot 201 of the sliding mechanism 152. The projection is contacting a first side 204 of the cam slot, and engaging one of a plurality of curvic depressions that form locking regions 207 of the curved teeth 205. Accordingly, any external force applied on the deadbolt head is not transmitted to the projection in a way that would move the deadbolt arm in the unlocking direction. That is, the curvic depression abuts the projection 160 and prevents such a force from moving the deadbolt arm in the unlocking direction while also preventing the deadbolt head from moving in a retracting direction. In this position, the deadbolt position sensor 300 senses approximately zero deadbolt head displacement from the extended position and the deadbolt head is extended past at least one locking region of the progressive deadlatching arrangement. Accordingly, the controller 310 detects a secured state, and the indicator 320 may indicate the secured state. To move the deadbolt head toward the retracted position, the deadbolt arm is rotated by authentication device 163 and/or actuator 158 in the unlocking direction, thereby moving the projection out of contact with the first side of the cam slot and into contact with the second side 208 of the cam slot. From this position, the deadbolt arm may be moved in the unlocking direction to retract the deadbolt to the retracted position as shown in FIG. 4B.

FIG. 4B depicts the deadbolt system 120 of FIG. 4A in the retracted position. As shown in the figure, deadbolt arm 156 is in the unlocked position, with the projection 160 of the deadbolt arm in an upper portion of cam slot 201 such that the deadbolt head 150 does not project out of the door side 710. The projection is contacting a second side 208 of the cam slot, such that the projection is not contacting any of the plurality of curved teeth 205. In this position, the deadbolt position sensor 300 senses approximately zero deadbolt head displacement from the retracted position. Accordingly, the controller 310 detects an unsecured state, and the indicator 320 may indicate the unsecured state. From this position, an authorized user may use the authentication device 163 and/or actuator 158 to rotate the deadbolt arm in the locking direction such that the projection moves out of contact with the second side and into contact with the first side. The projection may then be moved down the first side over the smooth tooth sections 206 and curvic depressions such that the deadbolt head is moved toward the extended position and projects out of the door side 710.

Figure 5A:
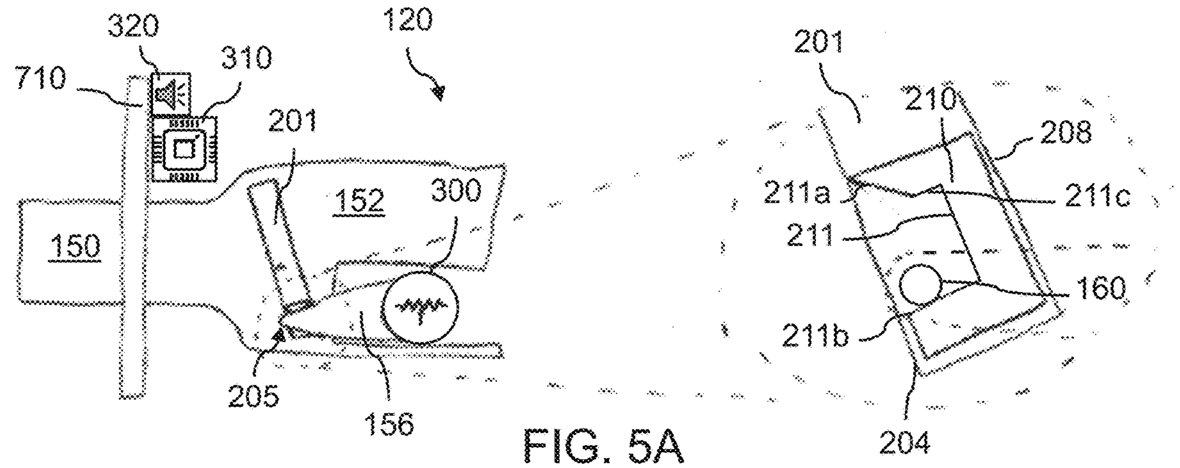
FIGS. 5A-5C depict side views of yet another embodiment of a deadbolt system incorporating a progressive deadlatching arrangement.
Figure 5B:
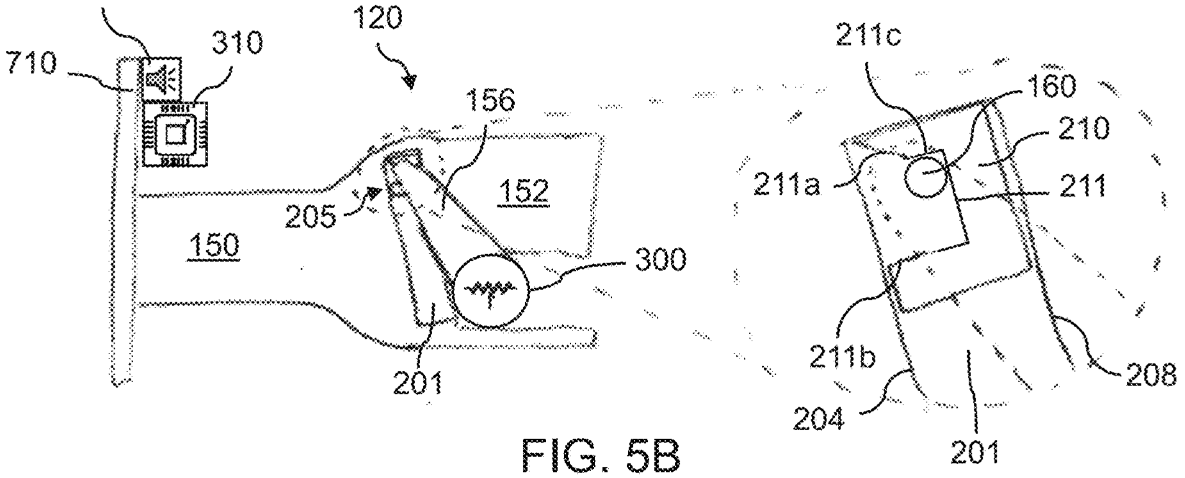
Figure 5C:
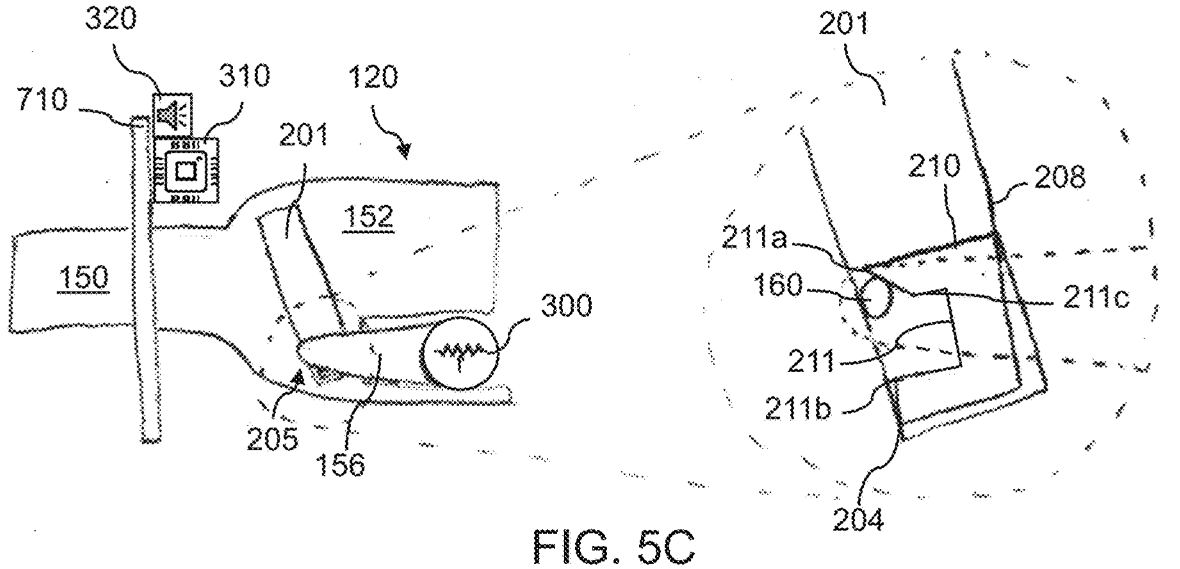

FIGS. 5A-5C depict another embodiment of a deadbolt system 120 with a progressive deadlatching arrangement and a deadbolt position sensor 300. In the depicted embodiment, the deadbolt is mounted in a door, with deadbolt head 150 constructed and arranged to project out of door side 710 (see FIGS. 6A and 6B) in the extended position and be within the door side in a retracted position. The deadbolt includes the deadbolt head, sliding mechanism 152, and a deadbolt arm 156 which cooperate to move the deadbolt head 150 between the extended position and the retracted position. In the depicted embodiment, the sliding mechanism includes a cam slot 201 with a first side 204 and a second side 208. In the depicted embodiment, the deadbolt includes a progressive deadlatching arrangement 205 that includes a cam block 210 and notch 211 disposed on a side of the cam block adjacent the first side of the cam slot. The notch includes an inclined side 211*a*, a flat side 211*b*, and a cutout 211*c*. The deadbolt arm 156 includes a projection 160 positioned inside of the cam slot and in between the notch 211 and first side 204. The projection is constructed and arranged to contact the notch to concurrently move the cam block along the cam slot and move the deadbolt head between the extended and retracted positions. Accordingly, when the deadbolt arm is moved in a locking direction, the projection contacts the first side of the cam slot and flat side 211*b* of the notch to move the cam block along the first side of the cam slot and move the deadbolt head toward the extended position. When the dead bolt arm is moved in an unlocking direction, the projection contacts cutout 211*c* to move the cam block along the second side, thereby creating a camming motion which moves the deadbolt head to the retracted position. In the depicted embodiment, the deadlatching arrangement 205 permits an authorized user to retract deadbolt head 150 by moving deadbolt arm 156.

According to the depicted embodiment, the deadbolt position sensor 300 is connected to the deadbolt arras and constructed and arranged to sense a deadbolt head displacement from the retracted position or the extended position by measuring the change in angle of the deadbolt arm from a locked and an unlocked position. That is, the angle of the deadbolt arm as it is moved between the locked and unlocked positions corresponds to a position of the deadbolt head, which may be used to sense the deadbolt head displacement from either the retracted position or extended position. The deadbolt system further includes a controller 310 configured to detect one or more security states based on the deadbolt head displacement and an indicator 320 configured to indicate the one or more security states to a user. The deadbolt system also includes an authentication device 163 embodied here as a key slot, and an actuator 158, each of which is disposed on the deadbolt arm 156. An authorized user may insert a key into the key slot, and rotate the key or actuator 158 to correspondingly rotate the deadbolt arm in the locking or unlocking direction. The authentication device may cooperate with the controller and include any suitable sensor to detect the entry of a valid credential (e.g., a key) such that the authentication device may output one or more authentication states to the controller.

According to the present embodiment, the cam block 210 and notch 211 substantially prevent an external force on the deadbolt head 150 from moving the deadbolt to a retracted position. As the deadbolt arm 156 is moved in the locking direction, the projection 160 abuts the flat side 211*b* of the notch 211, which moves the cam block along the first side 204 of cam slot 201 while the projection moves the deadbolt head in the extending direction. Once the deadbolt head is at least partially extended (i.e., projecting from the door side 710), any external force on the deadbolt head will be converted to a force on the deadbolt arm which will move the projection partially up the cam slot until it contacts the inclined side 211*a* of the cam block (see FIG. 5C). As the projection moves along the first side of the cam slot to contact the inclined side of the notch, the projection becomes wedged between the inclined side of the notch and the first side of the cam slot. Accordingly, this wedging action between the projection and the cam block causes the cam block abut the first side 204 and the second side 208 of the cam slot, thereby generating significant frictional and normal forces which resist the movement of the cam block and deadbolt arm in the unlocking direction. Without wishing to be bound by theory, the wedging action of the projection between the first side of the cam slot by the inclined side is caused by the angled nature of the inclined side. That is, the inclined side is at any suitable angle such that the force in the unlocking direction provided on the cam block by the deadbolt arm in response to an external force on the deadbolt head is unsuitable to overcome the frictional forces generated by the cam block. Thus, once sufficient frictional force occurs, the deadbolt arm is prevented from moving in the unlocking direction by the cam block. Accordingly, the deadbolt head will be substantially prevented from moving toward the retracted position.

In the depicted embodiment, the cam block 210 and notch 211 allow the deadbolt head 150 to be retracted if the deadbolt arm is moved in the unlocking direction by the authentication device 163 and/or actuator 158. As the deadbolt arm is moved by the authentication device and/or actuator, the projection 160 is moved away and out of contact with the first side 204 of the cam slot 201 (see FIG. 5B). Accordingly, the projection is moved into contact with a cutout 211*c* of the notch 211 without contacting inclined side 211*a*. The cam block contacts the second side 208 of the cam slot and transmits force from the projection to the second side of the cam slot. Thus, the deadbolt arm and cam block producing a camming motion in the cam slot 201, and concurrently move up the cam slot such that the dead bolt head 150 is retracted. Without wishing to be bound by theory, the direction of the force provided by deadbolt arm when actuated by the authentication device or actuator is in the direction of the second side of the cam slot, such that the wedging action between the projection and the inclined side 211*a* does not occur. In this embodiment, the projection contacts the notch cutout 211*c* located at the base of the inclined section, such that the projection is kept out of contact with the first side of the cam slot and the inclined side 211*a* so as to not cause a wedging action and therefor promote a consistent motion between the extended and retracted positions. Of course, the cam block may have a notch in any suitable arrangement that substantially prevents force applied on the deadbolt head from moving the deadbolt head to the retracted position, while allowing independent movement of the dead bolt arm in the unlocking direction to retract the deadbolt head. In some embodiments, following a wedging action the deadbolt arm may be moved in a locking direction independent of the deadbolt head such that the projection is moved out of contact with at least one of the cam block and the first side of the cam slot. Following the movement of the projection out of the wedge (i.e., out of contact with at least one of the cam block and first side of the cam slot), the deadbolt arm may then be moved in unlocking direction such that the projection is brought into contact with the cam block at the notch to retract the deadbolt without causing a wedging action.

According to the present embodiment, the progressive deadlatching arrangement 205 including a cam block 210 and a notch 211 may not have discrete locking regions, but rather a continuous number of locking regions along the length of the cam slot 201. In contrast to the embodiments depicted in FIGS. 3A-3B and 4A-4B, the progressive deadlatching arrangement may resist the retraction of the deadbolt at any region along the cam slot, and is not limited to discrete locking regions as is the case with a toothed arrangement. That is, regardless of the original position of the deadbolt arm in the cam slot, the projection 160 will wedge between the inclined side 211*a* of the notch to prevent deadbolt retraction by external force. Such an arrangement may be more difficult to defeat, as the deadbolt arm does not engage a discrete predetermined region to achieve progressive deadlatching, thereby increasing security of an associated door.

According to the embodiments shown in FIGS. 3A-3B, the deadbolt position sensor 300 may be constructed and arranged to sense a deadlatching displacement, where the deadlatching displacement is the displacement between the deadbolt head 150 and the plurality of locking regions (i.e., the distance the deadbolt head may travel toward the retracted position before engaging one of the plurality of locking regions). As discussed above, the locking regions 207 are indiscrete and are continuous along a first side 204 of the cam slot 201. Without wishing to be bound by theory, the locking region may be determined by the position of the deadbolt arm 156 and the cam block 210 along the slot. Additionally, regardless of the position of the cam block and deadbolt arm, the locking region be defined as the position at which the wedging action occurs (i.e., where the projection 160 contacts the inclined side 211*a*). Thus, for a particular position of the deadbolt arm sensed by the deadbolt position sensor, the deadlatching displacement may be estimated based on a length of the cam block. For example, in the case where an authorized user moved the deadbolt arm in the locking direction to extend the deadbolt, the deadbolt arm will contact the flat side. Accordingly, the deadlatching displacement may be based on the distance between the flat and inclined side. Similarly, if an authorized user moved the deadbolt arm in the unlocking direction while still leaving the deadbolt in a partially extended position, the deadlatching displacement may be based on the distance between the cutout 211*c* and the inclined side 211*a*. Of course, the deadbolt position sensor may be constructed and arranged in any suitable way such that the deadlatching displacement may be sensed. In some embodiments, the controller 310 may be constructed and arranged to detect one or more security states based at least partly on the deadlatching displacement. For example, the deadbolt position sensor may sense a change in deadlatching displacement from a non-zero value to an approximately zero value. In this case, the controller may detect an intrusion state associated with the deadbolt head being moved toward the retracted position by an external force and engaging the progressive deadlatching arrangement. Of course, the controller may use any combination of deadbolt head displacement and deadlatching displacement to determine the one or more security states.

As shown in FIG. 5A, the deadbolt system 120 is in the extended position. Additionally, deadbolt arm 156 is in the locked position, with the projection 160 and cam block 210 located in a lower portion of cam slot 201 of the sliding mechanism 152. As discussed above, the projection is contacting a first side 204 of the cam slot and a flat side 211*b* of a notch 211 position in the cam block 210. In this position, any external force applied on the deadbolt head will be transmitted to the projection such that the projection moves up the first side to wedge between the inclined side 211*a* of the notch 211, thereby preventing additional movement of the deadbolt arm in the unlocking direction as shown in FIG. 5C. In this position, the deadbolt position sensor 300 senses approximately zero deadbolt head displacement from the extended position. Accordingly, the controller 310 detects a secured state, and the indicator 320 may indicate the secured state. To move the deadbolt head toward the retracted position, the deadbolt arm is rotated by authentication device 163 and/or actuator 158 in the unlocking direction, thereby moving the projection out of contact with the first side of the cam slot and into contact with the notch 211 which transmits the force through the cam block to the second side 208. In this position, the deadbolt arm may be moved in the unlocking direction without causing a wedging action to retract the deadbolt to the retracted position as shown in FIG. 5B.

FIG. 5B depicts the deadbolt system 120 of FIG. 5A in the retracted position. As shown in the figure and discussed above, deadbolt arm 156 is in the unlocked position, with the projection 160 of the deadbolt arm and the cam block 210 in an upper portion of cam slot 201 such that the deadbolt head 150 does not project out of the door side 710. The projection is contacting a cutout 211*c* of the notch 211 of the cam block, such that the projection is not contacting the first side 204 of the cam slot or the inclined side 211*a* of the cam block. In this position, the dead bolt position sensor 300 senses approximately zero deadbolt head displacement from the retracted position. Accordingly, the controller 310 detects an unsecured state, and the indicator 320 may indicate the unsecured state. From this position, an authorized user may use the authentication device 163 and/or actuator 158 to rotate the deadbolt arm in the locking direction such that the projection moves into contact with flat side 211*b* of the notch and first side 204 of the cam slot. The projection may then be moved down the first side concurrently with the cam block such that the deadbolt head is moved toward the extended position and projects out of the door side 710.

FIG. 5C depicts the deadbolt system 120 of FIG. 5A-5B in the extended position, with the projection 160 wedged between an inclined side 211*a* of the notch 211 and a first side 204 of the cam slot 201. As shown in the figure, cam block 210 is in a wedged position, with the projection contacting the inclined side of the notch and forcing the cam block to impact the first side and second side of the cam slot. Accordingly, any additional force placed on the deadbolt head causes additional wedging action of the projection, transmitting the force into the first side and second sides of the cam slot and substantially preventing the projection from moving further along the first side of the cam slot in the unlocking direction. Accordingly, the wedging action of the projection between the first side 204 and inclined side 211*a* substantially prevents the deadbolt head from moving in a retracting direction. In this position, the deadbolt position sensor 300 senses a non-zero deadbolt head displacement from the extended position. However, the deadbolt position sensor also senses a zero deadlatching displacement associated with the deadbolt arm engaging the inclined side to prevent further retraction from external force applied to the deadbolt head. Accordingly, the controller 310 detects an intrusion state associated with three applied on the external deadbolt head that engaged the progressive deadlatching arrangement, and the indicator 320 may indicate the intrusion state.

Figure 6B:
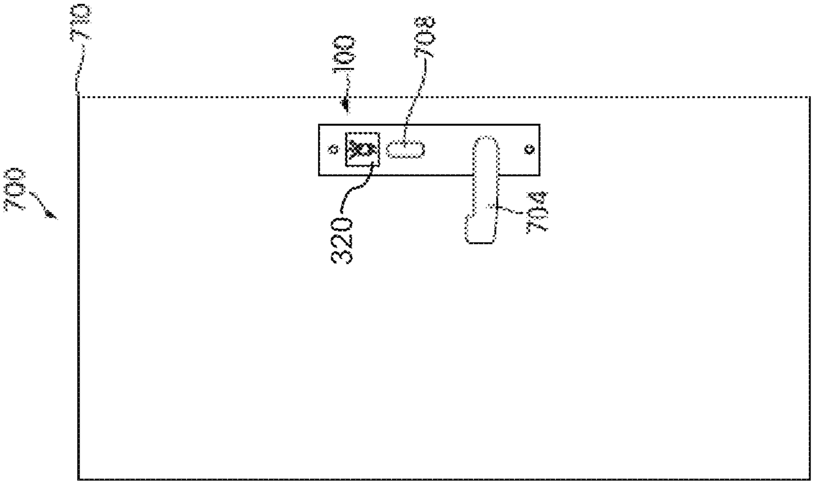
FIGS. 6A-6B depict an embodiment of a door including a dead bolt system.
Figure 6A:
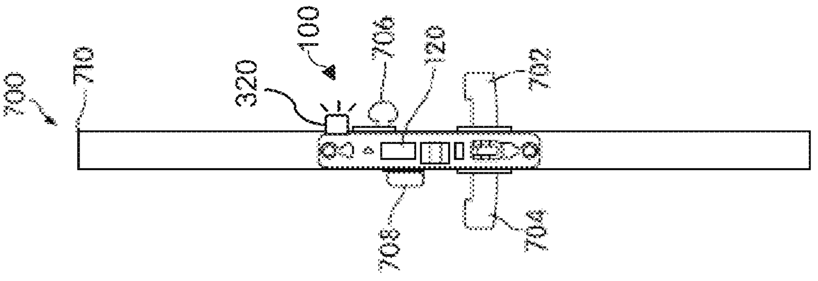

FIGS. 6A-6B depict an embodiment of a door 700 including a deadbolt system 100 including a progressive deadlatching arrangement and a deadbolt position sensor. The door includes a door side 710, inside of which is mounted the deadbolt system 100 including the deadbolt. The door side is constructed and arranged to meet with a door jamb with the door is closed, thereby allowing the deadbolt system 120 to secure the door. As shown in FIG. 6A, the deadbolt system 100 includes the deadbolt system 120, depicted here in use with a key 706 serving as a valid credential for an authentication device included in the deadbolt system. The deadbolt system also includes a deadbolt handle, which is positioned on an interior (i.e., secured) side of the door and is operatively coupled to an actuator of the deadbolt. Accordingly, an authorized user may use the deadbolt handle to actuate the deadbolt between an extended and a retracted position to secure the door. In the depicted embodiment, the deadbolt system includes an indicator 320 disposed on the door constructed and arranged as an LED light configured to emit a visual signal to indicate one or more security states detected by a controller (not shown in the figure). In some embodiments, the indicator 320 may also indicate an authentication state output by the authentication device. As shown in the figure, the latch assembly also includes an exterior handle 702 and an interior handle 704, which may be coupled to a latch for opening or closing the door. FIG. 6B depicts another view of the interior side of the door of FIG. 5A, with deadbolt handle 708 and interior handle 704 shown connected to the deadbolt system 100. In some embodiments, the deadbolt handle 708 may be operated from the secured space without use of the authentication device, such that operation of the deadbolt system may be simplified.

Figure 7:
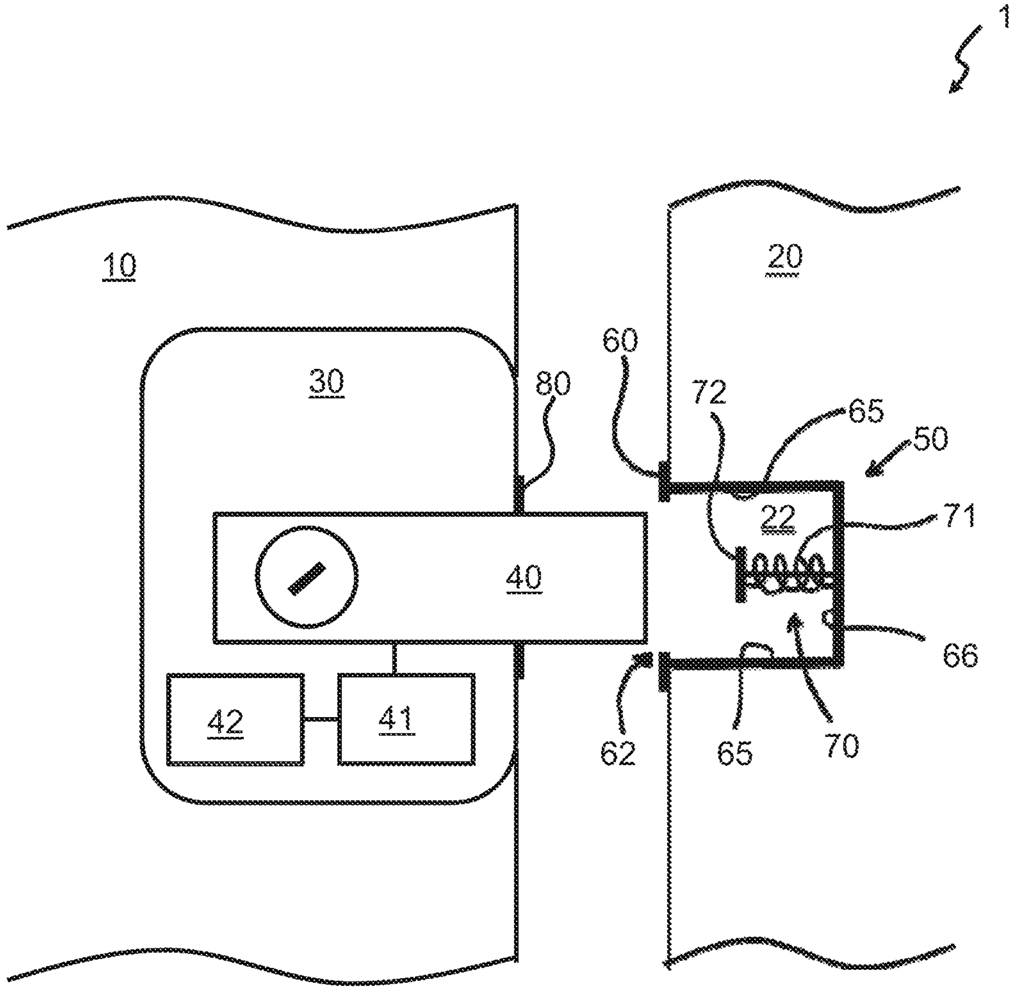
FIG. 7 depicts one embodiment of a deadbolt system.

FIG. 7 depicts a schematic illustration of a dead bolt system 1 according to one set of embodiments that use a motor current signature to determine whether the deadbolt has engaged with a door jamb recess in a locked (i.e., extended) position. A door 10 is shown on one side and a door jamb 20 is shown on the other. The door jamb 20 may include a recess 22 that receives a deadbolt to achieve a locked door state. The system 1 may include two groups of components: components on the door side and components on the door jamb side.

The components on the door side may include a door lock 30 having a deadbolt 40. The deadbolt 40 may be driven by a motor 41 that is coupled to the deadbolt 40. Current drawn by the motor may be sensed by a current sensor 42. In some embodiments, the door lock 30 may have a housing that holds the motor 41 and current sensor 42, and the deadbolt 40 may be movable through the housing as it moves between a retracted position and an extended position. The lock 30 may be configured to attach to the door 10, with the deadbolt 40 positioned through a latch opening in the door. A latch plate 80 may be included on the door 10, the latch plate 80 having an opening through which the deadbolt moves.

The components on the door jamb side may include a strike plate assembly 50 having a strike plate 60 and an opening 62 through which the deadbolt moves. In some embodiments, the strike plate assembly may simply be a strike plate 60 having an opening 62 through which the deadbolt moves. In some embodiments, the strike plate assembly may have components that are configured to be positioned within the door jamb recess 22. For example, as shown in FIG. 7, a strike plate assembly 50 may have a recessed surface 66 spaced from the opening 62. When installed, the recessed surface 66 may be positioned in the interior of the door jamb recess 22. In some embodiments, the strike plate assembly may have one or more passageway surfaces 65. Each passageway surface 65 may have a normal direction that is perpendicular to a normal direction of a plane containing the opening 62. In some cases, when installed, a passageway surface 65 may have a normal direction that is perpendicular to the movement direction of the deadbolt. In some embodiments, the passageway surfaces 65 may contact the inner surfaces of the door jamb recess. In some embodiments, four passageway surfaces 65 are included in the strike plate assembly to form a fully surrounded channel. In other embodiments, one, two or three passageway surfaces 65 are included in the strike plate assembly. The passageway surfaces may be attached to one another. In some embodiments, if the strike plate assembly includes a recessed surface 66 and one or more passageway surfaces 65, the one or more passageway surfaces 65 may be attached to the recessed surface 66.

In some embodiments, the deadbolt system 1 may include a force applicator 70 that is configured to apply a force to the deadbolt 40 as the deadbolt is moved into the door jamb recess 22. The force applied to the deadbolt may be in a direction that opposes the movement direction of the dead bolt from a retracted position to an extended position, also referred to as the movement direction of the deadbolt into the door jamb recess. In some embodiments, the force applicator may be positioned inside the door jamb recess. In some embodiments, the force applicator is positioned on a recessed surface of the strike plate assembly and/or may be positioned on a passageway surface of the strike plate assembly. In some embodiments, the force applicator may be positioned on the deadbolt itself.

In some embodiments, the force applicator includes a spring. In one illustrative example shown in FIG. 7, the force applicator 70 includes a spring 71 positioned inside the recess 22 of the door jamb 20. The force applicator 70 is attached to the recessed surface 66 of the strike plate assembly 50. The force applicator 70 may further include a plate 72 attached to the spring 71, where the plate serves as a contact surface against the deadbolt 40 as the deadbolt is moved into the recess. As the dead bolt 40 moves from a retracted position into an extended position into the door jamb recess 22, the deadbolt 40 may contact the plate 72 and compress the spring 71. Compression of the spring produces a reaction spring force onto the deadbolt. Without wishing to be bound by theory, in some embodiments, the reaction spring force may be proportional to the spring compression distance and the spring constant, K, of the spring 71, as per Hooke's Law. As a result, the force applied to the deadbolt from the force applicator 70 may increase as the spring is increasingly compressed.

Figure 8:
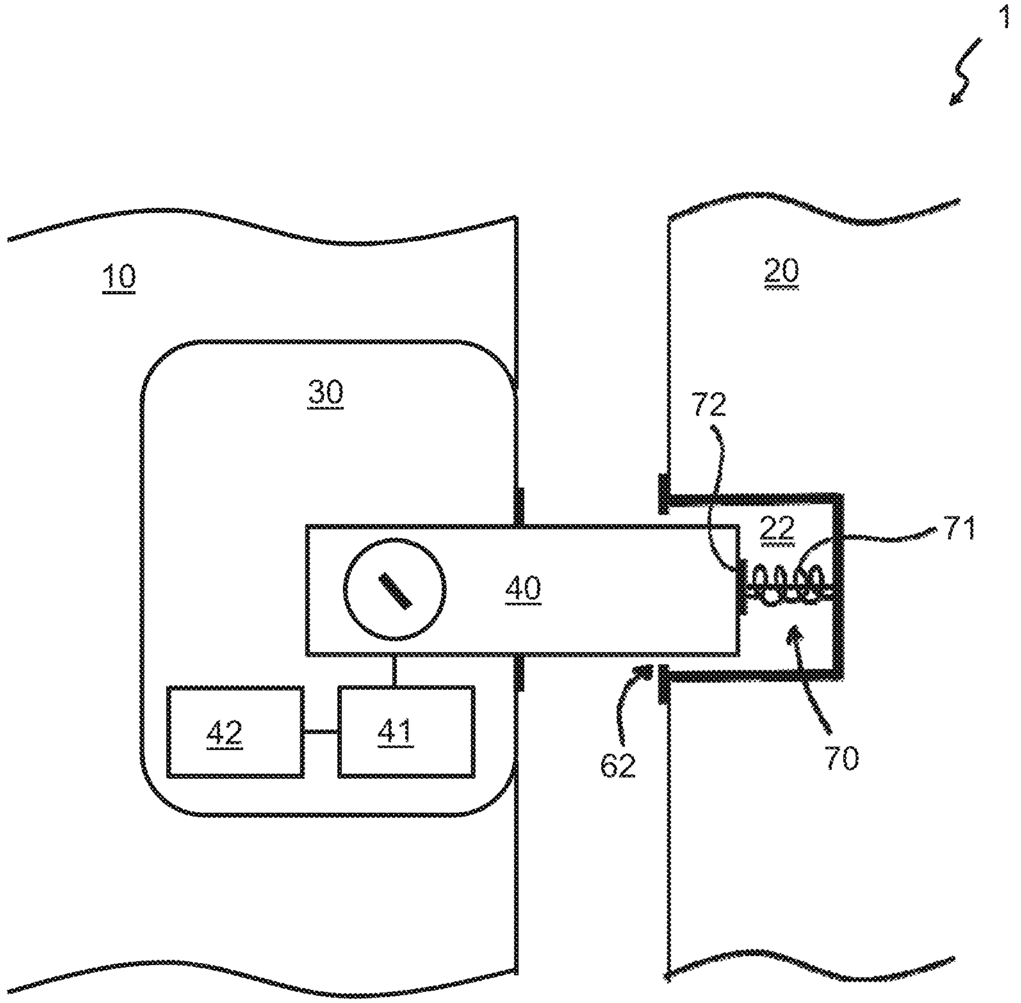
FIG. 8 depicts the deadbolt system of FIG. 7 with the deadbolt advanced to an intermediate position in which the deadbolt has entered a door jamb recess and contacted a force applicator.
Figure 9:
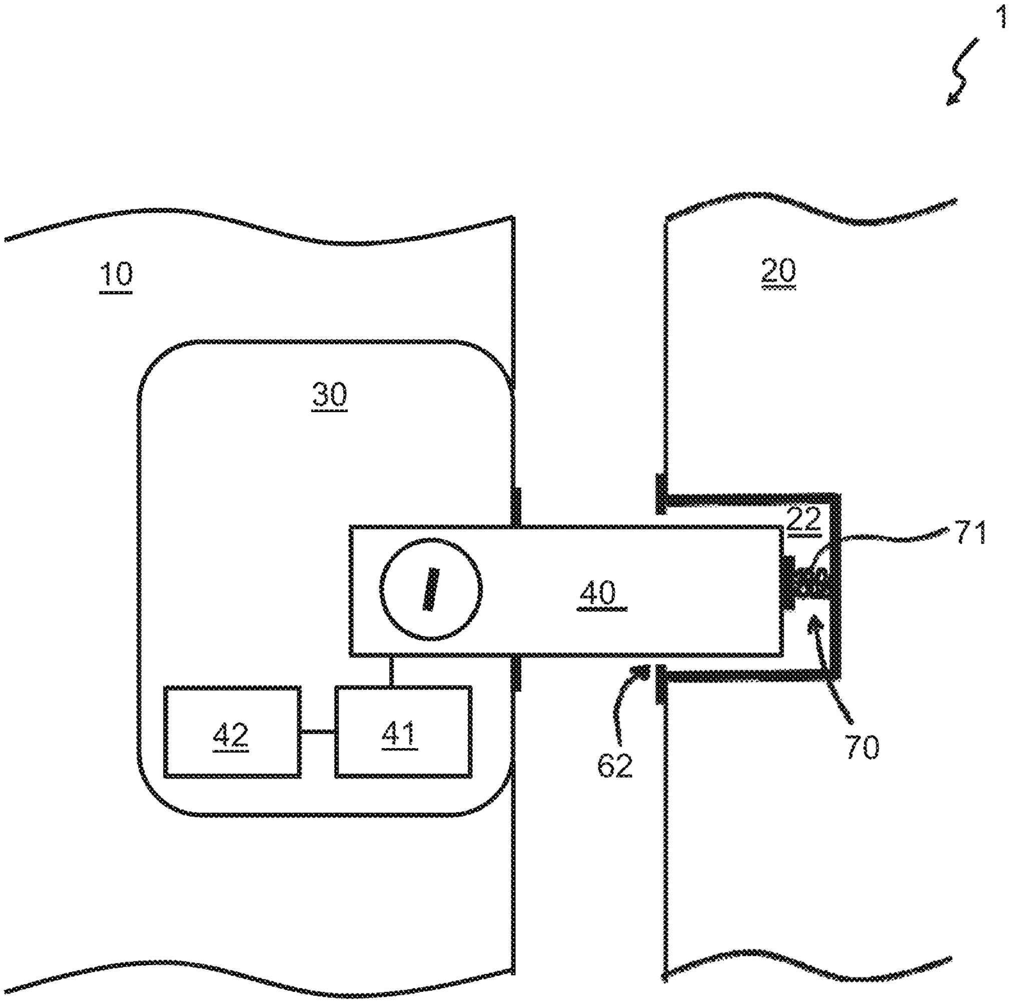
FIG. 9 depicts the deadbolt system of FIG. 7 with the deadbolt advanced to a fully extended position in which the deadbolt has fully entered the door jamb recess against force applied by the force applicator.

In FIG. 7, the deadbolt 40 has not yet entered the door jamb recess 22 or made contact with the force applicator 70. As such, there is no force imparted to the deadbolt 40 by the force applicator 70 at this stage. However, in some cases, force may be imparted by other elements such as the door jamb recess 22 or strike plate 60. In FIG. 8, the deadbolt 40 has moved into an intermediate position such that it has entered the door jamb recess 22 and made initial contact with the force applicator 70. The spring 71 has not yet been compressed, and thus no force is imparted to the deadbolt 40 by the force applicator 70. As the deadbolt 40 moves further into the recess 22, the force applicator 70 will begin to exert a force against the deadbolt 40 in a direction that opposes the movement direction of the deadbolt from a retracted position to an extended position. In FIG. 9, the deadbolt 40 has moved far enough toward the extended position to compress the spring 71 of the force applicator. At this stage, the force applicator is exerting a force against the deadbolt 40, increasing the load on the motor 41, which in turn increases the motor current, which is sensed by the current sensor 42.

Figure 10:
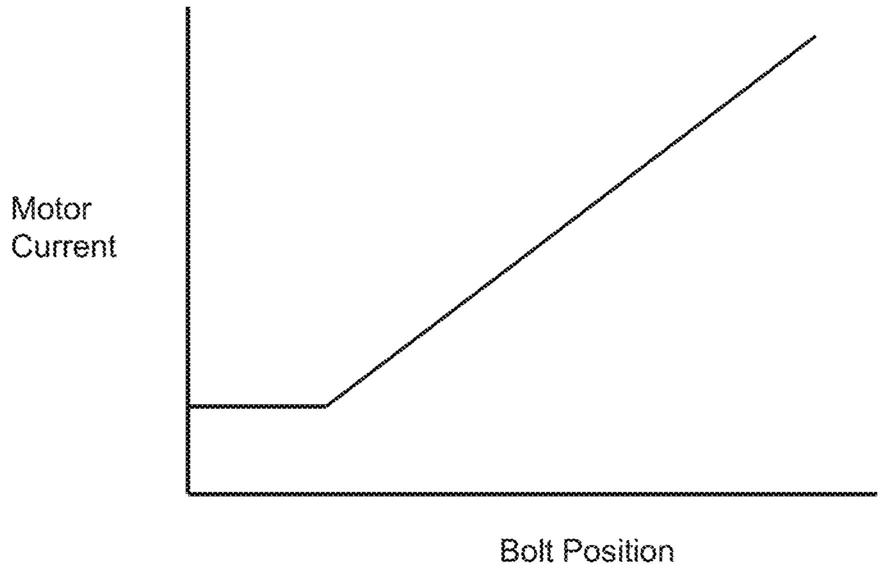
FIG. 10 is a schematic representation of a graph of a sensed profile of motor current relative to deadbolt position for the deadbolt system embodiment of FIG. 7.

An illustrative example of a graph of sensed motor current relative to deadbolt position is shown in FIG. 10. The motor current begins at a low, constant value, and then begins to increase steadily as the deadbolt moves toward an extended position when the deadbolt engages or otherwise interacts with the force applicator. Such a graph could be associated with the spring force applicator embodiment of FIG. 7, in which the force imparted to the deadbolt is variable and linearly increasing.

Figure 11:
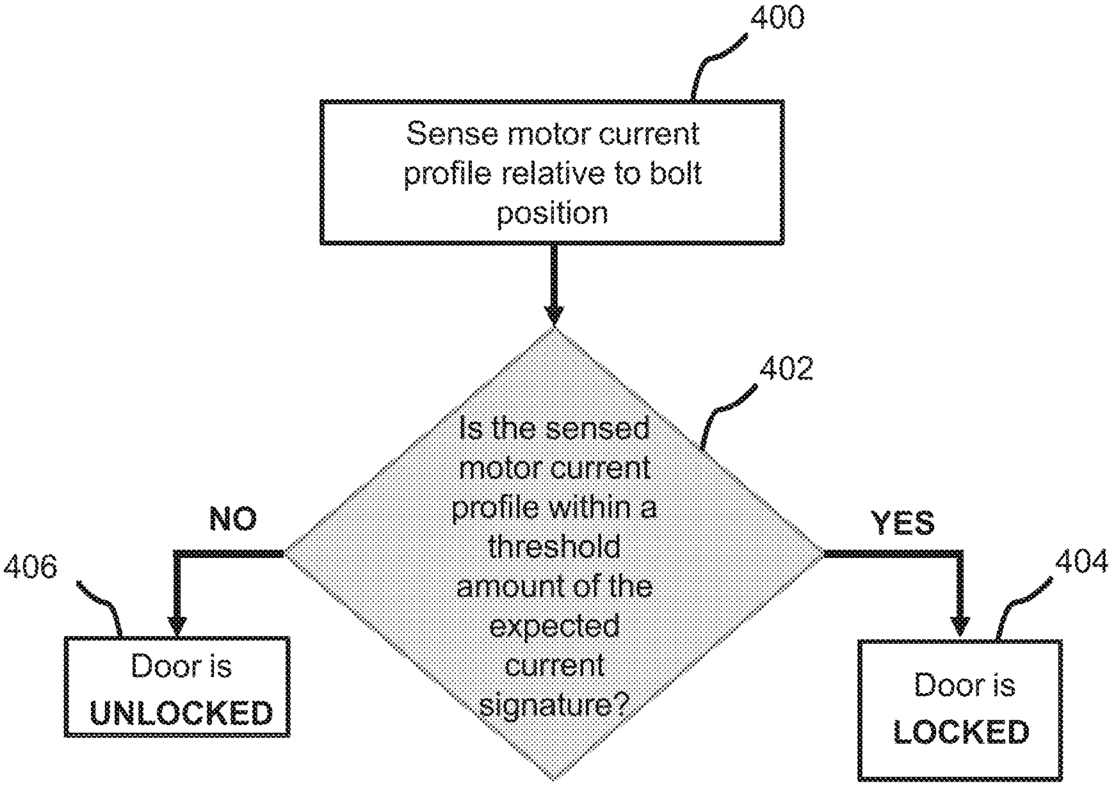
FIG. 11 is a schematic representation of a door lock determination method according to some aspects.

In some embodiments, the sensed motor current may be compared to an expected motor current signature. As discussed above, the expected motor current signature is the expected profile of the motor current relative to deadbolt position when the deadbolt is properly moved into the door jamb recess into the locked position. In some embodiments, the system compares the sensed motor current to an expected motor current signature to determine whether the door is locked. A flow chart illustrating an exemplary process is shown in FIG. 11. At block 400, the system may sense motor current relative to the position of the deadbolt. In some embodiments, the system senses a current profile, e.g., the relationship between the motor current and the position of the deadbolt as the deadbolt moves from a retracted position to an extended position. The profile may cover the entire spectrum of positions of the deadbolt, or only a portion of the spectrum of deadbolt positions. At block 402, the system may compare the sensed motor current profile to the expected current signature. If the sensed motor current profile is within a threshold amount of the expected current signature, the process proceeds to block 404 in which the system may determine that the door is locked. Otherwise, the process proceeds to block 406 in which the system may determine that the door is unlocked.

Figure 12A:
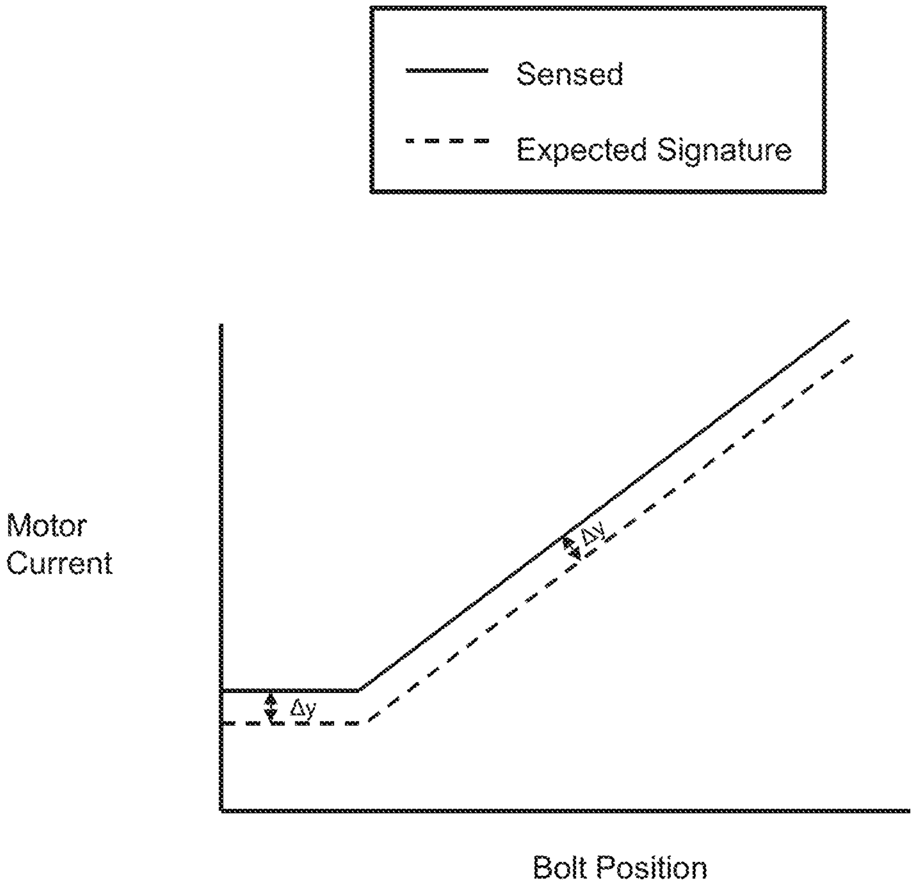
FIG. 12A is a schematic representation of a comparison between a sensed current profile to an expected current profile for a door in a locked state.

An illustrative example of a graph comparing sensed motor current relative to deadbolt position to an expected current signature when a door is in the locked state is shown in FIG. 12A. In some embodiments, even when the door is in the properly locked state, the sensed current may vary slightly from the expected signature. In the illustrative example of FIG. 12A, the sensed current differs from the expected signature by an amount $\Delta y$. In some embodiments, the system may determine that the deadbolt is engaged with the door jamb recess in a locked position when the sensed current of the motor relative to deadbolt position is within a threshold amount of the expected current signature. For example, in the FIG. 12A embodiment, if $\Delta y$ is within the threshold amount, then the system determines that the deadbolt is engaged with the door jamb recess in a locked position.

Figure 12B:
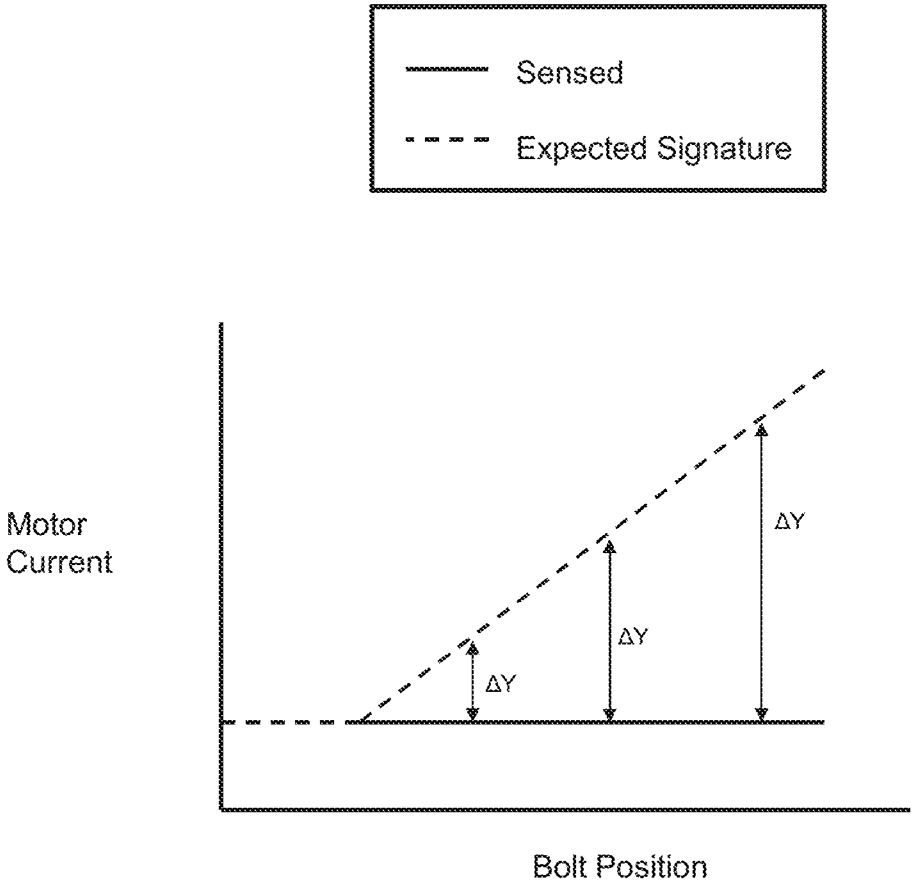
FIG. 12B is a schematic representation of a comparison between a sensed current profile to an expected current profile for a door in an unlocked state.

An illustrative example of another graph comparing sensed motor current relative to deadbolt position to an expected current signature when a door is in an unlocked state is shown in FIG. 12B. In this example, the deadbolt has been moved to the extended position, but the sensed current has remained constant relative to the position of the deadbolt. Here, the sensed current differs from the expected signature by an amount $\Delta Y$. The amount $\Delta Y$ increases as the deadbolt moves toward the extended position. The system may detect that the amount $\Delta Y$ is outside of the threshold amount (e.g., on average, at a particular section of the spectrum, or other suitable calculation method). As a result, the system may determine that door is unlocked.

It should be appreciated that the force applicator 70 may be located at a different position than that shown in the FIG. 7 embodiment. For example, in some embodiments, the force applicator may be located on the deadbolt itself. As the deadbolt enters the door jamb recess, the force applicator contacts either an inner end surface of the door jamb recess itself, or a recessed surface of a strike plate assembly, and a spring force in a direction against the movement direction of the deadbolt into the door jamb recess is imparted to the deadbolt, with an increasing amount of force as the deadbolt moves further into the recess.

In some embodiments, the force applicator includes a detent. In one illustrative example shown in FIG. 13, the force applicator 70 includes a pawl 74 and spring 73 positioned inside the recess 22 of the door jamb 20. The pawl 74 may interact with the deadbolt 40 as the deadbolt enters the recess 22, exerting a force on the deadbolt 40 as the deadbolt moves into the door jamb recess 22. In some embodiments, the pawl may interact with a series of protrusions 43 and indentations 44 that may be either part of the deadbolt 40 itself or be otherwise attached to the deadbolt. As the deadbolt 40 moves into the door jamb recess 22, the distal-most protrusion 43 on the deadbolt approaches and contacts the pawl 74, pushing the pawl and causing it to rotate (in FIG. 13, the pawl is pushed to rotate in the counterclockwise direction). As the pawl rotates, the spring 73 is elongated, and thus the pawl exerts a force onto the deadbolt 40 as the deadbolt moves in the extension direction. After the pawl 74 clears the first protrusion, it enters the first, distal-most indentation 44 that follows the first protrusion. Because the pawl is spring-biased to move back to its original, non-stressed position, the pawl may rotate back slightly (in a clockwise direction in FIG. 13) until it contacts the subsequent protrusion as shown in FIG. 14, and the cycle restarts. When the pawl clears the first protrusion and enters the subsequent indentation, the force on the deadbolt may decrease until the pawl makes contact with the next protrusion and the cycle restarts. Accordingly, the motor current load associated with the embodiment of FIG. 13 may be variable relative to the deadbolt position, and may cyclically increase and decrease as the deadbolt is driven into the recess. Such a variable signature may provide an additional measure of reliability, e.g., by reducing the likelihood of a false positive.

Figure 13:
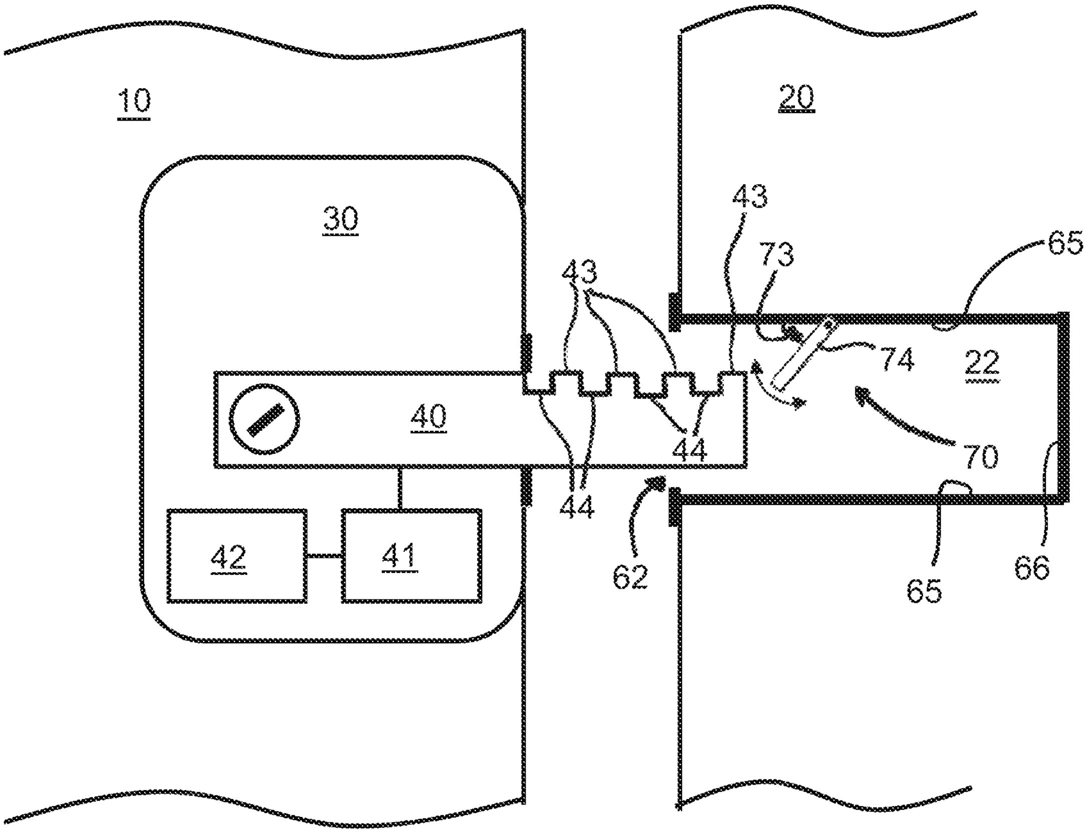
FIG. 13 depicts another embodiment of a deadbolt system.
Figure 14:
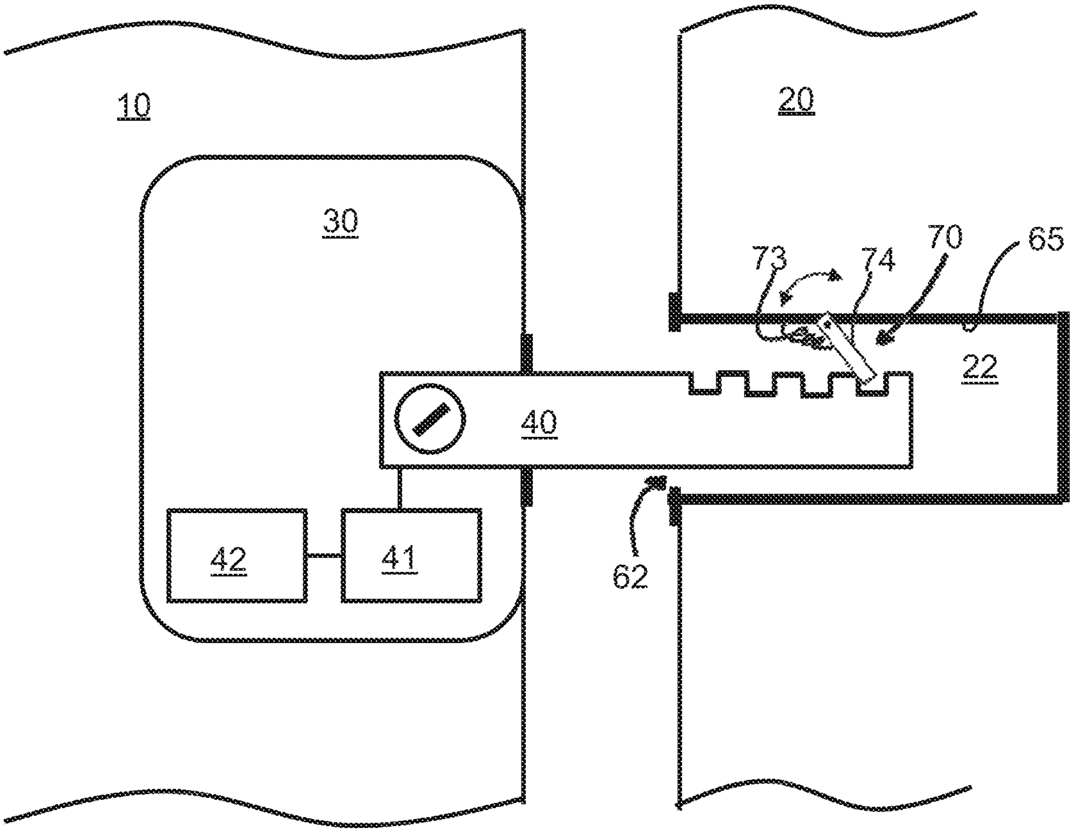
FIG. 14 depicts the deadbolt system of FIG. 13 with the deadbolt advanced to an intermediate position in which the deadbolt has moved further into the door jamb recess against force applied by a force applicator.
Figure 15A:
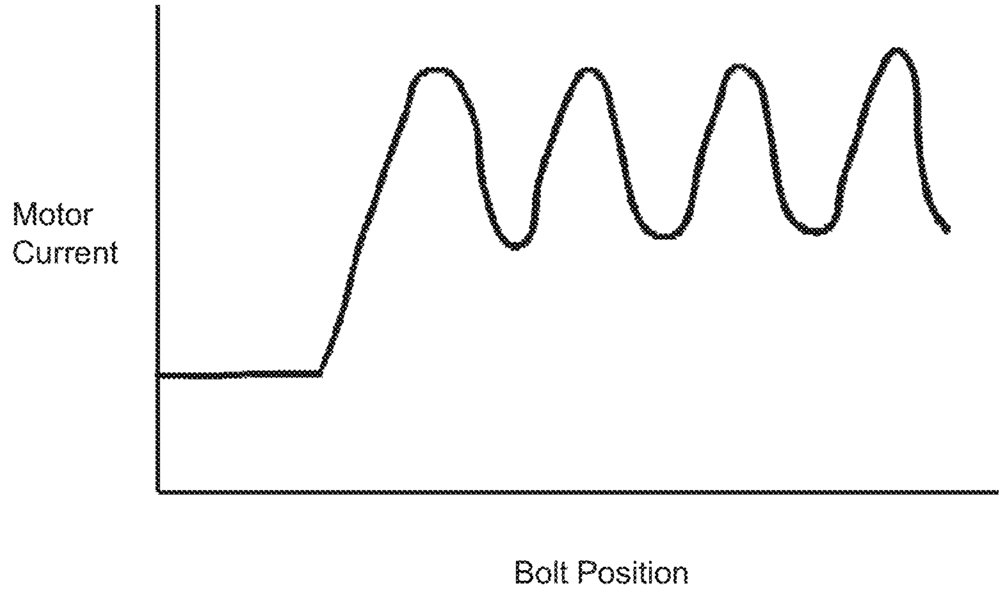
FIG. 15A is a graph of sensed motor current relative to deadbolt position for the dead bolt system embodiment of FIG. 13.

An illustrative example of a possible graph of sensed motor current relative to deadbolt position that could be associated with the embodiment of FIG. 13 is shown in FIG. 15A. The motor current begins at a low, constant value, and then increases—which could reflect contact between the pawl and the first distal-most protrusion. The motor current then proceeds to decrease, which could reflect the entry of the pawl into an indentation, and then increase again, which could reflect contact of the pawl with a subsequent protrusion.

Figure 15B:
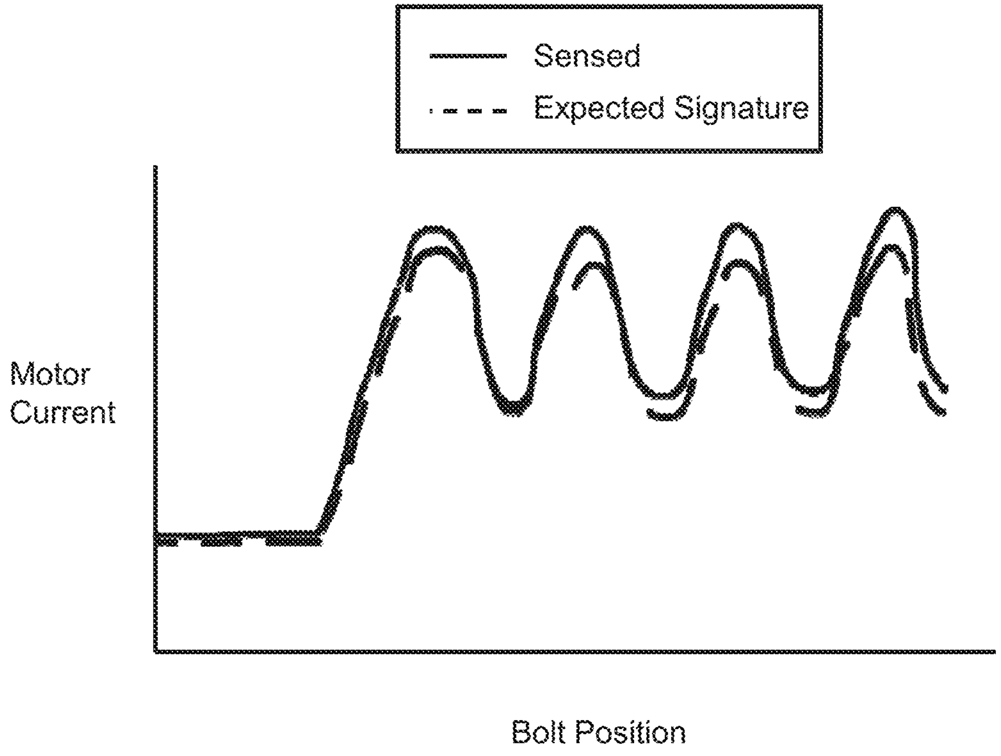
FIG. 15B is the graph of FIG. 15A with an expected current signature superimposed on the graph for comparison with the sensed current profile.

The system may compare the sensed current profile to an expected current signature, as represented schematically by the graph in FIG. 15B where the expected signature is superimposed on the graph of the sensed current. In some embodiments, even with slight differences between the sensed current and the expected current signature, the sensed current may still be considered to be within a threshold amount of the expected current signature, and as a result the system may detect that the door is in the locked state.

The FIG. 13 embodiment and associated FIG. 15A graph illustrate an embodiment in which the force applicator can apply a variable force on the deadbolt, where the force increases and decreases as the deadbolt moves through the door jamb recess. Without wishing to be bound by theory, variable force on the deadbolt may also be imparted by other elements of the deadbolt and door jamb. For example, variable frictional or contact forces may be imparted by a strike plate, door jamb recess, deadbolt actuator components, or any other associated element.

In some embodiments, the detent (pawl 74 and spring 73) of the force applicator 70 may be attached to a passageway surface 65 of the strike plate assembly. Although the pawl 74 is shown attached to an upper passageway surface 65 in FIG. 13, it should be understood that the pawl 74 may be attached to a lower passageway surface, or a side passageway surface (not visible in the view shown in FIG. 13; the strike plate assembly may have one or two side passageway surfaces are located in planes that are parallel to the plane of the page in FIG. 13—one being behind the plane of the page and the other being in front of the plane of the page).

It should be appreciated that different configurations of the protrusions and indentations on/attached to the deadbolt are possible. In some embodiments, the height and/or width of each of the protrusions may be different from one another. Alternatively or in addition, in some embodiments, the depth and/or width of each of the indentations may be different from one another. Any combination of sizes of protrusions and indentations may be used. The combination of protrusion/indentation size and position may change the expected motor current signature for the deadbolt system. As noted, a variable signature can provide an additional level of reliably ascertaining whether the deadbolt is actually engaged in the recess.

Figure 16:
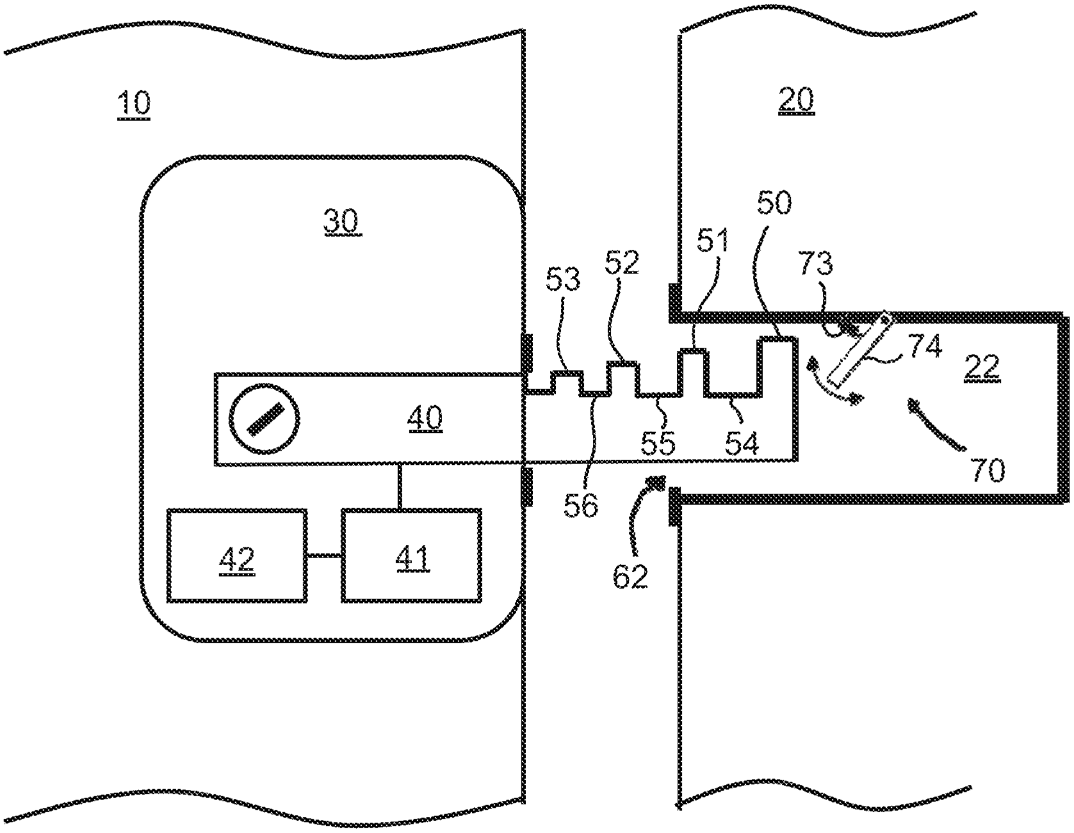
FIG. 16 depicts another embodiment of a deadbolt system.
Figure 17A:
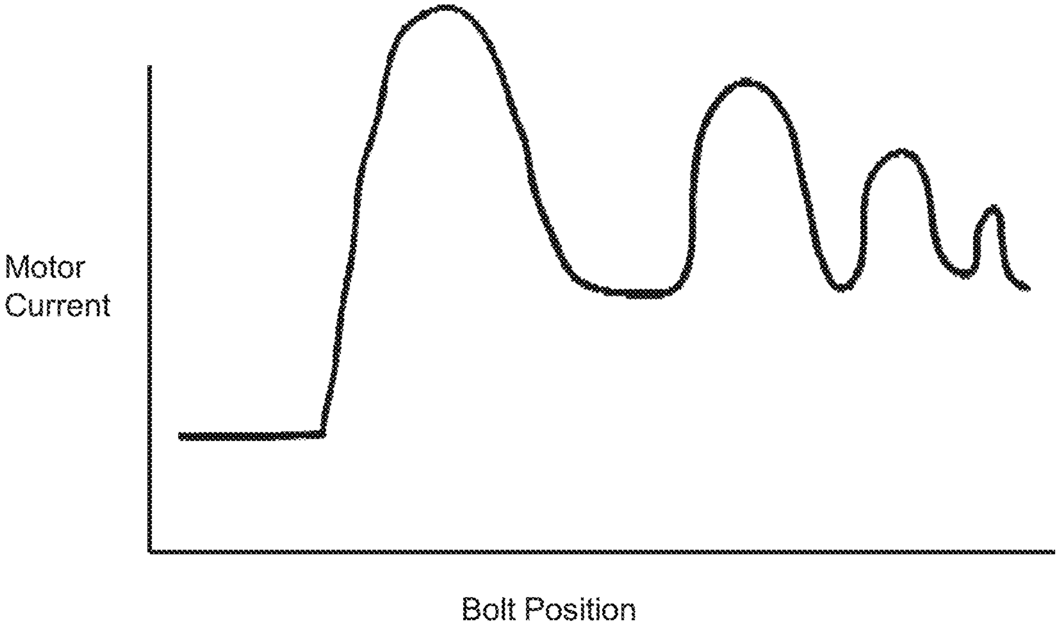
FIG. 17A is a graph of sensed motor current relative to deadbolt position for the deadbolt system embodiment of FIG. 16.
Figure 17B:
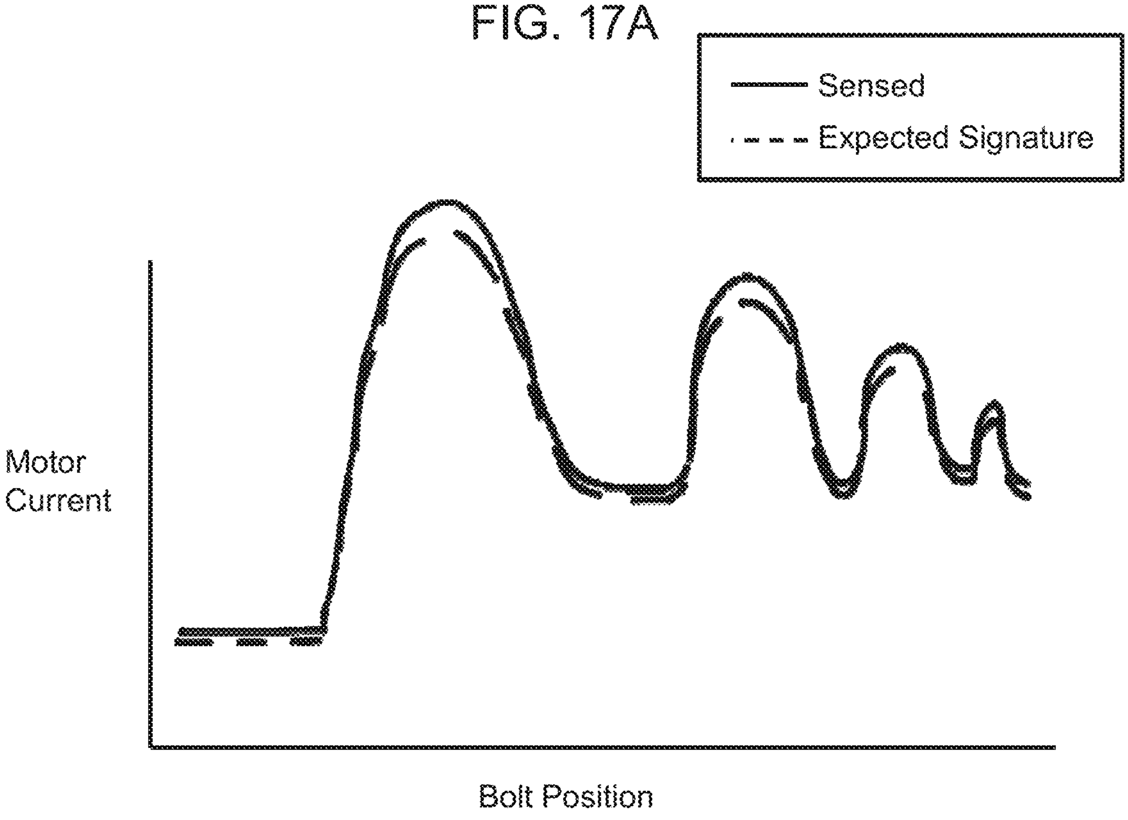
FIG. 17B is the graph of FIG. 17A with an expected current signature superimposed on the graph for comparison with the sensed current profile.

As an illustrative example, FIG. 16 depicts an embodiment in which the protrusions 41, 51, 52 and 53 each have successively shorter heights. In addition, the indentations 54, 55 and 56 each have successively shorter widths. A schematic representation of a possible associated motor current over deadbolt position is shown in the graph of FIG. 17A. The system may compare the sensed current profile to an expected current signature, as represented schematically by the graph in FIG. 17B where the expected signature is superimposed on the graph of the sensed current. In some embodiments, even with slight differences between the sensed current and the expected current signature, the sensed current may still be considered to be within a threshold amount of the expected current signature, and as a result the system may detect that the door is in the locked state.

It should be appreciated that other configurations of the detent may be used. For example, instead of a pawl, the detent may be a rotatable wheel (can be a circle, semi-circle or other incompletely circular shape) having teeth that correspond with the protrusions and indentations of or attached to the deadbolt. In some embodiments, the toothed wheel may be spring-biased or otherwise biased to impart a force on the deadbolt.

It should also be appreciated that other types of force applicators may be used other than those using a spring. For example, in some embodiments, frictional pads may be used to impart a force on the deadbolt. One or more frictional pads may be located on upper, lower, and/or side passageway surfaces within the door jamb recess. As the deadbolt enters the door jamb, the surface of the deadbolt may slide against the one or more frictional pads. To create a more varied motor current signature, a plurality of pads may be located throughout the length of the recess, such that the force applied to the deadbolt increases at set distances as the deadbolt moves into the recess. Pads may be spaced from one another or directly adjacent to one another. In some embodiments, some or all of the pads may have different coefficients of friction than one another. In some embodiments, no separate force applicator may be employed. Rather, typical resistive forces from operation of the deadbolt may be measured, such as those imparted by friction between the deadbolt and a strike plate, frictional losses in a deadbolt actuator, and contact forces between the dead bolt and a door jamb recess.

Other types of force applicators include pneumatics, an eccentric (i.e., a body having a rotating axle with an offset center) that is configured and positioned to be rotated by the deadbolt as the deadbolt moves into the door jamb recess, potential energy storage components such as a rubber band or rubber band-like component that is stretched as the deadbolt moves into the door jamb recess, a compressible, elastic wedge that is positioned attached to a passageway surface, where the height of the wedge increases in the direction of movement of the deadbolt into the door jamb recess, or a flexible elastic member that interacts with surface features on or attached to a deadbolt like the pawl of FIG. 13, or a block or other shape of material that substitutes for the spring of FIG. 7 and stores energy as it is compressed, or any other force applicator suitable for imparting a force to the deadbolt in a direction that opposes the movement direction of the deadbolt from the retracted position to an extended position into the door jamb recess.

Figure 18:
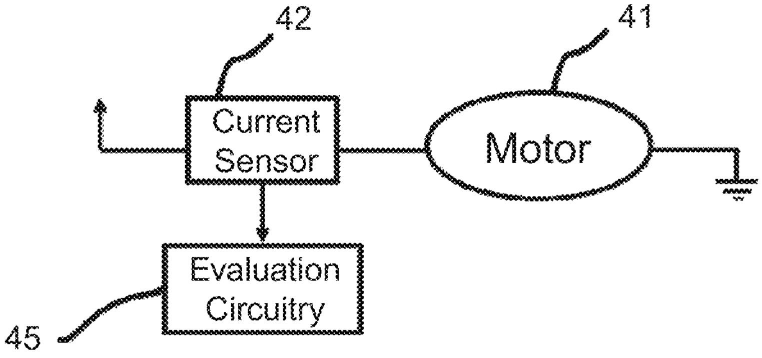
FIG. 18 is a schematic circuit diagram for a deadbolt system using a current sensor.

An illustrative circuit diagram for the motor current sensing and comparison operations is shown in FIG. 18. The motor 41 is connected in series to a current sensor 42 configured to sense the amount of current being drawn by the motor as the deadbolt changes position. The sensed current from the current sensor 42 is output to evaluation circuitry 45 configured to compare the sensed motor current to a stored expected current signature. The current sensor 42 may be any device suitable to measure current, such as an ammeter.

In some embodiments, the evaluation circuitry 45 comprises a processor running software that compares the sensed motor current to the stored expected current signature. As a non-limiting, illustrative embodiment, the software may use Fourier transforms to calculate the differences between the sensed current and the expected current.

In some embodiments, the evaluation circuitry 45 may comprise a hardware arrangement rather than using software. For example, the evaluation circuitry may comprise a comparator circuit.

In some cases, even if the deadbolt has been properly advanced into and engaged with the door jamb recess in the locked position, the motor current signal may not match perfectly with the expected current signature. Slight mismatches may arise due to noise, artifacts in the motor, current sensor, and the evaluation circuitry, or due to other sources of distortion, even if filters are utilized. In some embodiments, the evaluation circuitry 45 may be configured to determine that the deadbolt is engaged with the door jamb recess in a locked position when the sensed current of the motor relative to deadbolt position is within a threshold amount of the expected current signature. The threshold amount may be in the form of a percentage, an absolute value, or a combination of both.

The system may use various calculations to determine whether or not a sensed current is within a threshold amount. For example, in situations where the difference between the sensed current and the expected signature varies along different deadbolt positions, the system may calculate the difference at each deadbolt position and take an average. In some embodiments, the threshold may vary along the deadbolt position. In other words, the tolerance for differences may be greater at certain deadbolt positions as compared to others. For example, in one embodiment, the threshold is smaller when the deadbolt is closer to the retracted and extended positions and greater in the positions in-between, or vice versa. In some embodiments, the system only compares a portion of the sensed and expected profiles, rather than the total profiles along the entire deadbolt position spectrum.

In some embodiments, the expected motor current signature may be stored in the deadbolt system at the manufacturing stage. In some embodiments, a user may have the ability to calibrate the expected motor current signature to update the expected signature as parts change over time, due to, e.g., wear and tear.

According to another aspect, a deadbolt system may use a vibration signature to determine whether the deadbolt has engaged with a door jamb recess in a locked position.

In one set of embodiments, the deadbolt system may include a vibration applicator that applies a known amount of vibration to the deadbolt as the deadbolt is moved into the door jamb recess. A vibration sensor may be used to sense the vibration of the deadbolt as the deadbolt is moved into the door jamb recess.

The system may have a stored expected vibration signature, which is the expected profile of the deadbolt vibration relative to deadbolt position when the deadbolt is properly moved into the door jamb recess into the locked position.

Figure 19:
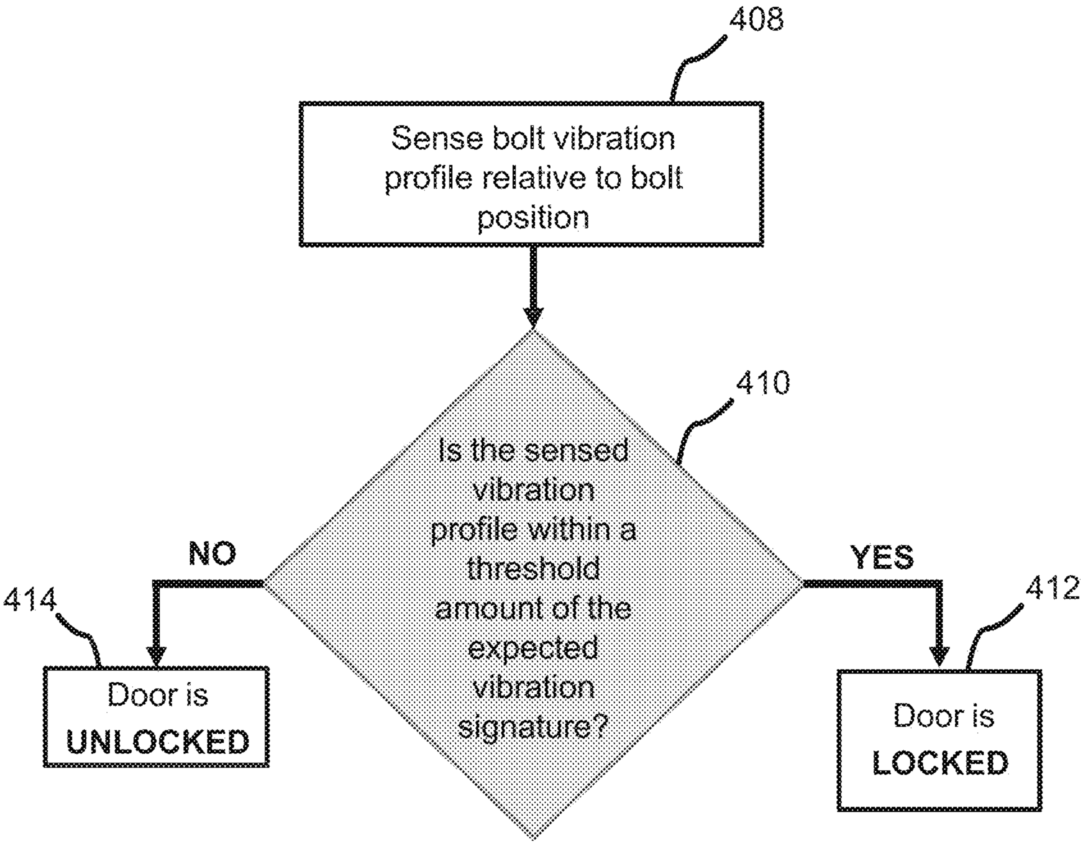
FIG. 19 is a schematic representation of a door lock determination method.

Evaluation circuitry may be used to compare the sensed vibration relative to deadbolt position to the expected vibration signature. The evaluation circuitry may determine that the deadbolt is engaged with the door jamb recess in a locked position when the sensed deadbolt vibration relative to deadbolt position is within a threshold amount of the expected vibration signature. A flow chart illustrating such a process is shown in FIG. 19. At block 408, the system may sense deadbolt vibration relative to the position of the deadbolt. In some embodiments, the system senses a vibration profile, e.g., the relationship between the deadbolt vibration and the position of the deadbolt as the deadbolt moves from a retracted position to an extended portion. The profile may cover the entire spectrum of positions of the deadbolt, or only a portion of the spectrum of deadbolt positions. At block 410, the system may compare the sensed vibration profile to the expected vibration signature. If the sensed vibration profile is within a threshold amount of the expected vibration signature, the process proceeds to block 412 in which the system may determine that the door is locked. Otherwise, the process to block 414 in which the system may determine that the door is unlocked.

Figure 20:
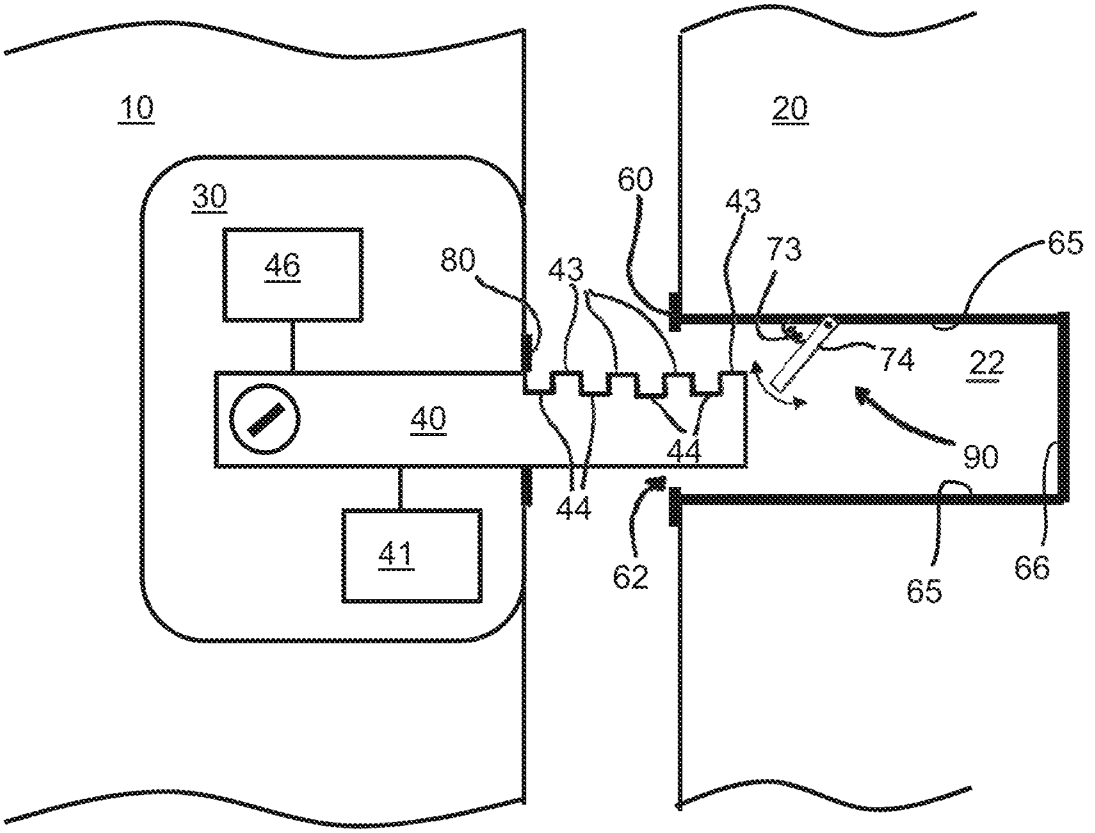
FIG. 20 depicts another embodiment of a deadbolt system.

FIG. 20 depicts a schematic illustration of a deadbolt system 1 according to one set of embodiments that use a vibration signature to determine whether the deadbolt has engaged with a door jamb recess in a locked position. The deadbolt system 1 may have a detent arrangement similar to that of the embodiment of FIG. 13. Common features between the embodiment of FIG. 20 and the embodiment of FIG. 13 are labeled in FIG. 20 and operate similarly to what has been described in the FIG. 13 embodiment. A motor 41 may be used to drive the deadbolt 40. In some embodiments, a pawl 74 and spring 73 may serve as a vibration applicator 90 that applies a vibration to the deadbolt 40 as the deadbolt moves into the door jamb recess 22.

In the embodiment of FIG. 20, the deadbolt system senses vibrations of the deadbolt as the deadbolt moves from a retracted to an extended position into the recess of the door jamb. The system uses a vibration sensor 46 to sense the vibration of the deadbolt. In some embodiments, the vibration sensor is an accelerometer, and may be coupled to the deadbolt 40 to sense vibration of the deadbolt. It should be appreciated that the vibration sensor may alternatively comprise velocity sensors, piezoelectric sensors, proximity probes, laser displacement sensors, or any other suitable device for sensing vibration.

As the deadbolt 40 moves into the door jamb recess 22, the distal-most protrusion 43 on the deadbolt approaches and contacts the pawl 74, pushing the pawl and causing it to rotate (in FIG. 20, the pawl is pushed to rotate in the counterclockwise direction). This initial contact between the deadbolt and the pawl may impart vibrations to the deadbolt that are sensed by the vibration sensor.

As the pawl rotates, the spring 73 is elongated. After the pawl 74 clears the first protrusion, it may briefly enter the first, distal-most indentation that follows the first protrusion, but may quickly thereafter strike against the subsequent protrusion both because of the continued movement of the deadbolt and because the pawl is spring-biased to move (clockwise in FIG. 20) back to its original, non-stressed position. This striking of the second protrusion by the pawl may impart vibrations to the deadbolt that are sensed by the vibration sensor. This cycle of pushing the pawl back counter-clockwise and the pawl clearing a protrusion and striking the next protrusion may continue as the deadbolt continues to move further into the door jamb recess. Accordingly, the vibration of the deadbolt associated with the embodiment of FIG. 20 may cycle through periods of high vibration and low vibration.

Figure 21A:
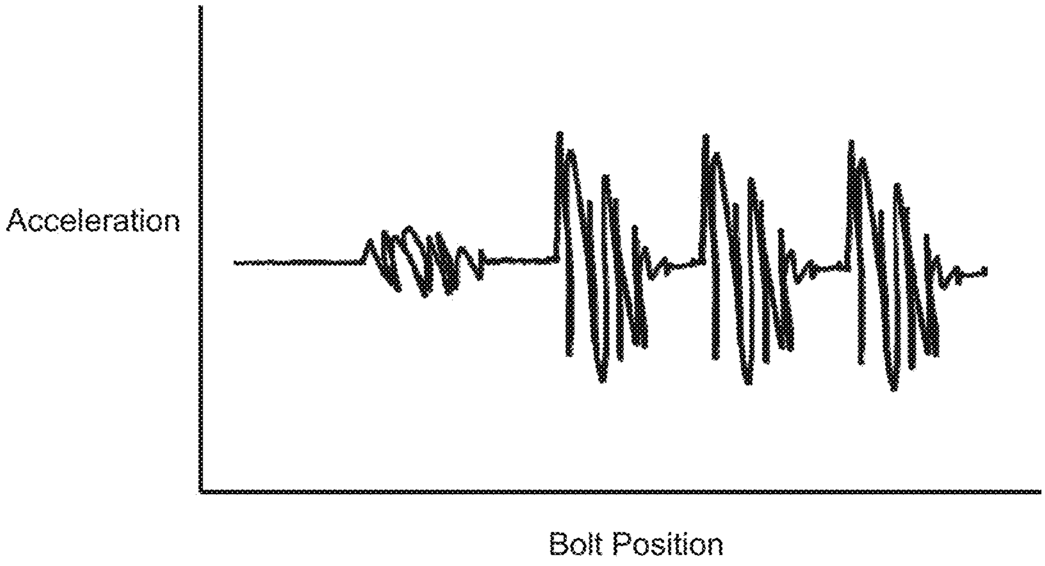
FIG. 21A is a graph of sensed deadbolt vibration relative to deadbolt position for the deadbolt system embodiment of FIG. 20.

An illustrative example of a possible graph of sensed vibration of the deadbolt relative to deadbolt position that could be associated with the embodiment of FIG. 20 is shown in FIG. 21A. Vibration of the deadbolt, as, in this case, measured by acceleration, begins at a low value, and then undergoes a first slightly larger group of vibrations. This first group of vibrations could be associated with the initial contact between the pawl and the first protrusion. The deadbolt then undergoes a series of larger vibrations, where each group of vibrations are spaced from one another. Each of these groups of vibrations could be associated with an event of the pawl striking the subsequent protrusions.

Figure 21B:
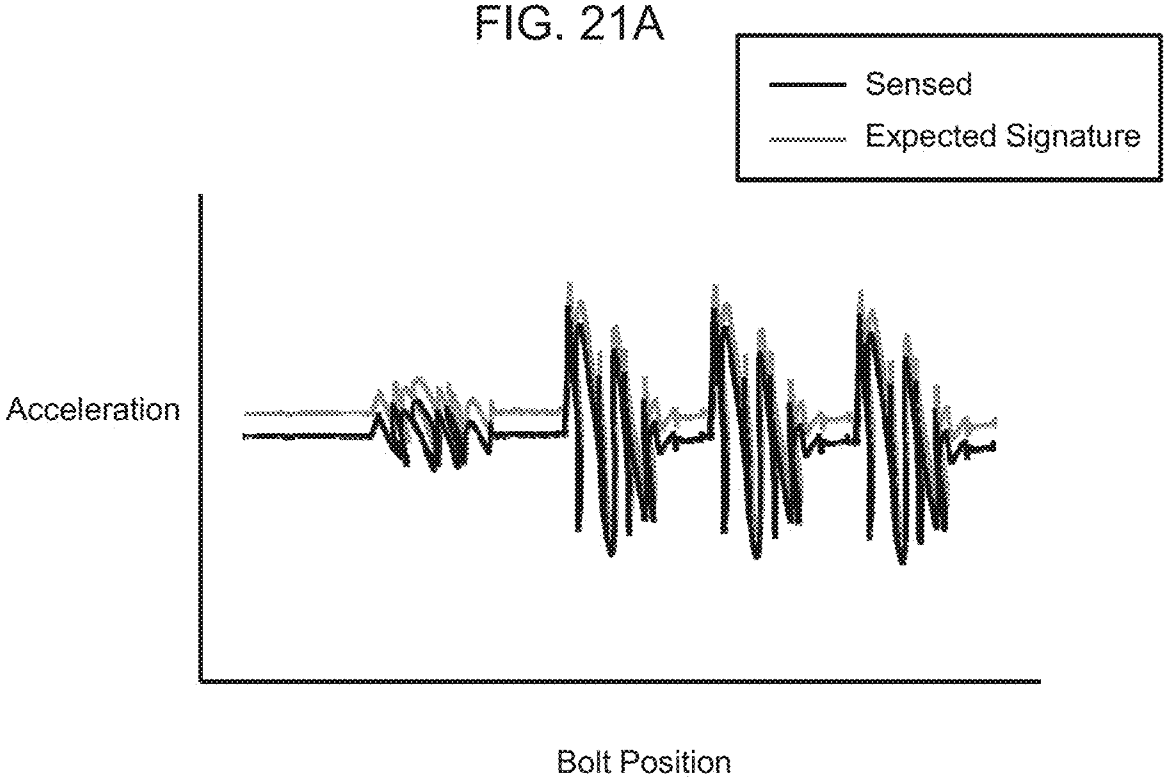
FIG. 21B is the graph of FIG. 21A with an expected vibration signature superimposed on the graph for comparison with the sensed vibration profile.

The system may compare the sensed vibration profile to an expected vibration signature, as represented schematically by the graph in FIG. 21B where the expected signature is superimposed on the graph of the sensed vibration. In some embodiments, even with slight differences between the sensed vibration and the expected vibration signature, the sensed vibration may still be considered to be within a threshold amount of the expected vibration signature, and as a result the system may detect that the door is in the locked state.

Figure 22:
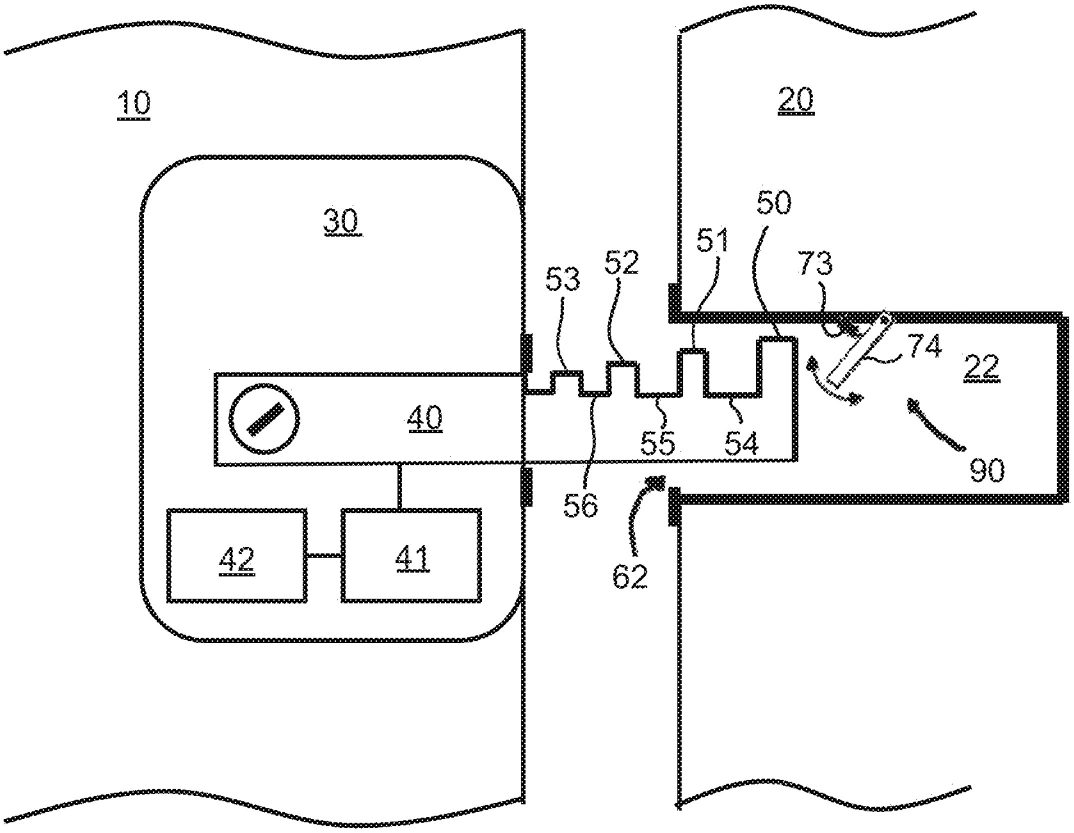
FIG. 22 depicts another embodiment of a door lock detection system according to some aspects.
Figure 23A:
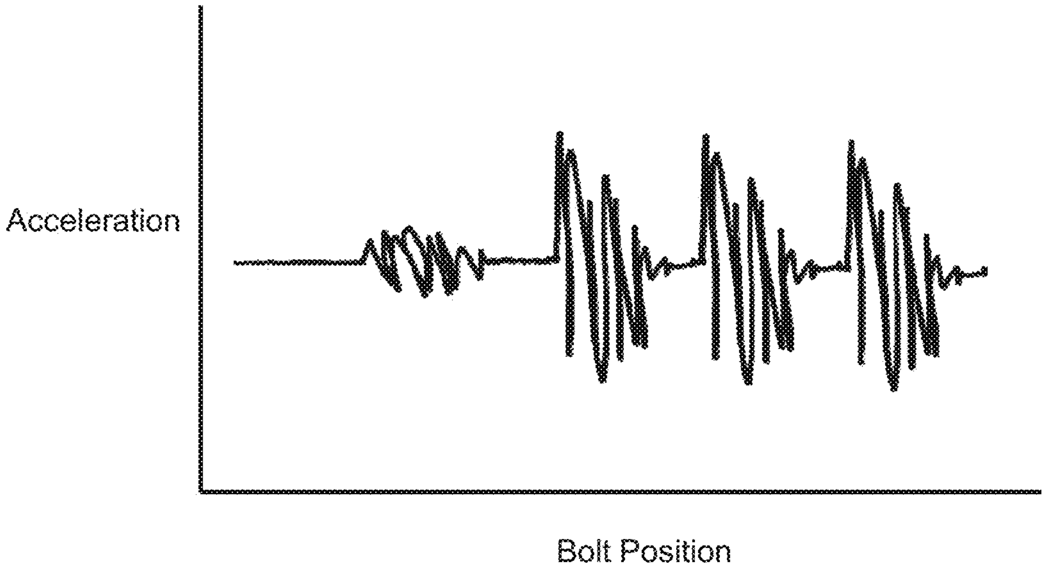
FIG. 23A is a graph of sensed door lock deadbolt vibration relative to deadbolt position for the door lock detection system embodiment of FIG. 22.

The expected vibration signature of a door lock detection system may be varied based on the shape and/or position of the protrusions and indentations on or attached to the deadbolt. For example, FIG. 22 depicts an embodiment in which the protrusions 50, 51, 52 and 53 each have successively shorter heights. In addition, the indentations 54, 55 and 56 each have successively shorter widths. A schematic representation of a possible associated vibration profile of the deadbolt relative to deadbolt position is shown in the graph of FIG. 23A. In the graph of FIG. 23A, the first group of vibrations has the largest amplitude, followed by a second group of vibrations having a smaller amplitude, and so on. In addition, the spacing between the first group of vibrations and the second group of vibrations is greater than the spacing between the second group of vibrations and the third group, and so on.

Figure 23B:
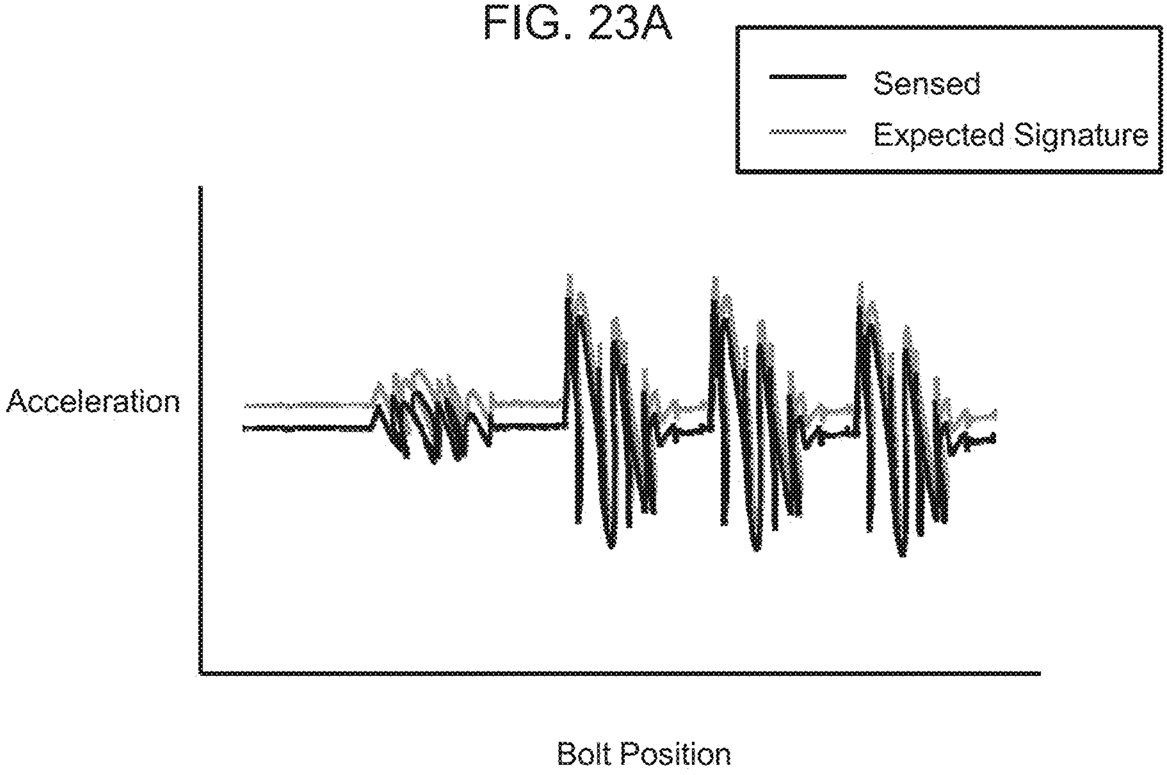
FIG. 23B is the graph of FIG. 23A with an expected vibration signature superimposed on the graph for comparison with the sensed vibration profile.

The system may compare the sensed vibration profile to an expected vibration signature, as represented schematically by the graph in FIG. 23B where the expected signature is superimposed on the graph of the sensed vibration. In some embodiments, even with slight differences between the sensed vibration and the expected vibration signature, the sensed vibration may still be considered to be within a threshold amount of the expected vibration signature, and as a result the system may detect that the door is in the locked state. A varying vibration signature may provide a more robust detection system by reducing or eliminating false positives.

Figure 24:
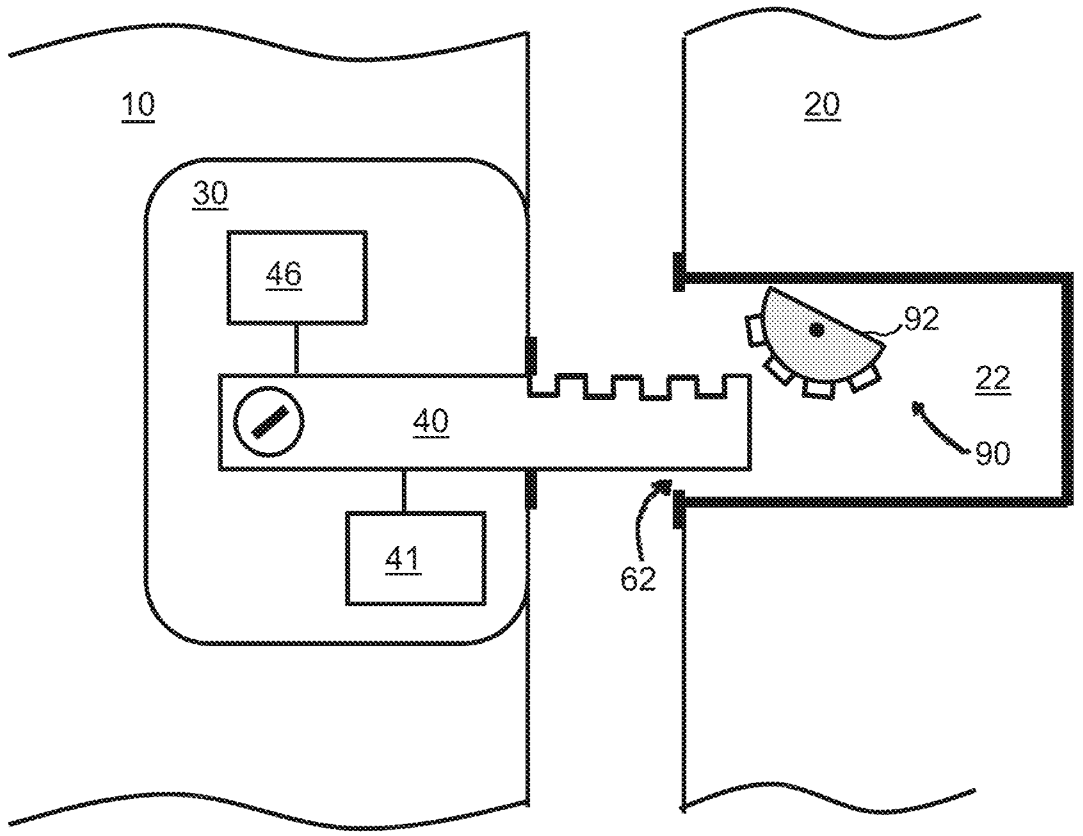
FIG. 24 depicts another embodiment of a deadbolt system.

It should be appreciated that other configurations of the detent may be used. For example, instead of a pawl, the detent may be a wheel (can be a circle, semi-circle or other incompletely circular shape) having teeth that correspond with the protrusions and indentations of, or attached to, the deadbolt. In some embodiments, the toothed wheel may be spring-biased or otherwise biased to impart vibration to the deadbolt. One illustrative example of a vibration applicator 90 that is a toothed wheel 92 is shown in FIG. 24. In some embodiments, the detent may be a series of surface features within the door jamb recess that the deadbolt must slide against during movement of the deadbolt into the recess.

It should also be appreciated that other types of vibration applicators may be used other than a detent. For example, in some embodiments, the vibration applicator may be a vibrator located within the door jamb recess and positioned such that the deadbolt slides against the vibrator as it enters the recess. With the vibrator in contact with the deadbolt, the vibrator may impart vibrations to the deadbolt. In some embodiments, the vibration applicator may be a tapper located within the door jamb recess that taps on the deadbolt as the deadbolt enters the recess. Any other vibration applicator suitable for imparting a vibration to the deadbolt as the deadbolt moves into the door jamb recess may be used. In some embodiments, the vibration applicator is configured to be positioned on the door jamb side. In some embodiments, the vibration applicator is configured to be positioned within the door jamb recess.

Figure 25:
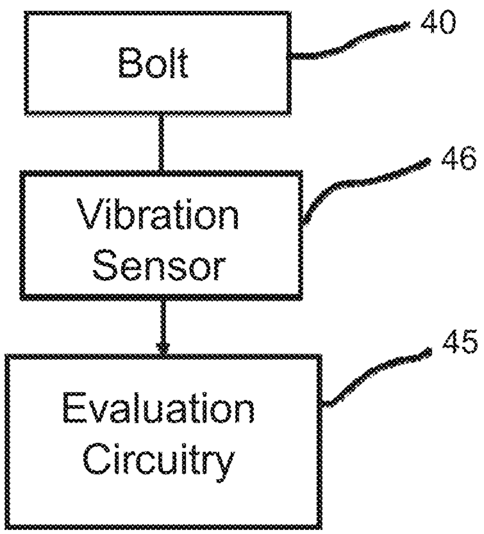
FIG. 25 is a schematic circuit diagram for a deadbolt system using a vibration sensor.

An illustrative circuit diagram for the vibration sensing and comparison operations is shown in FIG. 25. The sensed vibration of the deadbolt 40 from the vibration sensor 46 is output to evaluation circuitry 45 configured to compare the sensed vibration to a stored expected vibration signature.

In some embodiments, the evaluation circuitry 45 comprises a processor that implements software to compare the sensed vibration to the stored expected vibration signature. As one non-limiting, illustrative embodiment, the software may use Fourier transforms to calculate the differences between the sensed vibration and the expected vibration.

In some embodiments, the evaluation circuitry 45 may comprise a hardware arrangement rather than using software. For example, the evaluation circuitry may comprise a comparator circuit.

In some cases, even if the deadbolt has been properly advanced into and engaged with the door jamb recess in the locked position, the sensed vibration may not match perfectly with the expected vibration signature. Slight mismatches may arise due to noise, artifacts in the motor, vibration sensor, and the evaluation circuitry, or due to other sources of distortion, even if filters are utilized. In some embodiments, the evaluation circuitry 45 may be configured to determine that the deadbolt is engaged with the door jamb recess in a locked position when the sensed vibration of the deadbolt relative to deadbolt position is within a threshold amount of the expected vibration signature. The threshold amount may be in the form of a percentage, an absolute value, or a combination of both.

The system may use various calculations to determine whether or not a sensed vibration is within a threshold amount. For example, in situations where the difference between the sensed vibration and the expected signature varies along different deadbolt positions, the system may calculate the difference at each deadbolt position and take an average. In some embodiments, the threshold may vary along the deadbolt position. In other words, the tolerance for differences may be greater at certain deadbolt positions as compared to others. For example, in one embodiment, the threshold is smaller when the deadbolt is closer to the retracted and extended positions and greater in the positions in-between, or vice versa. In some embodiments, the system only compares a portion of the sensed and expected profiles, rather than the total profiles along the entire deadbolt position spectrum.

In some embodiments, the expected vibration signature may be stored in the deadbolt system at the manufacturing stage. In some embodiments, a user may have the ability to calibrate the expected vibration signature to update the expected signature as parts change over time, due to, e.g., wear and tear.

According to one aspect, the deadbolt systems described herein may be used for automation, e.g., home automation. In some embodiments, the deadbolt system may allow a user to remotely monitor and/or control the state of a door lock. In some embodiments, a user may send a signal to a door locking having the deadbolt system to lock or unlock the door. The deadbolt system of the door lock would then detect whether the door is actually engaged with the door jamb recess in a locked position. A signal would be sent back to the user informing the user as to whether the door is locked or unlocked. In some embodiments, the signals sent between the user and the door lock may be sent via the internet, or other communication modalities such as radiofrequency (RF) or infrared (IR). In some embodiments, the user may interact with a smartphone application to monitor and/or control the door lock.

The deadbolt system may be integrated into a larger automation system, for example, ones that also monitor and/or controls lights, heating, cooling, ventilation, lead, smoke and/or carbon monoxide detection and/or video surveillance.

In some embodiments, techniques described herein may be carried out using one or more computing devices, including, but not limited to, network databases, storage systems, and central plant controllers. For example, the system may include a controller that includes one or more computing devices. Embodiments are not limited to operating with any particular type of computing device.

Figure 26:
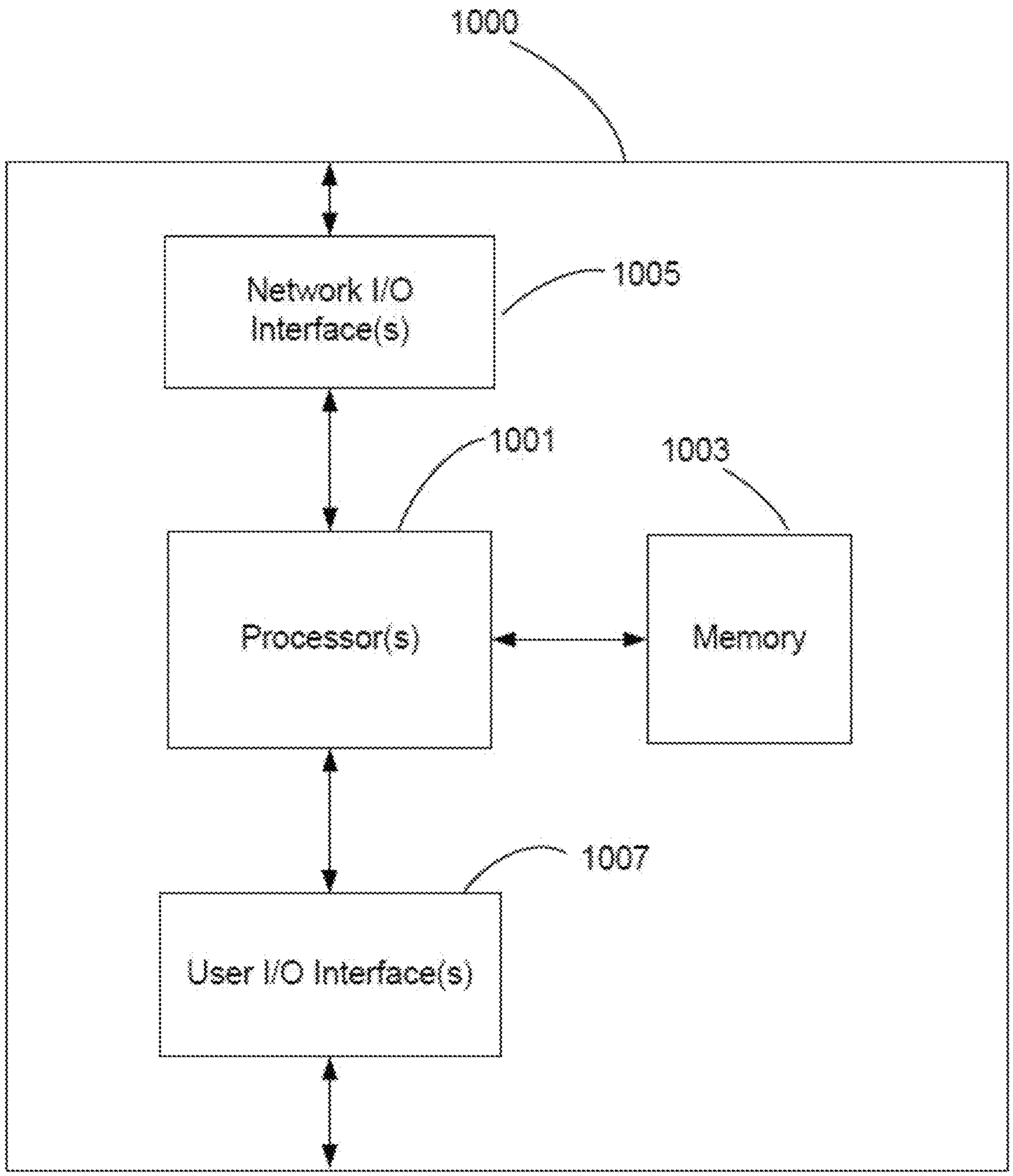
FIG. 26 is a block diagram of an illustrative computing device that may be used to implement a method of detecting whether a deadbolt is engaged with a door jamb in a locked position.

FIG. 26 is a block diagram of an illustrative computing device 1000 that may be used to implement any of the above-described techniques. Computing device 1000 may include one or more processors 1001 and one or more tangible, non-transitory computer-readable storage media (e.g., memory 1003). Memory 1003 may store, in a tangible non-transitory computer-recordable medium, computer program instructions that, when executed, implement any of the above-described functionality. Processor(s) 1001 may be coupled to memory 1003 and may execute such computer program instructions to cause the functionality to be realized and performed.

Computing device 1000 may also include a network input/output (I/O) interface 1005 via which the computing device 1000 may communicate with other computing devices (e.g., over a network), and may also include one or more user I/O interfaces 1007, via which the computing device 1000 may provide output to and receive input from a user. The user I/O interfaces 1007 may include devices such as a keyboard, a mouse, a microphone, a display device (e.g., a monitor or touch screen), speakers, a camera, and/or various other types of I/O devices.

Figure 27:
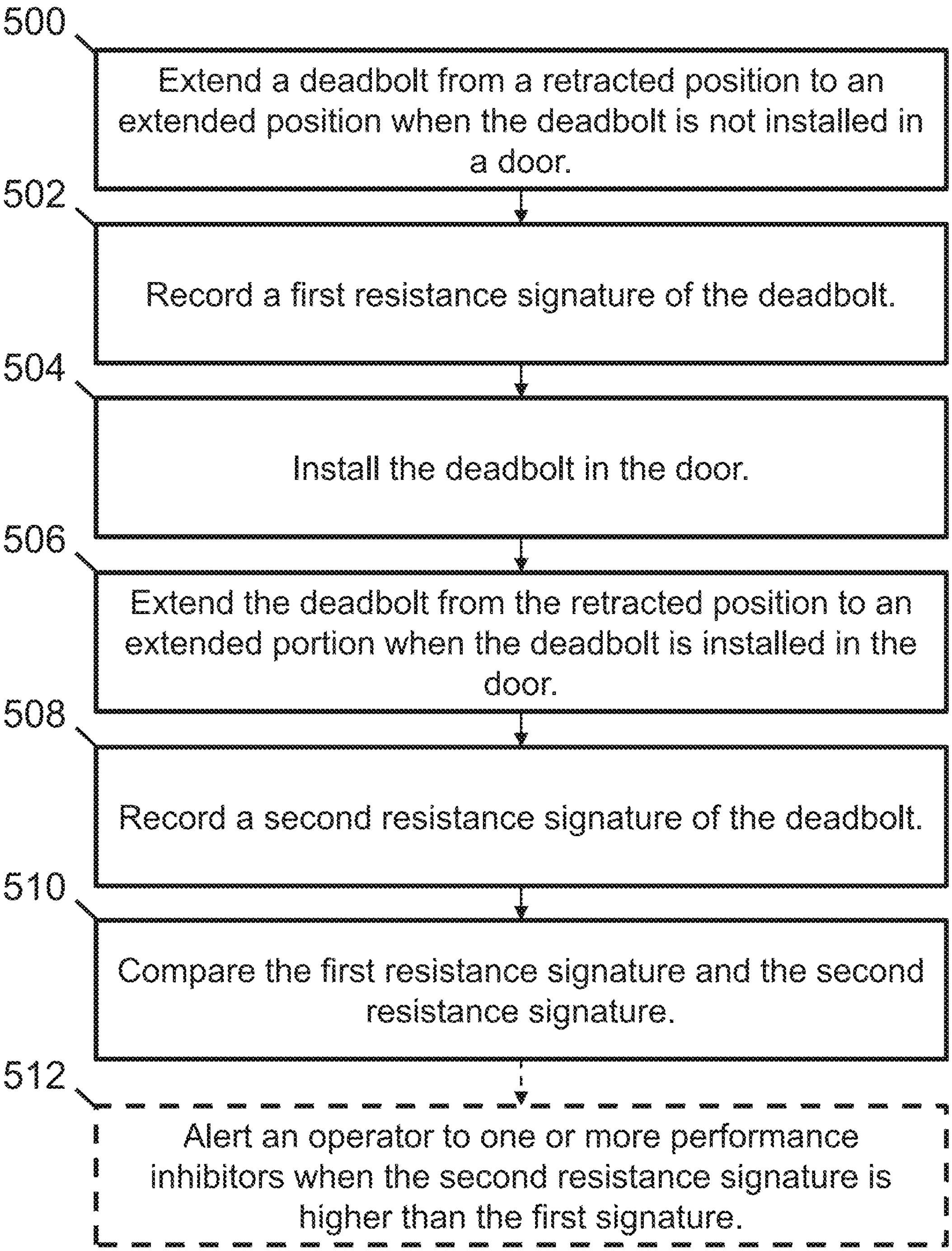
FIG. 27 is a block diagram of one illustrative embodiment of a method for operating a deadbolt system.

FIG. 27 is a block diagram of one embodiment of a method for operating a deadbolt system. In particular, FIG. 27 depicts a method for installing and verifying the correct installation of a deadbolt system. At block 500, a deadbolt is extended from a retracted position to an extended position when the deadbolt is not installed in a door. The deadbolt may be motor-controlled which uses power from a battery to extend and retract the deadbolt on an authenticated command from the operator. Accordingly, the motor may use a certain amount of current during deadbolt extension which is recordable, for example, using a current sensor. At block 502, a first resistance signature of the deadbolt is recorded. The first resistance signature may be representative of the nominal current draw of the deadbolt system prior to installation in an associated door. That is, the first resistance signature may be recorded while the deadbolt system is not installed in the door, so that there is no interference or influence on the deadbolt system. After the first resistance signature is recorded, the deadbolt system is installed into a door at block 504. It should be appreciated that the process may begin at block 506 such that the initial signature with the deadbolt uninstalled on the door is not captured by an operator. In this respect, the initial signature may be a parameter provided by the manufacturer in installation literature (e.g., a pre-supplied signature). Continuing, however, once installed in the door, the deadbolt may be moved from a retracted position to an extended position again at block 506. At block 508, a second resistance signature is recorded during this extension (in the same manner as the first resistance signature was recorded, if in fact the process included the initial assessment). At block 510, the first and second resistance signatures may be compared to determine if there are any performance inhibitors present that may be reducing the functionality or efficiency of the deadbolt system. If the first signature is a pre-supplied signature provided by the manufacturer, then the first signature is the pre-supplied signature such that the second signature is simply compared to the pre-supplied signature. The comparison may be based on an absolute value difference, percentage difference, or any other suitable metric. If the deadbolt system determines that a performance inhibitor is present, an operator of the deadbolt system may be alerted via an indicator (for example, see FIGS. 5A-6B) to the determined performance inhibitor so that the operator may take corrective action, as shown in optional block 512. In cases where the resistance signatures are approximately the same or within acceptable variations, no alert may be sent to the operator or an alert confirming nominal operation may be conveyed to the operator via an indicator.

In some embodiments, a performance inhibitor may be present when a certain level of quantified performance degradation is recorded. For example, when deadbolt resistance (e.g., motor current draw) increases by a predetermined amount a performance inhibitor may be present depending on the amount of the increase. Accordingly, a performance inhibitor may be present when average deadbolt resistance increases relative to a nominal value by greater than or equal to 1%, 5%, 10%, 15%, 25%, 50%, and/or any other appropriate resistance increase. In some cases, it may be desirable to determine performance inhibitor grades (e.g., mild, moderate, severe, etc.). In some embodiments, a mild performance inhibitor may be between a 1% and 10% increase in deadbolt resistance, a moderate performance inhibitor between a 10 and 25% increase, and a severe performance inhibitor greater than a 25% increase. The grade of the performance may be conveyed to an operator via an indicator so that the operator can take corrective action based on the severity of the problem. Of course it should be understood that other possible combinations of the above noted resistance increases may be combined to form any number of grades conveyed to an operator, as the present disclosure is not so limited.

As discussed previously, a resistance signature may be recorded using a current sensor which measures the current draw of a motor when the motor moves a deadbolt between a retracted and extended position. However, any suitable sensor or combination of sensors may be employed in a deadbolt system which is configured to quantify performance of the deadbolt system over time so that the performance of the deadbolt may be compared with a known reference or with previously recorded signatures. Suitable sensors may include, but are not limited to, a strain gauge, a magnetometer, accelerometer, optical sensor, Hall Effect sensor, potentiometer, and rotary encoder. In some embodiments, sensors which measure a power source (e.g., a battery) may be employed to determine if power usage is changing over time which may be indicative of a performance inhibitor. For example, a Coulomb counter may be employed to measure the battery level of a deadbolt system so that increases in average power draw associated with performance inhibitors may be detected. In some embodiments, multiple sensors may be employed to detect performance inhibitors. For example, a current sensor may cooperate with an accelerometer to determine if the deadbolt system is misaligned and degrading performance.

Without wishing to be bound by theory, performance inhibitors may be associated with particular door problems which may be detected based on the information from one or more sensors in a deadbolt system. Accordingly, the deadbolt system may suggest one or more corrective actions to an operator that may correspond to one or more performance inhibitors so that an operator may attempt the corrective action to improve performance of the deadbolt system. For example, a deadbolt system may suggest rotating the deadbolt system so that the deadbolt extends in a substantially planar direction (e.g., horizontal) relative to the recess and/or the ground so friction with a door strike is avoided. As another example, a deadbolt system may suggest checking the door hinge or door strike alignment in cases where the deadbolt system is already level. According to these examples, a sensor which determines deadbolt resistance (e.g., a current sensor) may be combined with an orientation sensor (e.g., an accelerometer) to best characterize the issue causing performance degradation. As yet another example, a deadbolt system may suggest replacing or drying out a door when performance degradation is caused by high humidity, which may be detected by a resistance sensor (e.g., current sensor) and a humidity sensor. Of course, any suitable corrective action may be suggested as the present disclosure is not so limited.

According to exemplary embodiments described herein, an indicator which alerts a user to one or more performance inhibitors may be configured as any suitable indicator which is disposed on or remote from a deadbolt system. As shown in FIGS. 1-6B, the indicator may be an auditory or visual indicator that is disposed on a deadbolt system and conveys information to an operator. For example, in the case of FIGS. 6A-6B, a light (e.g., LED) may flash in a predetermined pattern to convey to an operator that a performance inhibitor is present. In some embodiments, the indicator may be on a remote device. For example, an operator may receive an alert on a personal device such as a smartphone, personal computer, or home automation device (e.g., control panel, alarm panel, voice assistant, etc.). Thus, an operator may be informed of a performance inhibitor at any suitable location which is accessible to convey information to the operator, as the present disclosure is not so limited.

As discussed previously according to some embodiments, a deadbolt system may include a processor and memory so that the performance of the deadbolt system may be characterized locally. In this case, the deadbolt system may be self-contained and not communicate with any external device (e.g., a server, router, personal device, etc.). In other embodiments, a deadbolt system may include a wireless communication system (i.e., transceiver) configured to convey information to a remote device through a wireless connection. For example, a deadbolt communication system may convey information to a wireless hub which is connected to a remote server (e.g., a cloud computing system) from which the information can be accessed by a remote device. Any suitable amount of information may be conveyed wirelessly to a remote device via any suitable protocol (e.g., ZigBee, 802.15.4, Bluetooth, Bluetooth Low Energy, Wi-Fi, etc.). In some embodiments, the processing of the data from the sensors of the deadbolt system may be processed on a remote device such as a remote server. According to this embodiment, the data from the sensors may be transmitted to the remote server and stored. The remote server may process the data and determine whether a performance inhibitor is present. In cases where a performance inhibitor is present, the remote server may send a message back to the deadbolt system to trigger an alert on the deadbolt system itself or may trigger an alert directly to another remote device such as a smartphone or personal computer. The information stored on the remote server may be accessible at any time via a remote device through an internet browser, application, or other suitable program. Thus, a deadbolt system may perform analysis onboard, transmit partial analysis to a remote server, transmit unanalyzed raw data to a remote server, or perform any other suitable function to determine whether a performance inhibitor is present, as the present disclosure is not so limited.

Figure 28:
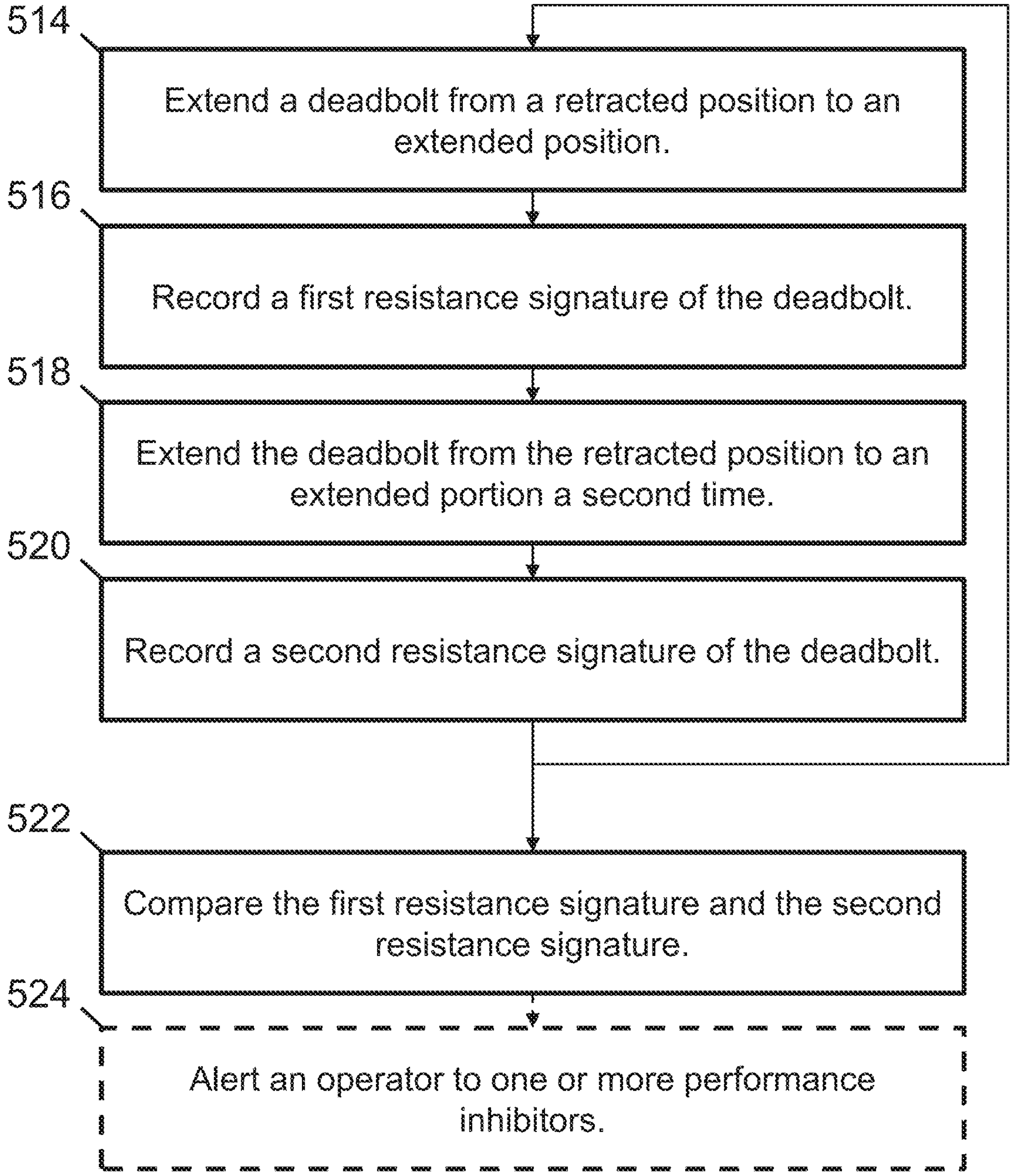
FIG. 28 is a block diagram of another illustrative embodiment of a method for operating a deadbolt system.

FIG. 28 is a block diagram of another embodiment of a method for operating a deadbolt system. In particular, FIG. 28 depicts a method for characterizing performance degradation of the deadbolt system over time. At block 514, a deadbolt is extended from a retracted position to an extended position. As the deadbolt is extended, a first resistance signature is recorded using any suitable sensor (e.g., a current sensor) at block 516. At block 518, the deadbolt is extended again from a retracted position to an extended position. At block 520, a second resistance signature of the deadbolt is recorded. According to the embodiment of FIG. 28, blocks 514-520 may be completed during normal operation of the deadbolt. That is, each time the deadbolt is locked, a resistance signature may be recorded by the deadbolt system. As shown in FIG. 28, blocks 514-520 may be repeated any number of times to collect additional resistance signatures. For example, when repeated again the deadbolt system may record a third resistance signature and a fourth resistance signature. Of course, any suitable number of resistance signatures may be recorded, as the present disclosure is not so limited. At block 522, the resistance signatures are compared to determine if there was performance degradation of the deadbolt system. In some embodiments block 522 may be repeated each time a resistance signature is recorded. In other embodiments, block 522 may only be repeated once per predetermined number of extensions (e.g., 2, 3, 4, 5, 10, 15, etc.) and the resistance signatures averaged to reduce false positive rates. In still other embodiments, resistance signatures may be averaged or otherwise combined to filter outlier resistance signatures and reduce false positive rates. If the compared resistance signatures indicate a performance inhibitor is present, an operator may optionally be alerted to the performance inhibitors at block 524.

Figure 29:
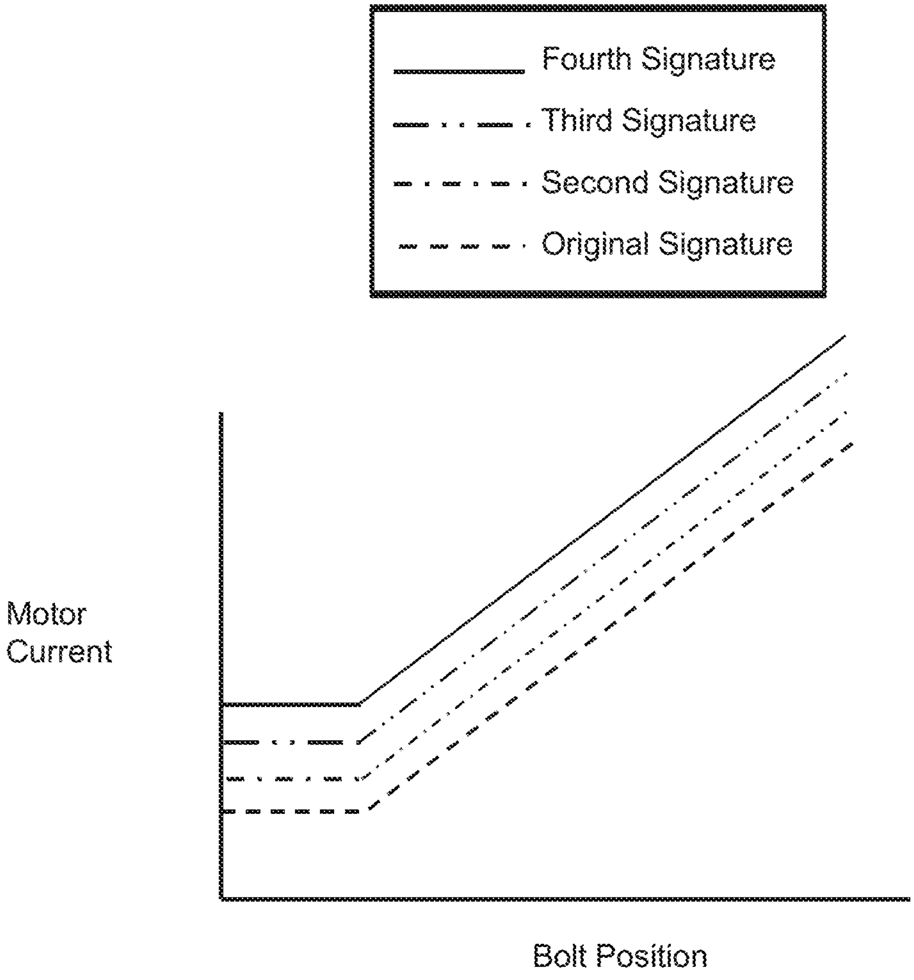
FIG. 29 is a graph of multiple readings of sensed motor current relative to deadbolt position for a deadbolt system.

FIG. 29 is a graph of sensed motor current relative to deadbolt position for a deadbolt system from multiple readings. The data shown in FIG. 29 is an example of performance degradation that may be measured over time to determine the presence of a performance inhibitor. According to the data shown in FIG. 29, each of the signatures shown was recorded at different times in sequential order. That is, the original signature is representative of a nominal performance and the second, third, and fourth signatures were recorded afterward. As discussed previously, a higher motor current may correspond with a higher deadbolt resistance. Accordingly, each of the recorded signatures shows performance degradation relative to the prior recorded signature. In the case shown in FIG. 29, a deadbolt system may alert an operator to one or more performance inhibitors so that corrective action may be taken to improve the performance of the deadbolt. In some embodiments, the deadbolt system may suggest fixes, such as reorienting the deadbolt, realigning a strike place, realigning hinges, etc. Additionally, in the case shown in FIG. 29, the deadbolt system may identify a performance trend (i.e., performance degradation over time). In some embodiments, the deadbolt system may alert an operator to this performance trend. In other embodiments, the deadbolt system may identify the trend but wait to alert an operator until a predetermined threshold performance degradation is reached.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. In some embodiments, a combination of programmable hardware and dedicated hardware may also be used.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

While the above embodiments are described in reference to a door, it should be appreciated that the same systems can be adapted for use with a window or other fenestrations having an associated openable covering. Additionally, while the above embodiments are described in reference to a deadbolt, it should be appreciated that the same systems can be employed with a latch bolt or any other suitable latching member, as the present disclosure is not so limited. Further, embodiments shown in the figures and disclosed herein depict a commercial deadbolt; however it should be appreciated that a residential deadbolt may be employed.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method for operating a deadbolt system, the method comprising:
- extending a deadbolt from a retracted position to an extended position at a first time;
- recording a first resistance signature that is at least partially indicative of a performance of a deadbolt;
- extending the deadbolt from the retracted position to the extended position at a second time;
- recording a second resistance signature that is at least partially indicative of the performance of the deadbolt;
- extending the deadbolt from the retracted position to the extended position at a third time and recording a third resistance signature at least partially indicative of the performance of the deadbolt;
- averaging the second resistance signature and the third resistance signature to create an average signature; and
- comparing the first resistance signature to the average signature.

2. The method of claim 1, further comprising alerting an operator to one or more performance inhibitors when the average signature is higher than the first resistance signature.

3. The method of claim 1, further comprising alerting an operator to one or more performance inhibitors when the average signature is higher than the first resistance signature by at least 10%.

4. The method of claim 1, wherein extending the deadbolt from the retracted position to the extended position comprises operating a motor to extend the deadbolt from the retracted position to the extended position.

5. The method of claim 4, wherein recording the first resistance signature and second resistance signature includes recording current draw of the motor when the motor extends the deadbolt from the retracted position to the extended position.

6. The method of claim 1, further comprising conveying, using an indicator, performance information regarding the performance of the deadbolt.

7. The method of claim 6, wherein the indicator comprises a light disposed on a deadbolt housing of the deadbolt system.

8. The method of claim 1, further comprising comparing a difference between the first resistance signature and the average signature against a threshold to determine whether performance inhibitors are present, and alerting an operator of the deadbolt system to the performance inhibitors.

9. A method for operating a deadbolt system, the method comprising:
- extending a deadbolt from a retracted position to an extended position a plurality of times;
- recording a corresponding plurality of resistance signature that are each at least partially indicative of a performance of the deadbolt at the corresponding one of the plurality of times;
- averaging the plurality of resistance signatures to create an average resistance signature; and
- comparing the average resistance signature to a nominal resistance signature stored in a memory of the deadbolt system, the nominal resistance signature being at least partially indicative of a nominal performance of the deadbolt being extended from the retracted position to the extended position.

10. The method of claim 9, further comprising alerting an operator to one or more performance inhibitors when the average resistance signature exceeds the nominal resistance signature by a predetermined amount.

11. The method of claim 9, further comprising alerting an operator to one or more performance inhibitors when the average resistance signature exceeds the nominal resistance signature by at least 10%.

12. The method of claim 9, wherein extending the deadbolt from the retracted position to the extended position comprises operating a motor to extend the deadbolt from the retracted position to the extended position.

13. The method of claim 12, wherein recording the plurality of resistance signatures includes recording current draws of the motor when the motor extends the deadbolt from the retracted position to the extended position.

14. The method of claim 9, further comprising conveying, using an indicator, performance information regarding the performance of the deadbolt.

15. The method of claim 14, wherein the indicator comprises a light disposed on a deadbolt housing of the deadbolt system.

16. The method of claim 9, further comprising comparing a difference between the average resistance signature and the nominal resistance signature against a threshold to determine whether performance inhibitors are present, and alerting an operator of the deadbolt system to the performance inhibitors.

17. The method of claim 9, further comprising recording the nominal resistance signature to the memory of the deadbolt system based on an original movement of the deadbolt from the retracted position to the extended position.

* * * * *